US012033407B2

(12) United States Patent
Iwane

(10) Patent No.: US 12,033,407 B2
(45) Date of Patent: Jul. 9, 2024

(54) RECOGNITION AND POSITIONING DEVICE AND INFORMATION CONVERSION DEVICE

(71) Applicant: IWANE LABORATORIES, LTD., Sapporo (JP)

(72) Inventor: Waro Iwane, Sapporo (JP)

(73) Assignee: IWANE LABORATORIES, LTD., Sapporo (JP)

( * ) Notice: Subject to any disclaimer, the term of this patent is extended or adjusted under 35 U.S.C. 154(b) by 348 days.

(21) Appl. No.: 17/611,350

(22) PCT Filed: Apr. 22, 2020

(86) PCT No.: PCT/JP2020/017322
§ 371 (c)(1),
(2) Date: Nov. 15, 2021

(87) PCT Pub. No.: WO2020/235286
PCT Pub. Date: Nov. 26, 2020

(65) Prior Publication Data
US 2022/0230458 A1 Jul. 21, 2022

(30) Foreign Application Priority Data
May 23, 2019 (JP) .................. 2019-096946

(51) Int. Cl.
G06V 20/64 (2022.01)
G06T 7/20 (2017.01)
(Continued)

(52) U.S. Cl.
CPC ............. *G06V 20/647* (2022.01); *G06T 7/20* (2013.01); *G06T 7/70* (2017.01); *G06V 10/70* (2022.01);
(Continued)

(58) Field of Classification Search
None
See application file for complete search history.

(56) References Cited

U.S. PATENT DOCUMENTS
2002/0106135 A1  8/2002  Iwane
2008/0304707 A1  12/2008  Oi et al.
(Continued)

FOREIGN PATENT DOCUMENTS
JP  2007-316839 A  12/2007
JP  2008-304268 A  12/2008
(Continued)

OTHER PUBLICATIONS

Visual Global Localization with a Hybrid WNN-CNN Approach. Forechi et al. (Year: 2018).*

(Continued)

*Primary Examiner* — Delomia L Gilliard
(74) *Attorney, Agent, or Firm* — HAUPTMAN HAM, LLP

(57) ABSTRACT

A recognition and positioning device includes a CV video obtaining unit that generates a CV video by adding a CV value to an object video, an object designation unit that designates a recognition target object captured throughout a plurality of frames of the CV video, a consecutive frame machine learning unit that repetitively executes a recognition process through machine learning, a three-dimensional coordinate computation and object coordinate assigning unit that associates recognized objects over the frames of the CV video, identifies the objects having matched coordinates of the captured objects in corresponding frames, and assigns three-dimensional position coordinates to the objects, and a coordinate assigning and recognition output unit that assigns the three-dimensional coordinates to the objects about which a predetermined recognition certainty degree and a three-dimensional coordinate accuracy are obtained, by repeating (Continued)

recognition of the object and assigning of the three-dimensional position coordinates.

8 Claims, 37 Drawing Sheets

(51) Int. Cl.
  *G06T 7/70* (2017.01)
  *G06V 10/70* (2022.01)
  *G06V 20/40* (2022.01)
  *H04N 7/18* (2006.01)
(52) U.S. Cl.
  CPC ............. *G06V 20/41* (2022.01); *H04N 7/183* (2013.01); *G06T 2207/10016* (2013.01); *G06T 2207/20081* (2013.01); *G06T 2207/30244* (2013.01); *G06T 2207/30252* (2013.01); *G06V 2201/07* (2022.01)

(56) References Cited

U.S. PATENT DOCUMENTS

2012/0039511 A1  2/2012  Oi et al.
2013/0108108 A1  5/2013  Oi et al.
2014/0334679 A1  11/2014  Oi et al.

FOREIGN PATENT DOCUMENTS

JP  2012-118666 A  6/2012
JP  2019-028876 A  2/2019
WO  02/01505 A1  1/2002

OTHER PUBLICATIONS

PCT/ISA/210, "International Search Report for PCT International Application No. PCT/JP/2020/017322," Aug. 4, 2020.
PCT/ISA/237, "Written Opinion for PCT International Application No. PCT/JP/2020/017322," Aug. 4, 2020.
European Patent Office, "Extended European Search Report with Search Opinion for European Patent Application No. 20809450.8," Jun. 5, 2023.
Forechi Avelino et al., "Visual Global Localization with a Hybrid WNN-CNN Approach," 2018 International Joint Conference On Neural Networks (IJCNN), IEEE, Jul. 8, 2018 (Jul. 8, 2018), p. 1-9, XP033419145, DOI: 10.1109/IJCNN 2018.8489335.
Wang Peng et al., "DeLS-3D: Deep Localization and Segmentation with a 3D Semantic Map," 2018 IEEE/CVF Conference on Computer Vision and Pattern Recognition, IEEE, Jun. 18, 2018 (Jun. 18, 2018), pp. 5860-5869, XP033473501, DOI: 10.1109/CVPR.2018.00614.

* cited by examiner

Figure 4
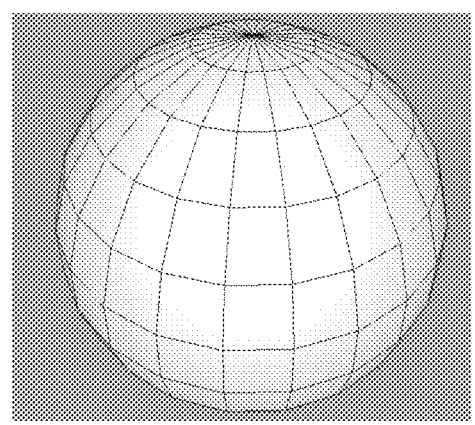
(a)
(b)
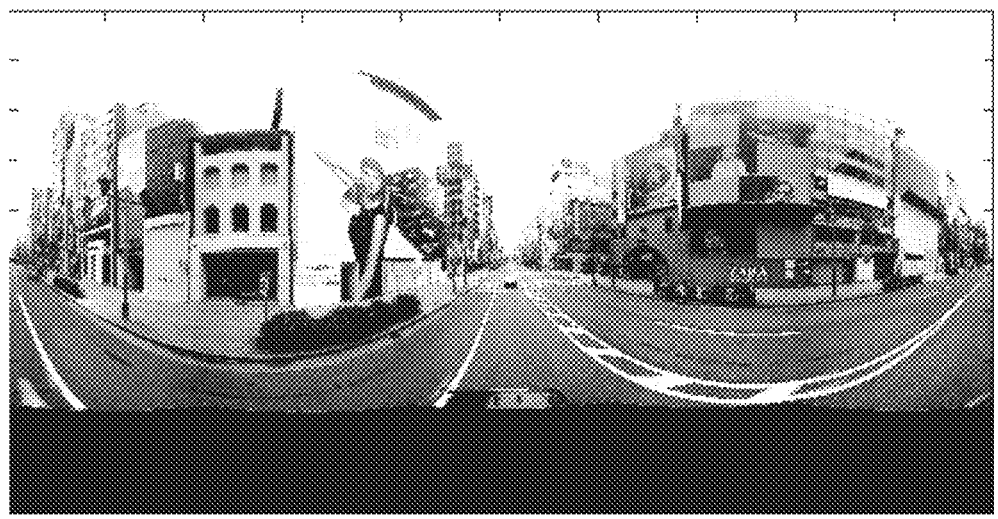
(c)

Figure 5
(a) 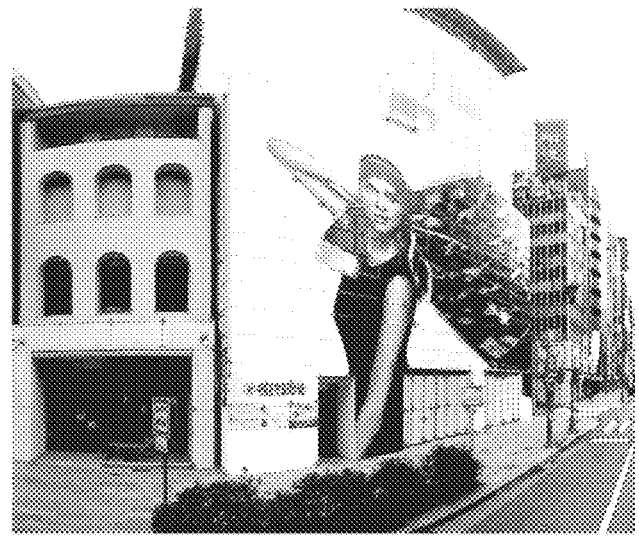
(b) 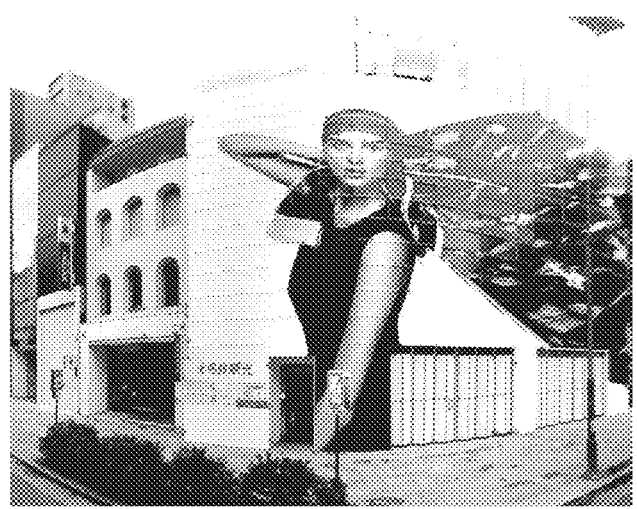
(c) 

Figure 6
IMAGE 1
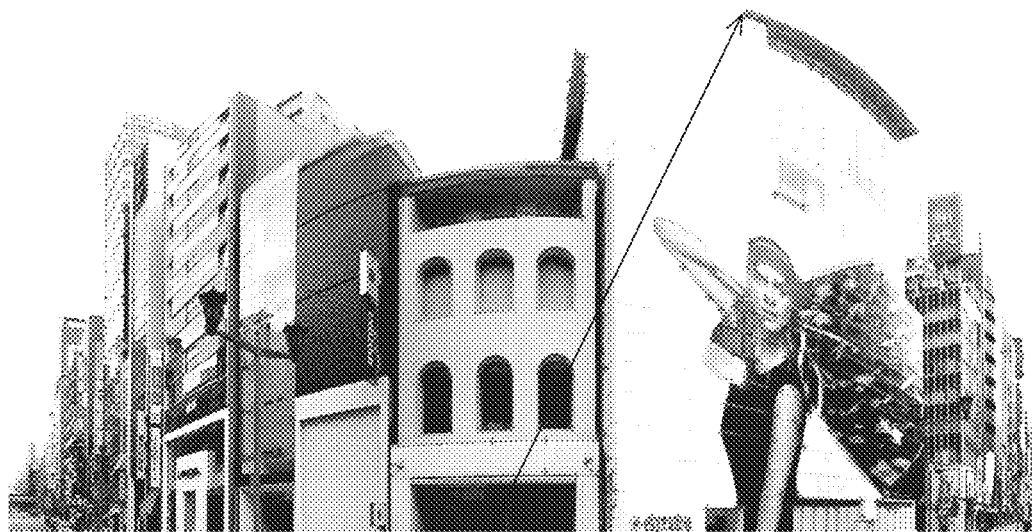
ASSOCIATED POINT
IMAGE 2

CV VALUE DISPLAY

Figure 19
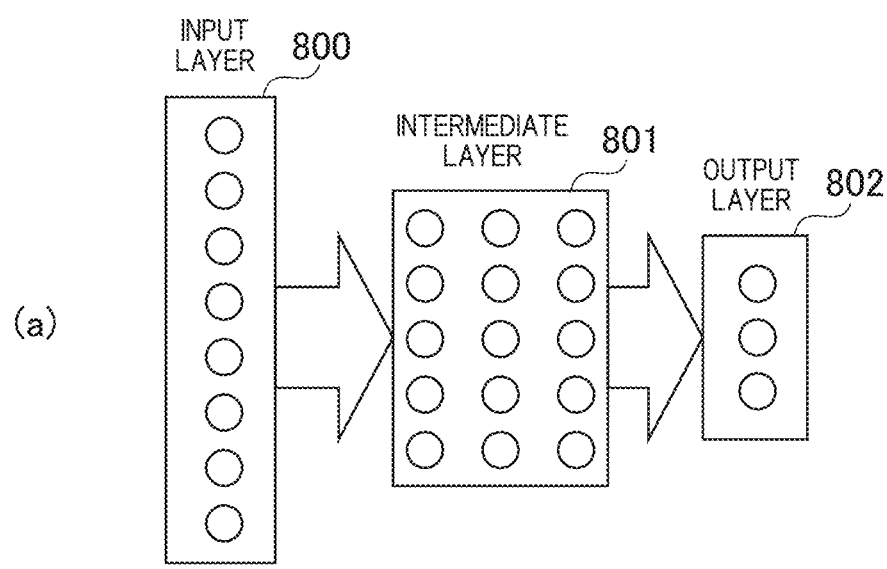
(a)
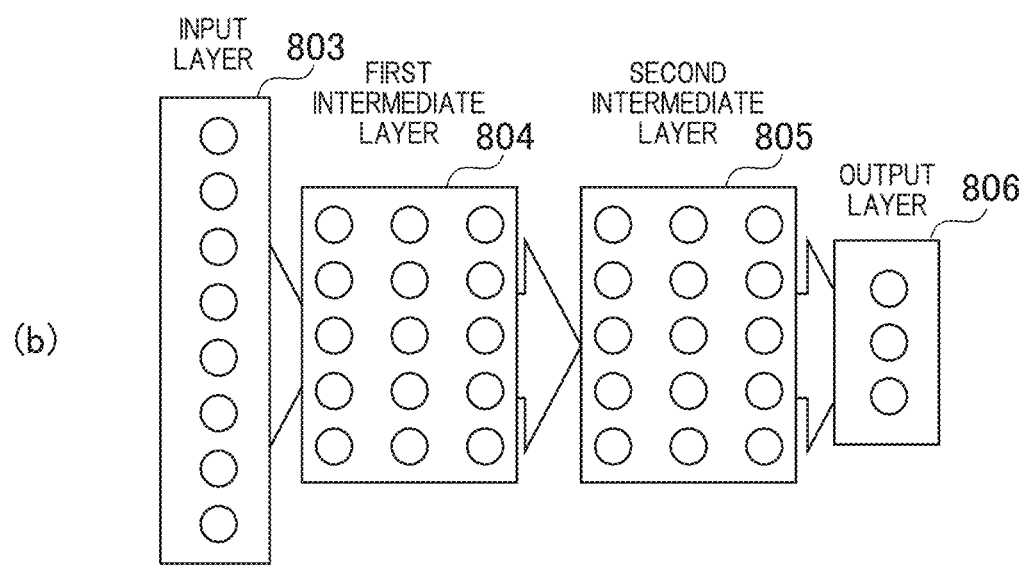
(b)

RECOGNITION AND POSITIONING DEVICE AND INFORMATION CONVERSION DEVICE

RELATED APPLICATIONS

The present application is National Phase of International Application No. PCT/JP2020/017322 filed Apr. 22, 2020, and claims priority from Japanese Application No. 2019-096946, filed May 23, 2019, the disclosure of which is hereby incorporated by reference herein in its entirety.

TECHNICAL FIELD

The invention relates to an image and video processing technology that allows an object in an image to be recognized from a moving image on the basis of an image and a video obtained through a video camera or the like, while allowing three-dimensional coordinates of the object to be obtained.

BACKGROUND ART

In image recognition fields, machine learning has recently been advancing rapidly.

For example, Patent Literature 1 proposes that training data suitable for image analysis is efficiently generated to thereby obtain a sufficient amount of training data to be used for highly accurate image recognition, situation prediction and the like.

CITATION LIST

Patent Literature

[Patent Literature 1] JP-A-2019-028876

SUMMARY OF INVENTION

Technical Problem

According to an image recognition technology through existing machine learning as disclosed in Patent Literature 1, for example, when a three-dimensional map is created for automated driving, objects, such as signs, features, signals and the like, can be image-recognized. There is, however, room for further improvement.

For example, the current machine learning has been considerably improving, but is only for recognizing an object in a two-dimensional image, and cannot obtain the three-dimensional position of the recognized object simultaneously with the recognition. The recognition here is to determine which one of categorized classifications the object belongs to, through a neural network.

Accordingly, to obtain three-dimensional position information on the object by the existing image recognition technology, for example, a survey or the like, which is different from the object recognizing operation, is required.

The existing object recognition is not for a three-dimensional target. If a three-dimensional object is targeted, the object is projected and recognized two-dimensionally after all.

As described above, the object to be recognized by the conventional image recognition technology does not have three-dimensional coordinates.

That is, the machine learning performs segmentation and convolution integration two-dimensionally, and has a drawback of losing a three-dimensional shape and position information in principle.

As described above, the object is recognized two-dimensionally. Unlike the actual world, the three-dimensional structure is always unknown accordingly.

Current image transmission is two-dimensional transmission. Even if the resolution of the image is improved to 2K, 4K, and 8K, the image is still two-dimensional, and is different from that in the real world.

As for the invention that can solve such a problem that the existing image recognition technology has, as a result of earnest research, the inventor of this application has arrived at the invention that can greatly improve the image processing technology by allowing the object to be recognized and simultaneously allowing its three-dimensional coordinates to be obtained.

That is, the invention has been proposed to solve the problem that the conventional technology as described above has. The invention has an objective to provide a recognition and positioning device and an information conversion device that can improve the functionality and further improve the performance by adding a new function to the conventional machine learning.

The invention allows a device and a technology to be provided that can use a moving image to recognize an object in an image from the moving image and simultaneously obtains the three-dimensional coordinates of the object, and consecutively perform them to thereby automatically create a database of the object assigned the coordinates, further perform automated driving using the database as a three-dimensional map serving as a reference, and furthermore, efficiently transmit and record enormous information in the database including the temporal axis.

Solution to Problem

To achieve the objective described above, a recognition and positioning device of the invention includes: a CV (camera vector) video obtaining unit that performs a CV computation of obtaining a predetermined CV value indicating a relationship between a camera coordinate system for an object video taken by predetermined video obtaining means and a stationary coordinate system, and generates a CV video by adding the CV value to the object video; an object designation unit that designates an identical object captured throughout a plurality of consecutive frames of the CV video, as a target object to be recognized; a consecutive frame machine learning unit that repetitively executes a recognition process through machine learning, for the object designated by the object designation unit; a three-dimensional coordinate computation and object coordinate assigning unit that associates the objects recognized by the consecutive frame machine learning unit over all the frames of the CV video, obtains coordinates of each of the objects captured in the CV video, identifies the objects having matched coordinates by confirming in the corresponding frames, and assigns three-dimensional position coordinates to the objects concerned; and a coordinate assigning and recognition output unit that assigns three-dimensional coordinates to the objects about which a predetermined recognition accuracy degree and a three-dimensional coordinate accuracy are obtained, by repeating recognition of the object and assigning of the three-dimensional coordinates between the consecutive frame machine learning unit and the three-dimensional coordinate computation and object coordinate assigning unit, and outputs the coordinates assigned to the objects.

An information conversion device of the invention is a device to be connected to the recognition and positioning device according to the invention, the information conversion device including: an ID parts warehouse that stores a predetermined ID serving as identification information associated with the object, and attribute information classified according to the ID; and an image reconstruction and display device that associates the ID stored in the ID parts warehouse, with the object that is identified and assigned the three-dimensional position coordinates by the recognition and positioning device, and reconstructs the CV video including a plurality of the objects, according to the ID associated with each object, and attribute information thereon.

JP-B2-4146027 "Information Conversion System" filed by the applicant of this application is a technology that obtains the three-dimensional coordinates of a target object in an image by predetermined means, obtains its shape, replaces it with a component, and reconstructs it, thereby reconstructing the image.

JP-B2-4767578 "high-precision CV computation unit" filed by the applicant of this application can analyze a moving image, execute a computation of obtaining six variables of a camera having obtained the moving image, obtain the coordinates of the position of the camera, and variously process the moving image. Note that in the patent technology concerned, the obtainment of the three-dimensional coordinates, and the object recognition are different technologies. A technology that can simultaneously process both has not been proposed.

Recently, machine learning has been considerably improved as a technology widespread in the world. An object in an image can be considerably freely recognized. It can be said that the world of image analysis has been further widened.

Since obtainment of a moving image, instead of an image simply as a photo, has been becoming commonplace, the invention can use, instead of a still image, a moving image, specifically, a CV video (described later in detail) that is of the patent technology described above and recognize an object through machine learning, and instantaneously obtain the three-dimensional coordinates of the object at the same time. If further required, three-dimensional absolute coordinates can be obtained.

Images are originally two-dimensional. However, if a three-dimensional structure can be identified from consecutive two-dimensional images simultaneously with recognition, significant utilization and development can be expected.

It is a matter of course that, for example, possible combination with a conventional surveying instrument can obtain the three-dimensional coordinates of the object by a post-process. However, the invention is characterized in that the object can be recognized and simultaneously the three-dimensional coordinates can be obtained, while the certainty degree of recognition and the accuracy of the three-dimensional coordinates can be improved.

Here, for the three-dimensional coordinates of the object in the invention, a representative point can be predetermined with respect to purposes. For example, the three-dimensional coordinates of the center of the object, the three-dimensional coordinates of the lower end, the three-dimensional coordinates of the upper end, or the overall three-dimensional shape can be designated. Specifically, in a case of a traffic sign, the center of the sign, its upper end, its lower end, the entire sign or the like is assumed.

According to such an invention, first, in recognition of an object through conventional machine learning, the three-dimensional coordinates of the object is enabled. Application of the CV technology according to the applicant of this application allows machine learning to be adapted to a moving image as it is in a video, and allows the recognition object to have a three-dimensional coordinates.

Accordingly, utilization and development to a new area are enabled; both have been impossible through the machine learning technologies so far.

Advantageous Effects of Invention

The invention can recognize an object in an image from the moving image and simultaneously obtains the three-dimensional coordinates of the object, and consecutively perform them to thereby automatically create a database of the object assigned the coordinates, further perform automated driving using the database as a three-dimensional map serving as a reference, and furthermore, efficiently transmit and record enormous information in the database including the temporal axis.

BRIEF DESCRIPTION OF DRAWINGS

FIG. 3(a) is a front view of the vehicle mounted with the full circumference camera on the roof, and FIG. 3(b) is a plan view of the same.

FIGS. 4(a), 4(b) and 4(c) illustrate converted images obtained from a video taken by the full circumference camera; FIG. 4(a) shows a virtual spherical surface on which a spherical image is to be pasted, FIG. 4(b) shows an example of the spherical image pasted on the virtual spherical surface, and FIG. 4(c) shows an image planarly developed from the spherical image shown in (b) according to the Mercator projection.

FIGS. 5(a), 5(b) and 5(c) illustrate a specific method of detecting a camera vector in the CV computation means according to one embodiment of the invention.

FIG. 6 illustrates a specific method of detecting a camera vector in the CV computation means according to one embodiment of the invention.

FIGS. 19(*a*) and 19(*b*) schematically illustrate the principle of machine learning (deep learning) subsequent to FIG. 18.

DESCRIPTION OF EMBODIMENTS

Figure 1:
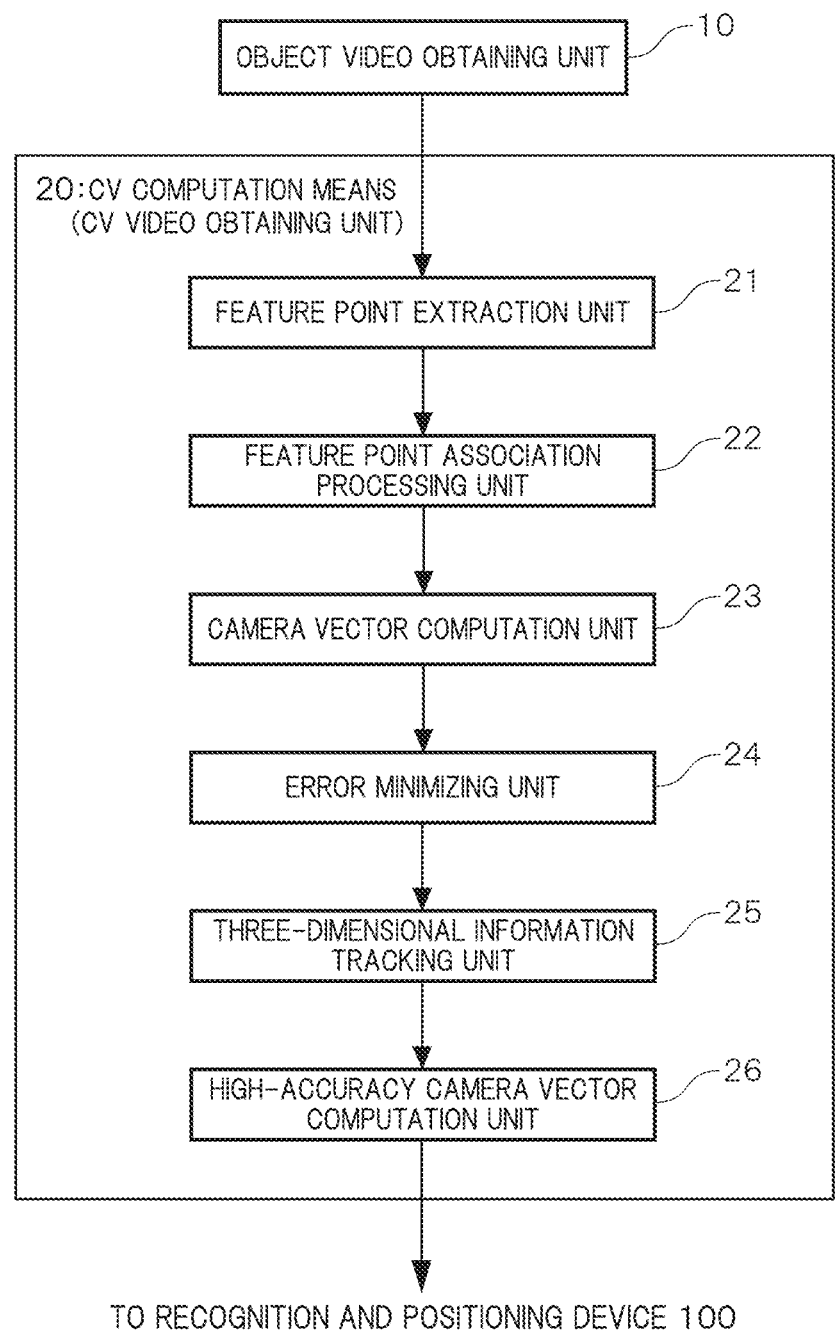
FIG. 1 is a block diagram showing a basic configuration of one embodiment of CV computation means (CV video obtaining unit) for performing a CV computation for an object video in a recognition and positioning device of the invention.

Hereinafter, preferable embodiments of a recognition and positioning device and an information conversion device according to the invention are described with reference to the drawings.

Here, the recognition and positioning device and the information conversion device of the invention described below are achieved by processes, means and functions executed by a computer according to instructions of a program (software). The program transmits instructions to corresponding configuration elements of the computer, and causes the computer to perform predetermined processes and functions described below; for example, automatic extraction of a feature point (reference point) serving as a reference in an object video and other feature points, automatic tracking of the extracted reference point, calculation of three-dimensional coordinates of the reference point, computation of a CV (camera vector) value, recognition and identification of the object included in the CV video, assigning of three-dimensional coordinates to the recognized object, assigning and output of a highly accurate recognition certainty degree and a three-dimensional coordinate accuracy by repetitive recognition of the object and assigning of the three-dimensional coordinates, and generation of a reconstructed image depending on an ID associated with the identified and recognized object and attribute information thereon. As described above, the processes and means in the invention are achieved by specific means where the program and the computer cooperate with each other.

Note that the entire or part of the program is provided by, for example, a magnetic disk, an optical disk, a semiconductor memory, or another freely-selected computer-readable recording medium. The program read from the recording medium is installed to the computer and executed.

The program can be loaded to the computer via a communication line directly without intervention of a recording medium, and be executed.

The computer may be made up of a single PC or the like, or multiple server computers or the like.

[CV video]

The recognition and positioning device according to one embodiment of the invention described below is means for recognizing objects in an image from a moving image based on, for example, an object video taken and obtained by a video camera, and simultaneously obtaining the three-dimensional coordinates of the recognized object, and consecutively performing them to thereby assign highly accurate three-dimensional coordinates to each object in the video.

The recognition and positioning device according to this embodiment assumes, as a premise, use of a CV (camera vector) video obtained by assigning the object video total six pieces of variable information that are predetermined three-dimensional coordinates and attitudes, in order to highly accurately achieve recognition and three-dimensional coordinate assignment of the object in the video as described above.

Note that six variables equivalent to those described above may be obtained by, for example, a mechanical sensor (IMU, gyroscope, etc.) attached to the camera. However, the CV computation can simply achieve generation and obtainment with higher accuracy and no cost.

Hereinafter, the CV video used by the recognition and positioning device according to the invention is described.

On the premise of the recognition and three-dimensional coordinate obtaining process in the recognition and positioning device, an imaging camera that obtains and takes an object video including an object serving as a target and object is installed on a moving body, such as a vehicle, and a moving image video or consecutive still images are obtained. Furthermore, feature points in each frame image of the obtained object video are extracted, and the camera position and attitude of every frame are obtained by mathematical computation.

Specifically, the six variables of the camera position and attitudes, more specifically, a six-degree-of-freedom vector (camera vector: CV) having the camera position coordinates (X, Y, Z) and angles of rotation ($\Phi x$, $\Phi y$, $\Phi z$) of the coordinate axis are associated with each frame of the video with one-to-one correspondence, thereby allowing the CV video to be generated (see FIGS. 1 to 14 described later).

Use of the CV video can perform the recognition and three-dimensional coordinate obtaining process of a desired object in any video, without using any surveying technology through an existing surveying instrument.

Here, the six variables indicating the position and attitude of the camera serving as a target are total six variables that are the coordinates [X, Y, Z] and attitudes [($\Phi x$, $\Phi y$, $\Phi z$].

That is, the recognition and positioning device according to the invention obtains the six variables indicating the position and attitude of any of objects and points included in the object video.

As described above, the obtainment of the six variables is determination of six variables that are [X, Y, Z] indicating the three-dimensional position coordinates and [($\Phi x$, $\Phi y$, $\Phi z$] indicating the attitude.

A video assigned the CV value indicating such six variables of the position and attitude is a CV video.

Definition of Terms

Next, terms, words and phrases used in this Description and Claims are described.

CV Value/CV Computation/CV Video/CV Image:

The six variables obtained through a mechanical sensor mounted on a moving object (e.g., vehicle, robot or the like), and the six variables obtained by calculating the position and attitude of the camera from consecutive still images or a moving image obtained from the camera are called camera vectors (CV: camera vectors). The value thereof is called a CV value (see FIG. 14). Obtainment of the CV value through computation is called CV computation. An image having such a CV value is called a CV video.

Note that for example, six variables obtained from a mechanical sensor (IMU, gyroscope, etc.) integrally included in the camera may be adopted as a CV value according to the invention.

An inconsecutive and independent image is sometimes called a CV image. Alternatively, when only one frame is focused, an image of the one frame is sometimes called a CV image. That is, the CV image is that in a special state of the CV video (independent image).

RV Value:

While the CV value has the six variables of the camera position and attitude with respect to the stationary coordinate system, six variables obtained by substituting the CV value in the six variables about the positions and attitudes of the moving body and the camera and converting the relationship into the relationship between the stationary coordinate system and the moving body are called a regional vector (RV) value.

Extraction of the moving body requires coordinate system separation. The six variables of the object viewed from the stationary coordinate system are called the RV value. The six variables of the object viewed from the camera position are called an MV value (see description below).

The RV value/MV value are included in the CV value, and can be obtained by CV computation described later, in a manner similar to that of the CV value.

MV Value/MV Computation/MV Image:

As described above, the six variables indicating the relationship between camera coordinate system and the stationary coordinate system is called the CV value. The six variables indicating the relationship between the camera coordinate system and the moving body coordinate system is called the RV value.

In images including an identical moving object in multiple frames, a moving object moving in a still image system is detected as an RV value.

The relationship of an object fixed to the stationary coordinate system, such as, for example, a building, with the camera coordinate system is defined by the CV value as it is.

The moving object (e.g., automobile) is defined as an RV value instead of a CV value.

On the other hand, when only the relationship between the stationary coordinate system and the camera coordinate system is obtained, the RV value is a value serving as an error. Accordingly, this value is removed.

Incidentally, the RV value is obtained on an object-by-object basis (e.g., an object having a fixed shape, such as a car).

When multiple portions constituting the object independently move (e.g., an object having a changing shape, such as a person), the portions have multiple RV values.

Here, when the motion of a traveling vehicle is analyzed, the relationship between the coordinate system of the CV area image and the moving object is required to be obtained.

Figure 14:
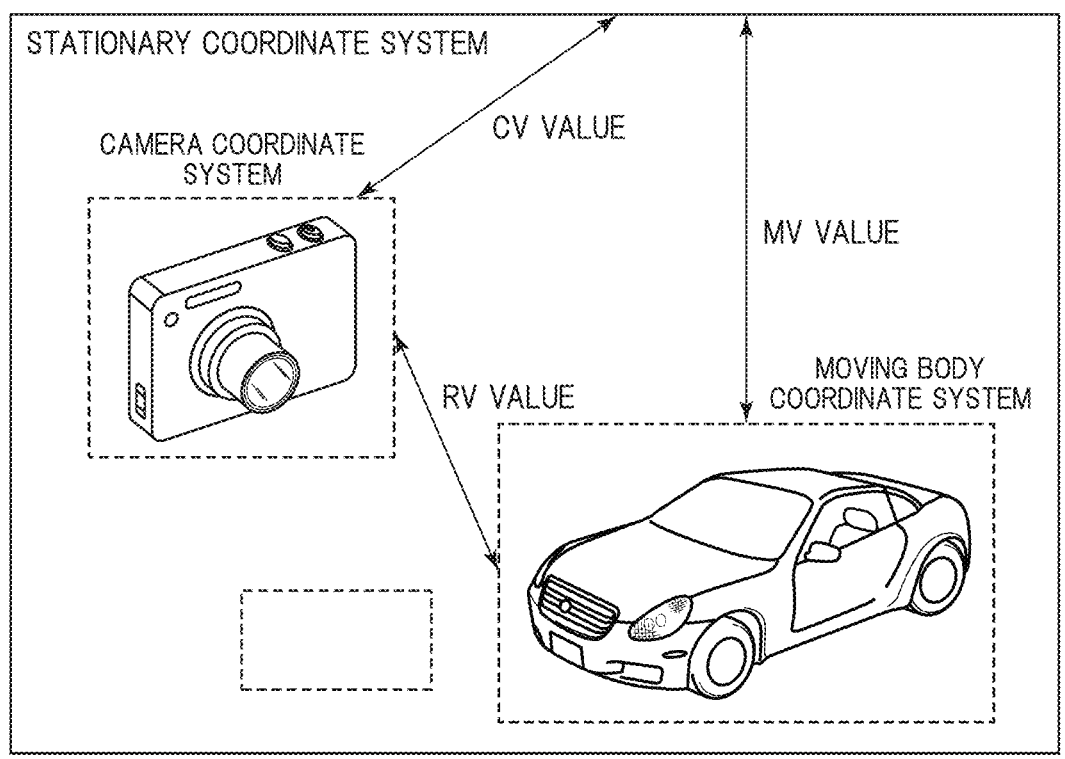
FIG. 14 schematically illustrates a relationship among a CV value obtained by the CV data computation means according to one embodiment of the invention, an RV value and an MV value.

First, as shown in FIG. 14, the relationship between the CV value and the RV value is obtained through the CV value.

Accordingly, as shown in FIG. 14, a combined variable that directly indicates the relationship between the stationary coordinate system and the coordinate system of the moving object is called the MV value. Computation for the value is called MV computation. An object area image is called an MV image.

That is, camera coordinate system of an element common between the CV value and the RV value is removed. Obtainment of the six variables indicating the direct relationship between the stationary coordinate system and the moving body coordinate system is assumed as MV computation. The six variables are assumed as a moving vector (MV) value.

FIG. 14 schematically shows the relationship among the CV value, the RV value, and the MV value according to the invention.

As shown in this diagram, for performing the MV computation, the camera coordinate system is assumed as a common term, and the mutual CV value (RV value) is removed, thereby obtaining the MV value.

An image about which the MV value is obtained as described above is called an MV image.

Note that it is a matter of course that the MV value indicating the stationary coordinate system and the moving body coordinate system changes from moment to moment, over time.

Object Recognition:

In the invention, "recognition" of an object means that the target object and the attribute of the object are determined according to prepared categories. Furthermore, determination of a predefined name of an object is also "recognition".

There is no guarantee that a plurality of objects recognized in each frame of the object video are an identical object.

That is, "recognition" does not mean obtainment of a shape but means classification into categories.

Object Identification:

In the invention, "identification" of an object means that the objects "recognized" as described above are determined to be an identical object.

Specifically, determination that a recognized object (e.g., utility pole) is an "identical utility pole" standing at a predetermined place is called "identification".

The recognition/identification process as described above is described in detail with reference to after-mentioned FIGS. 15 to 22.

[CV Computation]

Next, details of the aforementioned CV computation for generating a CV video used in the recognition and positioning device of the invention are described with reference to FIGS. 1 to 14.

The CV computation means obtainment of a CV value. An obtained result is called a CV value, and CV data. The representation of CV is an abbreviation of "camera vector". The camera vector (CV) is a value indicating the three-dimensional position and the attitude about three axes of a camera, such as a video camera, for obtaining a video for measurement and the like.

The CV computation is for obtaining a moving image (video), detecting feature points in the video, tracking the points in adjoining frames, generating, in the image, many triangles made of camera positions and tracking trajectories of feature points, and analyzing the triangles, thereby obtaining the camera's three-dimensional position, and the camera's attitude about three axes.

The CV computation has important characteristics that in the process of obtaining CV value, the three-dimensional coordinates of a feature point (reference point) in the video are also obtained at the same time.

The CV value obtained from the moving image by computation is associated with each frame of the moving image, and the three-dimensional camera position and the three-dimensional camera attitude are obtained at the same time. Furthermore, the characteristics that the CV value is obtained in association with the video by a single camera in principle are excellent features that can be achieved only by CV computation.

For example, measurement means (GPS, IMU, etc.) based on another method requires highly accurate and complete synchronization between the image frame and measurement sampling time in order to obtain each frame of the moving image and the three-dimensional camera position and three-dimensional camera attitude at the same time. Accordingly, the means becomes a high-cost device, and is substantially difficult to be achieved.

The CV data obtained from the moving image through computation is a relative value in an unprocessed step. However, in a short interval, the three-dimensional position information and angular information on rotation about three axes can be obtained.

The CV data is obtained from the image. Accordingly, the obtained data has a relative value. Characteristics are provided that are not achievable by another method and can measure the positional relationship with any object in the image.

The CV value associated with the image is obtained. Accordingly, in measurement in an image and surveying, the CV computation that can obtain the camera position and the attitude about three axes directly from the image is suitable for the measurement in an image and surveying in an image.

The recognition and positioning device of the invention performs processes of recognizing any object in the video and of obtaining the three-dimensional coordinates, on the basis of a video assigned CV value data obtained by the CV computation (CV video).

[CV Computation Means]

The CV computation is performed by CV computation means 20 that functions as a CV video obtaining unit 20 (see FIG. 15) of the recognition and positioning device of the invention described later.

As shown in FIG. 1, the CV computation means (CV video obtaining unit) 20 performs a predetermined CV computation process, for a video input from an object video obtaining unit (full circumference camera unit) 10 made up of a vehicle-mounted video camera. Specifically, the means includes a feature point extraction unit 21, a feature point association processing unit 22, a camera vector computation unit 23, an error minimizing unit 24, a three-dimensional information tracking unit 25, and a high-accuracy camera vector computation unit 26.

First, any video may be used as a video for CV computation. However, in a case of a video having a limited angle of view, possible movement of the view point direction is interrupted. Accordingly, it is desirable that a full circumference video (see FIGS. 2 to 4) be adopted. Note that the moving image video is similar to a series of still images, and can be treated similarly to the still images.

Typically, a prerecorded moving image video is used as the video. Alternatively, it is a matter of course that a video captured in real time in response to the movement of the moving body, such as an automobile, may be used.

Figure 2:
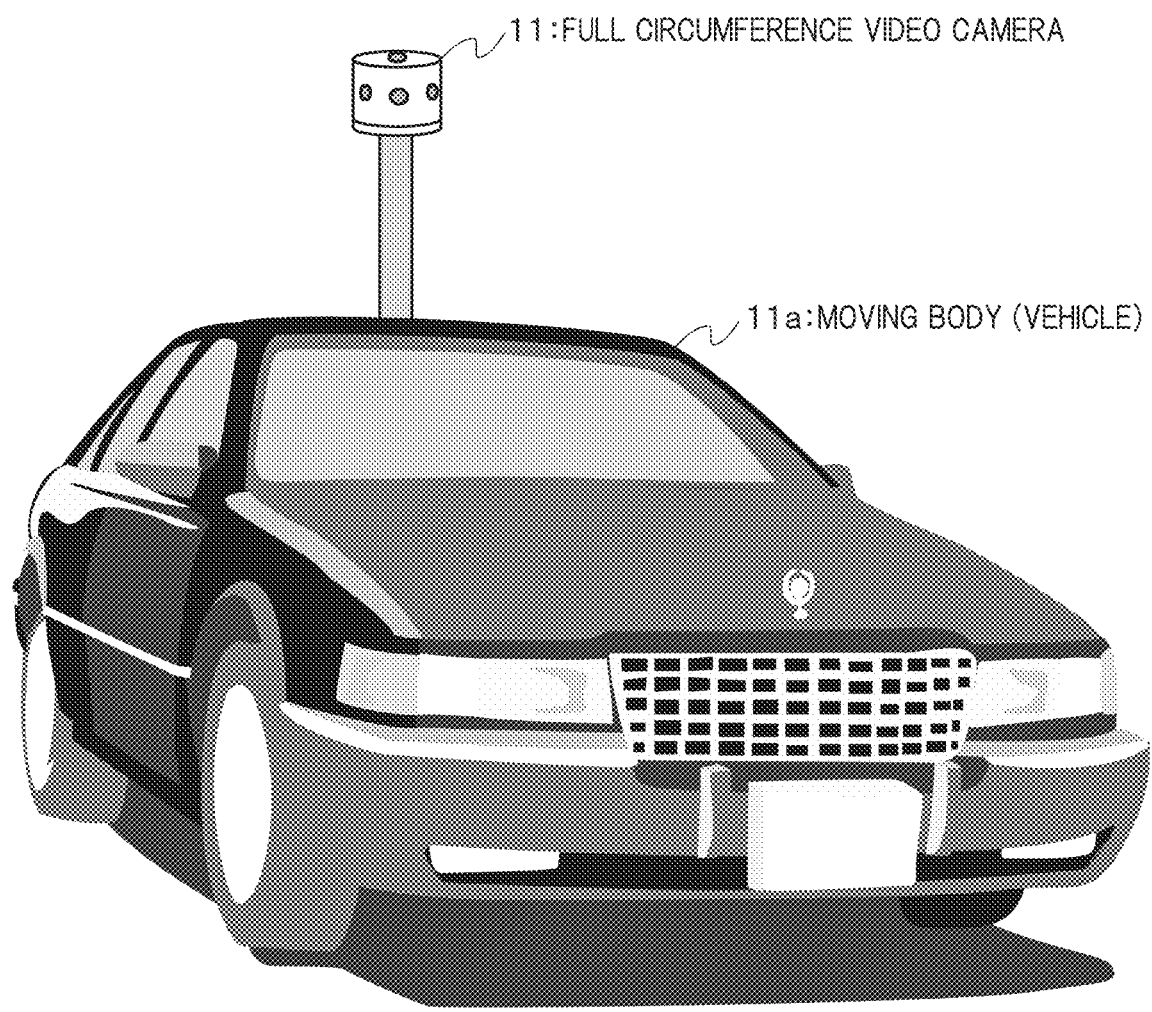
FIG. 2 is a schematic diagram showing means for taking a full circumference video used for the CV computation means shown in FIG. 1, and is a perspective view of a vehicle mounted with the full circumference camera on a roof.
Figure 3:
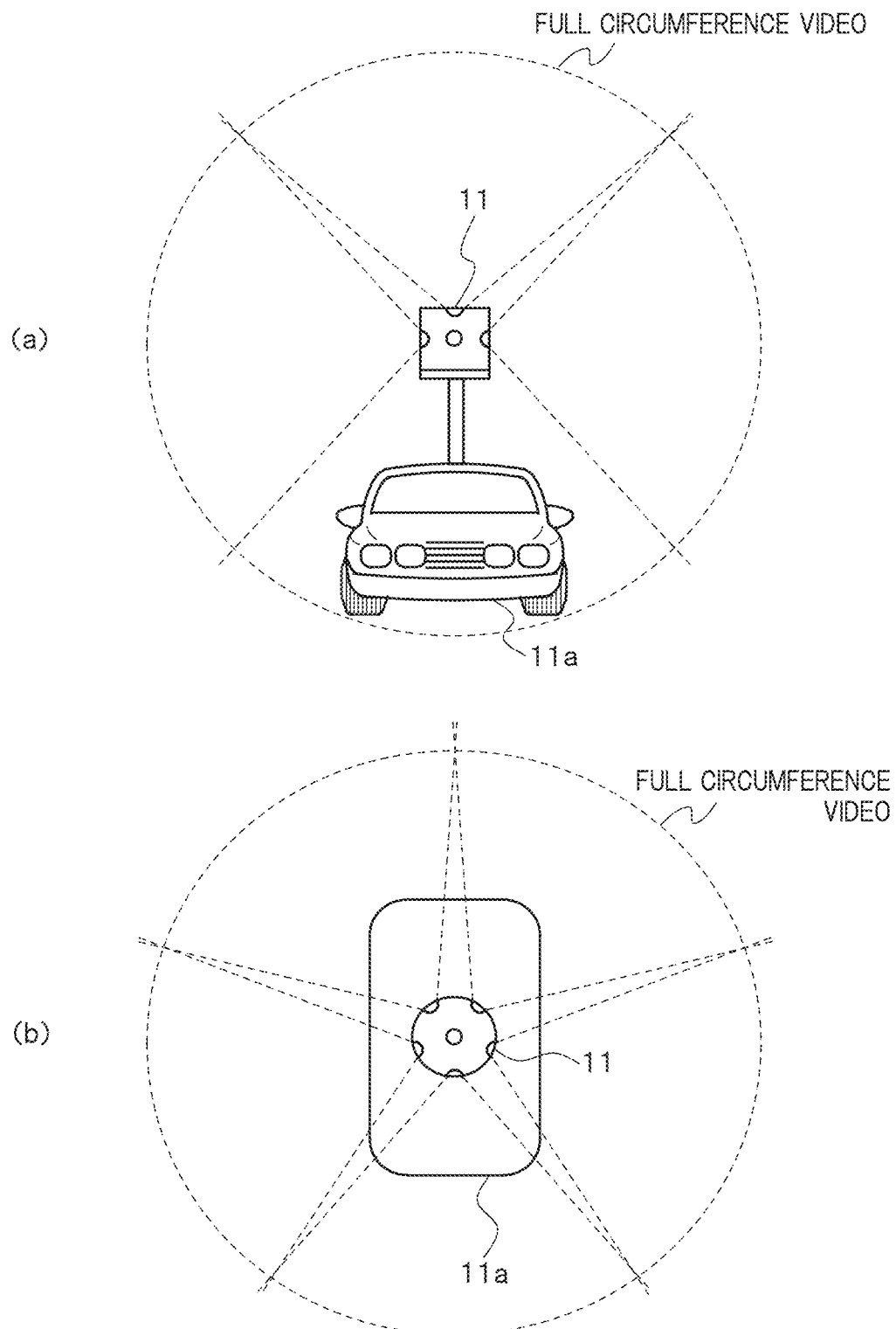
FIGS. 3(a) and 3(b) are schematic diagrams showing the means for taking a full circumference video used for the CV computation means shown in FIG. 1.

In this embodiment, the object video obtaining unit 10 is provided that uses, as the video used for CV computation, the full circumference video (see FIGS. 2 to 4($c$)) obtained by taking the 360-degree full circumference of the moving body, such as a vehicle, or a wide-angle video close to the full circumference video, and planarly develops the full circumference video in the view point direction, thereby obtaining and generating the object video serving as a target of freely selected view point movement (see FIG. 1).

Here, the planar development of the full circumference video represents the full circumference video as a typical image in perspective. Here, this is called "perspective" because the full circumference image itself is displayed by a method, such as the Mercator projection or spherical projection, which is different from the perspective (see FIGS. 4(a), 4(b) and 4(c)), and planar development thereof can convert the image into a typical perspective video and display it accordingly.

To generate the full circumference video by the object video obtaining unit 10, first, as shown in FIGS. 2 and 3, a full circumference video camera 11 is used, the moving body and therearound is imaged by the full circumference video camera 11 in response to the movement of a moving body 11a by the full circumference video camera 11 fixed to the moving body 11a, such as a traveling vehicle, for the sake of obtaining CV value data.

Note that for the sake of obtaining the position coordinates, the moving body 11a may include a position measurement instrument made up solely of a GPS device of obtaining absolute coordinates or this device added with an IMU device, for example.

The full circumference video camera 11 mounted on the moving body 11a may have any configuration only if the camera takes and obtains a wide-range video. For example, the camera may be, for example, a camera including a wide-angle lens or a fisheye lens, a moving camera, a fixed camera, a camera including fixed cameras, a 360-degree rotatable camera or the like. In this embodiment, as shown in FIGS. 2 and 3, a plurality of cameras are integrally fixed to a vehicle. The full circumference video camera 11 that takes a wide-range video in response to the movement of the moving body 11a is adopted.

According to the full circumference video camera 11 described above, as shown in FIGS. 3(a) and 3(b), the camera is installed on the roof or the like of the moving body 11a; the installation allows the multiple cameras to simultaneously take a video of 360-degree full circumference of the camera. The moving body 11a travels, which allows the wide-range video to be obtained as moving image data.

Here, the full circumference video camera 11 is a video camera that can directly obtain the full circumference video of the camera. Only if half or more of the full circumference of the camera can be obtained as a video, the video can be used as a full circumference video.

Even in a case of a typical camera having restricted angle of view, the video has a reduced accuracy of CV computation but can be handled as a part of the full circumference video.

Note that the wide-range video taken by the full circumference video camera 11 can be pasted as a single image on a virtual spherical surface conforming to the angle of view during imaging.

The spherical image data pasted on the virtual spherical surface is stored and output as a spherical image (360-degree image) data in a state of being pasted on the virtual spherical surface. The virtual spherical surface can be set as any spherical manner centered at the camera unit that obtains a wide-range video.

FIG. 4(a) is an exterior image of the virtual spherical surface on which the spherical image is to be pasted, and FIG. 4(b) is an example of the spherical image pasted on the virtual spherical surface. Furthermore, FIG. 4(c) shows an image example where the spherical image of FIG. 4(b) is planarly developed according to the Mercator projection.

The full circumference video generated and obtained as described above is input as an object video according to the invention into the CV computation means (CV video obtaining unit) 20, and the CV value data is obtained (see FIG. 1).

In the CV computation means 20, first, the feature point extraction unit 21 automatically extracts a sufficient number of feature points (reference points) from moving image data taken by the full circumference video camera 11 of the object video obtaining unit 10 and temporarily recorded.

The feature point association processing unit 22 automatically tracks the automatically extracted feature points in each frame image between the corresponding frames, thereby automatically obtaining the association relationship.

The camera vector computation unit 23 automatically obtains, through computation, the camera vectors associated with the corresponding frame images, from the three-dimensional position coordinates of the feature point about which the association relationships have been obtained.

The error minimizing unit 24 performs a statistical process through repetitive computation of multiple camera positions so as to minimize the distribution of solutions of the camera vectors, and automatically determines the camera position direction to which the error minimizing process has been applied.

The three-dimensional information tracking unit 25 regards the camera vectors obtained by the camera vector computation unit 23 as schematic camera vectors, and automatically tracks partial three-dimensional information included in the multiple frame images along the adjoining frame images on the basis of the three-dimensional information obtained as part of sequential images, in a subsequent process. Here, the three-dimensional information (three-dimensional shape) is mainly three-dimensional distribution information on feature points, i.e., an aggregation of three-dimensional points. The aggregation of three-dimensional points constitutes the three-dimensional shape.

The high-accuracy camera vector computation unit 26 generates and outputs more highly accurate camera vectors than the camera vectors obtained by the camera vector computation unit 23 on the basis of tracking data obtained by the three-dimensional information tracking unit 25.

The camera vectors obtained as described above are input into a recognition and positioning device 100 described later, and is used for a recognition process and three-dimensional coordinate assigning process for any object and point that is designated or selected in the video.

There are some methods to detect camera vectors from feature points in multiple images (moving images or consecutive still images). The CV computation means 20 of this embodiment shown in FIG. 1 is configured to automatically extract a sufficient number of feature points in the images, and automatically track the points, thereby obtaining the three-dimensional vectors and three-axis rotation vectors of the camera by the epipolar geometry.

The adoption of a sufficient number of feature points can obtain camera vectors having higher accuracies from the redundant information while minimizing the error.

The camera vector is a vector having degrees of freedom that the camera has.

Typically, a static three-dimensional object has six degrees of freedom that are the position coordinates (X, Y, Z) and the angles of rotation ($\Phi x$, $\Phi y$, $\Phi z$) of the respective coordinate axes.

Consequently, the camera vector is a vector having six degrees of freedom (six variables) that are the position coordinates (X, Y, Z) of the camera and the angles of rotation (Φx, Φy, Φz) of the respective coordinate axes. Note that when the camera moves, the degrees of freedom also include a movement direction, which can be obtained by derivation from the six degrees of freedom (variables).

As described above, the camera vector detection in this embodiment is determination where the camera has six degrees of freedom for each frame, and different six degrees of freedom are determined on a frame-by-frame basis.

Hereinafter, a specific method of detecting the camera vector in the CV computation means 20 is described with reference to FIGS. 5(a), 5(b) and 5(c) and thereafter.

Image data obtained by the full circumference video camera 11 of the object video obtaining unit 10 described above is indirectly or directly input into the feature point extraction unit 21 of the CV computation means 20. Points to be feature points or a small area image are automatically extracted by the feature point extraction unit 21 in an appropriately sampled frame image. The association relationships of the feature points between frame images are automatically obtained by the feature point association processing unit 22.

Specifically, feature points the number of which is equal to or higher than a sufficient number and which serves as a reference for detecting the camera vector are obtained. FIGS. 5(a) to 7(b) show an example of feature points and their association relationships between images. In the example, "+" indicates an automatically extracted feature point. The association relationships between frame images are automatically tracked (see associated points 1 to 4 shown in FIGS. 7(a) and 7(b)).

Figure 8:
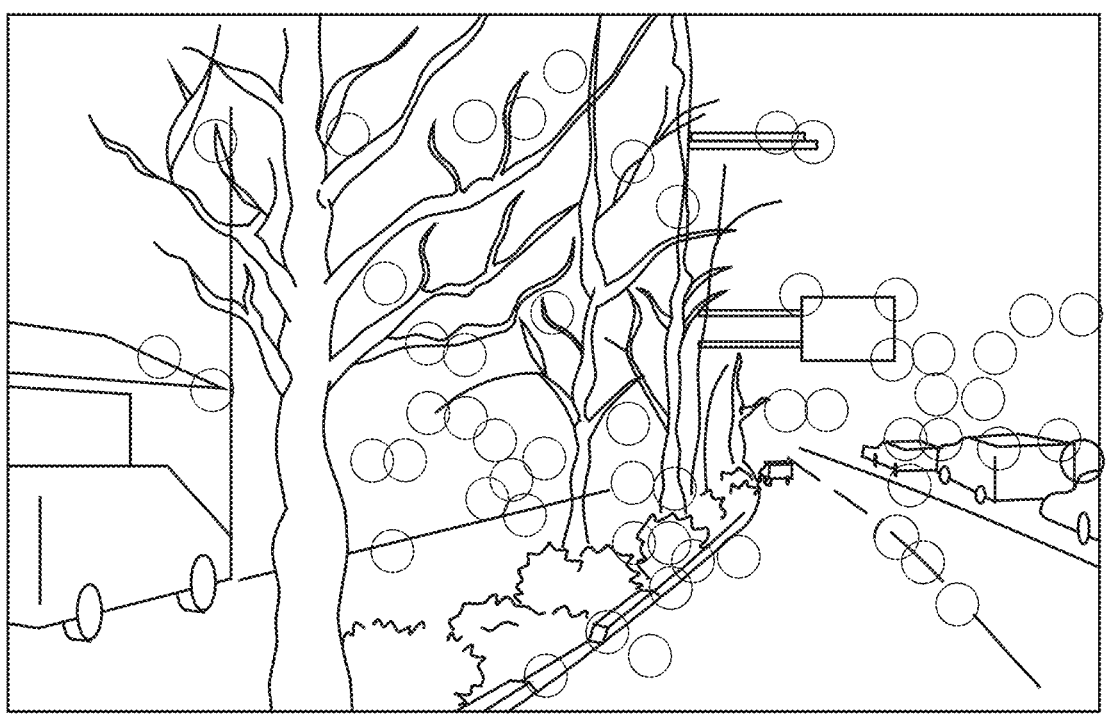
FIG. 8 illustrates a desirable mode of designating feature points in the method of detecting camera vectors in the CV computation means according to one embodiment of the invention.
Figure 9:
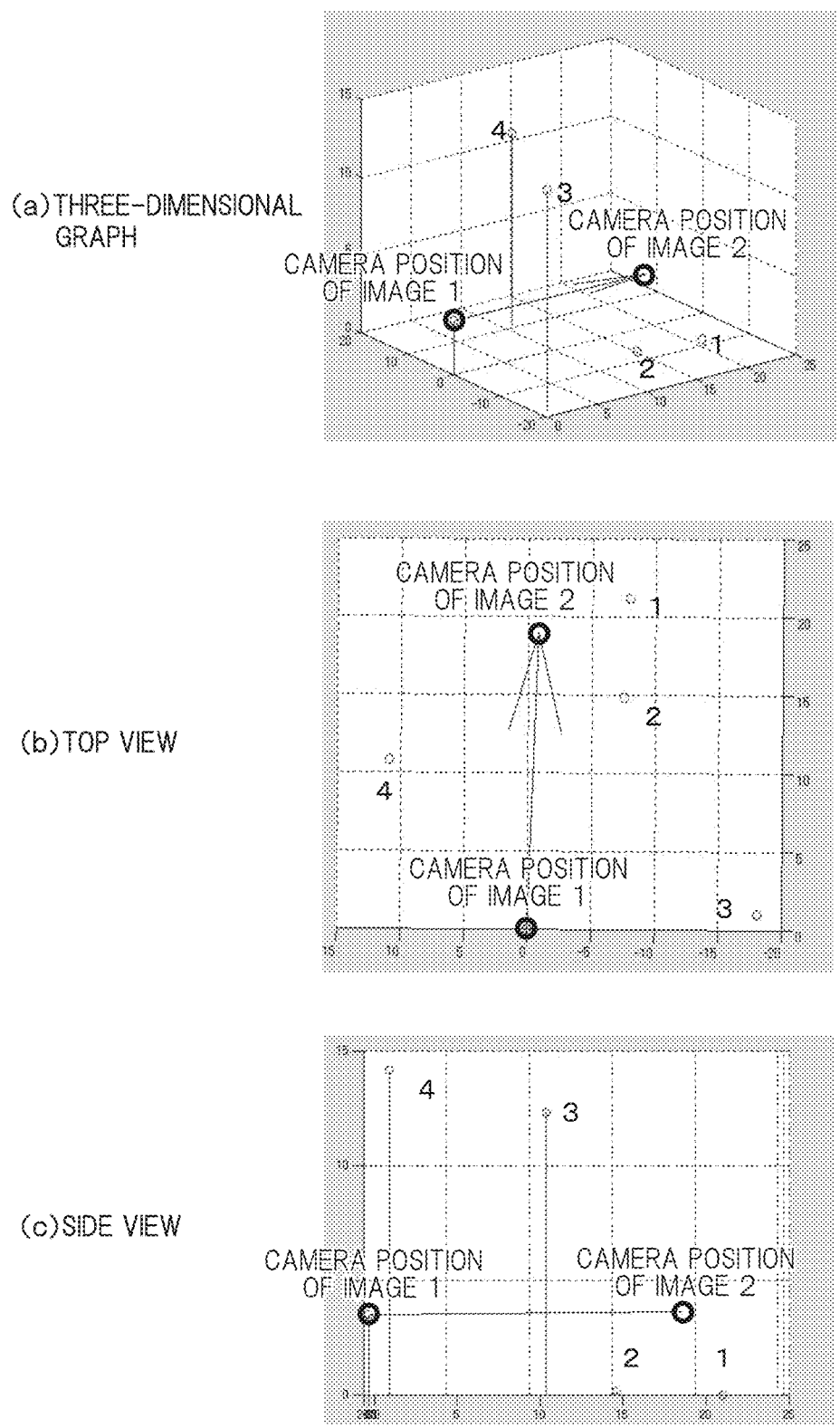
FIGS. 9(a), 9(b) and 9(c) are graphs showing an example of three-dimensional coordinates of feature points and a camera vector obtained by the CV computation means according to one embodiment of the invention.

Here, as shown in FIG. 8, it is desirable that the feature point extraction designate and extract a sufficient number of feature points in each image (see open circles in FIG. 8). For example, about 100 feature points are extracted.

Subsequently, the camera vector computation unit 23 obtains the three-dimensional coordinates of the extracted feature points through computation. Based on the three-dimensional coordinates, the camera vector is obtained through computation. Specifically, the camera vector computation unit 23 consecutively calculates, through computation, relative values of various three-dimensional vectors, such as a sufficient number of features residing between consecutive frames, position vectors between moving cameras, the three-axis rotation vectors of the camera, and vectors connecting between each camera position and the feature points.

In this embodiment, for example, the camera motion (the camera position and the camera rotation) is calculated by solving an epipolar equation through the epipolar geometry on the 360-degree full circumference image.

Images 1 and 2 shown in FIGS. 7(a) and 7(b) are images obtained by developing a 360-degree full circumference image according to the Mercator projection. If the latitude φ and the longitude θ are assumed, a point on the image 1 is (θ1, φ1), and a point on the image 2 is (θ2, φ2). The corresponding spatial coordinates through the camera are $z1=(\cos φ1 \cos θ1, \cos φ1 \sin θ1, \sin φ1)$, and $z2=(\cos φ2 \cos θ2, \cos φ2 \sin θ2, \sin φ2)$. The movement vector of the camera is assumed as t and the rotation matrix of the camera is assumed as R, $z1^T[t] \times Rz2=0$ is an epipolar equation.

By providing a sufficient number of feature points, t and R can be calculated as solutions by the method of least squares through linear algebra computation. The computation is applied to the corresponding frames, and is achieved.

Here, it is preferable to use a 360-degree full circumference image as an image used for the camera vector computation.

Although in principle any image can be adopted as an image used for camera vector computation, a wide-angle image, such as a 360-degree full circumference image shown in FIGS. 7(a) and 7(b), allows many feature points to be easily selected. Accordingly, in this embodiment, a 360-degree full circumference image is used for CV computation. This allows the feature point tracking distance to be increased, allows a sufficient number of feature points to be selected, and allows feature points convenient for long distances, medium distances and short distances to be selected. When the rotation vector is corrected, addition of a polar rotation converting process facilitates the computation process. According to these points, a more accurate computation result can be obtained.

Note that to facilitate understanding of the process by the CV computation means 20, FIGS. 7(a) and 7(b) shows development of a 360-degree full circumference spherical image obtained by combining. images taken by one or more cameras, according to the Mercator projection used for projecting maps. However, in actual CV computation, the image is not necessarily an image developed according to the Mercator projection.

Next, the error minimizing unit 24 computes and obtains multiple vectors based on each feature point according to multiple possible computation equations caused by multiple camera positions corresponding to each frame and multiple feature points, applies a statistical process so as to minimize the distributions of the positions of the feature points and the camera positions, thus obtaining a final vector. For example, for the camera positions for multiple frames, camera rotation, and multiple feature points, an optimal solution of the method of least squares is estimated according to the Levenberg-Marquardt method, to calculate the camera positions, the rotation matrix of the camera, and coordinates of feature points with errors converged.

Furthermore, feature points having large distributions of errors are removed, and computation is performed again on the basis of the other feature points, thereby improving the accuracy of computation at each feature point and each camera position.

As described above, the positions of the feature points, and the camera vectors can be accurately obtained.

FIGS. 9(a) to 11 show an example of three-dimensional coordinates and camera vectors of the feature points obtained by CV computation. FIGS. 9(a) to 11 illustrates a vector detecting method through CV computation in this embodiment, and are diagrams showing the relative positional relationships between the cameras and objects obtained through multiple frame images obtained by the moving camera.

Figure 7:
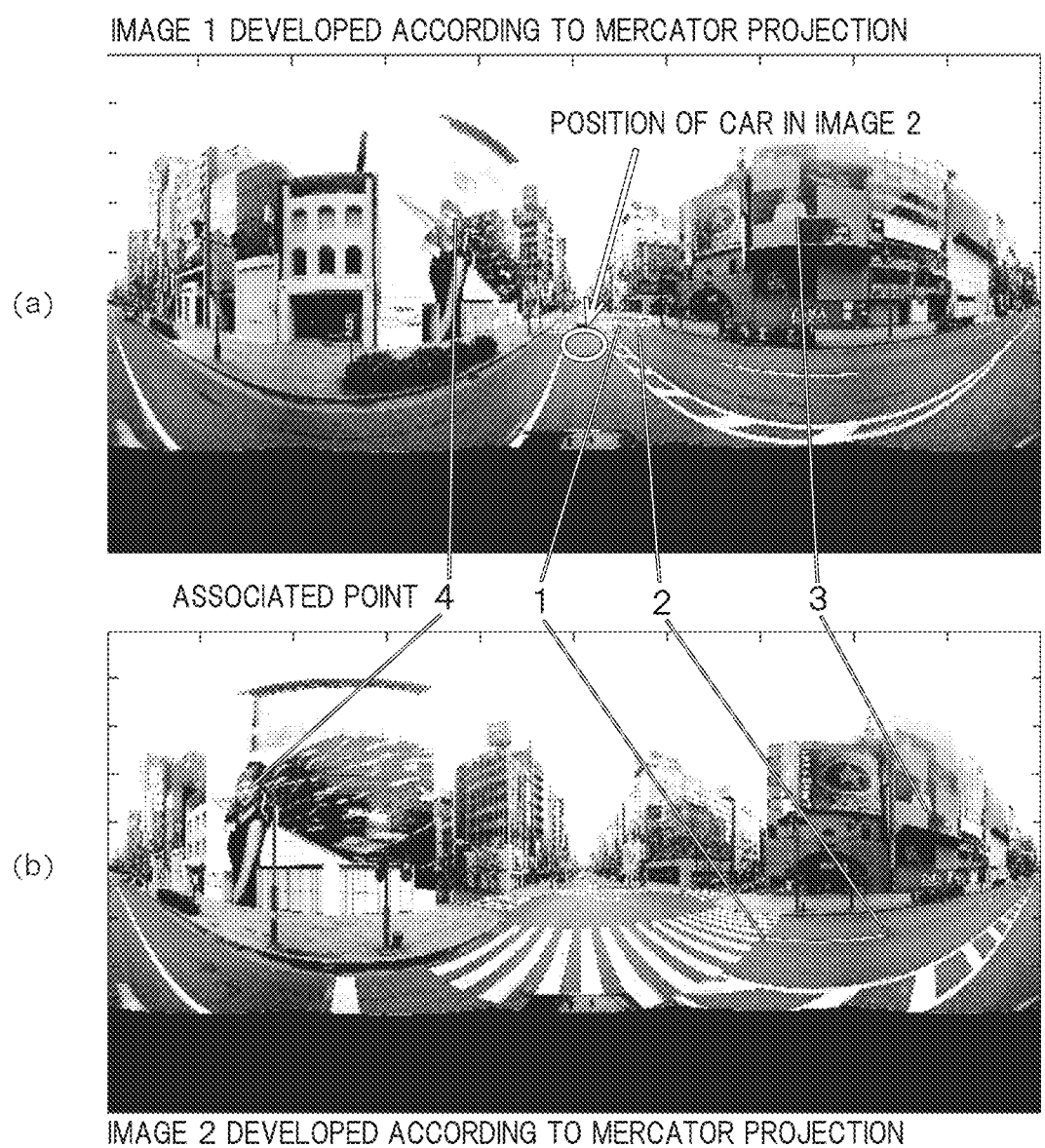
FIGS. 7(a) and 7(b) illustrate a specific method of detecting camera vectors in the CV computation means according to one embodiment of the invention.

FIGS. 9(a), 9(b) and 9(c) the three-dimensional coordinates of the feature points 1 to 4 shown in the images 1 and 2 in FIG. 7 FIGS. 7(a) and 7(b), and the camera vectors (X, Y, Z) moving between the image 1 and the image 2.

Figure 10:
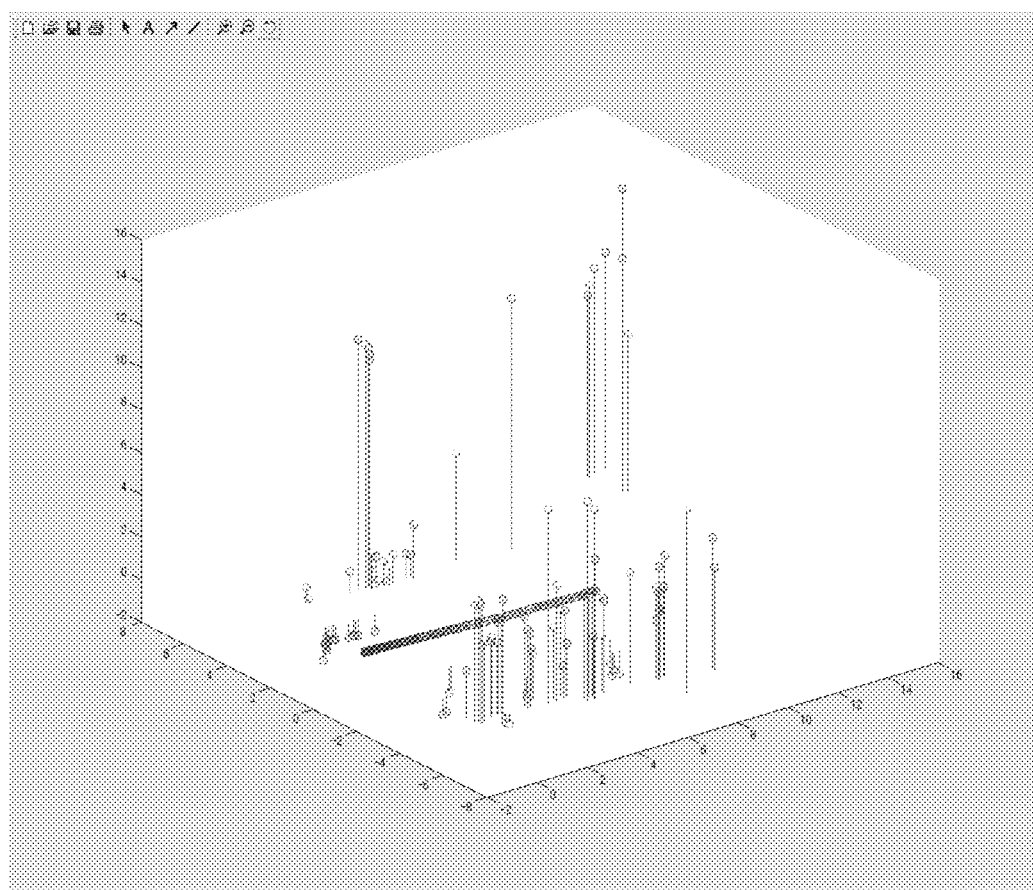
FIG. 10 is a graph showing an example of three-dimensional coordinates of the feature points and the camera vector obtained by the CV computation means according to one embodiment of the invention.
Figure 11:
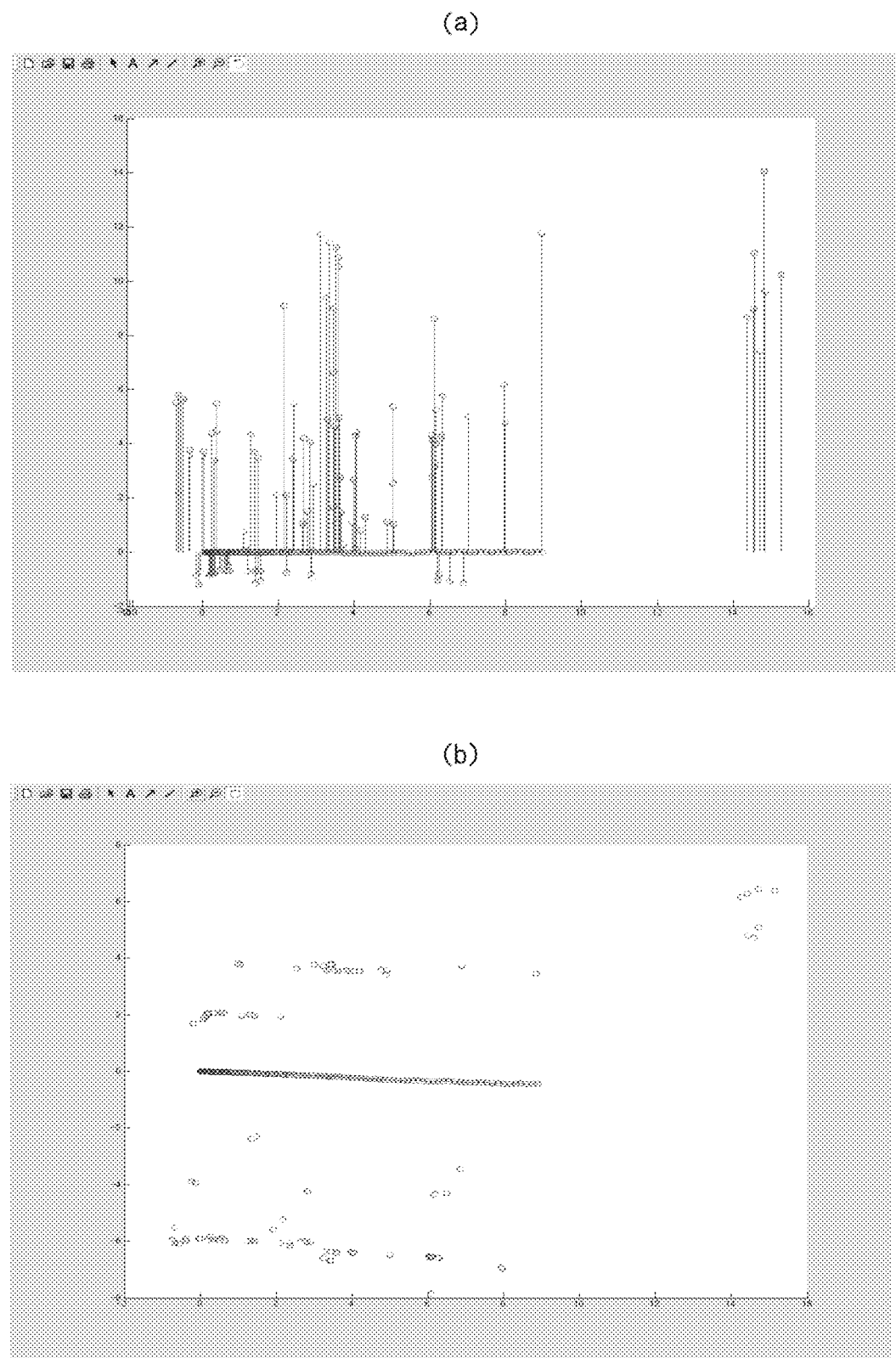
FIGS. 11(*a*) and 11(*b*) are graphs showing an example of three-dimensional coordinates of the feature points and the camera vector obtained by the CV computation means according to one embodiment of the invention.

FIGS. 10, 11(a) and 11(b) show the positions of the feature points obtained from the sufficient number of feature points and frame images, and the positions of the moving camera. In the diagrams, open circles linearly consecutive at the center of the graphs indicate the camera positions, and open circles positioned therearound indicate the positions and heights of the feature points.

Figure 12:
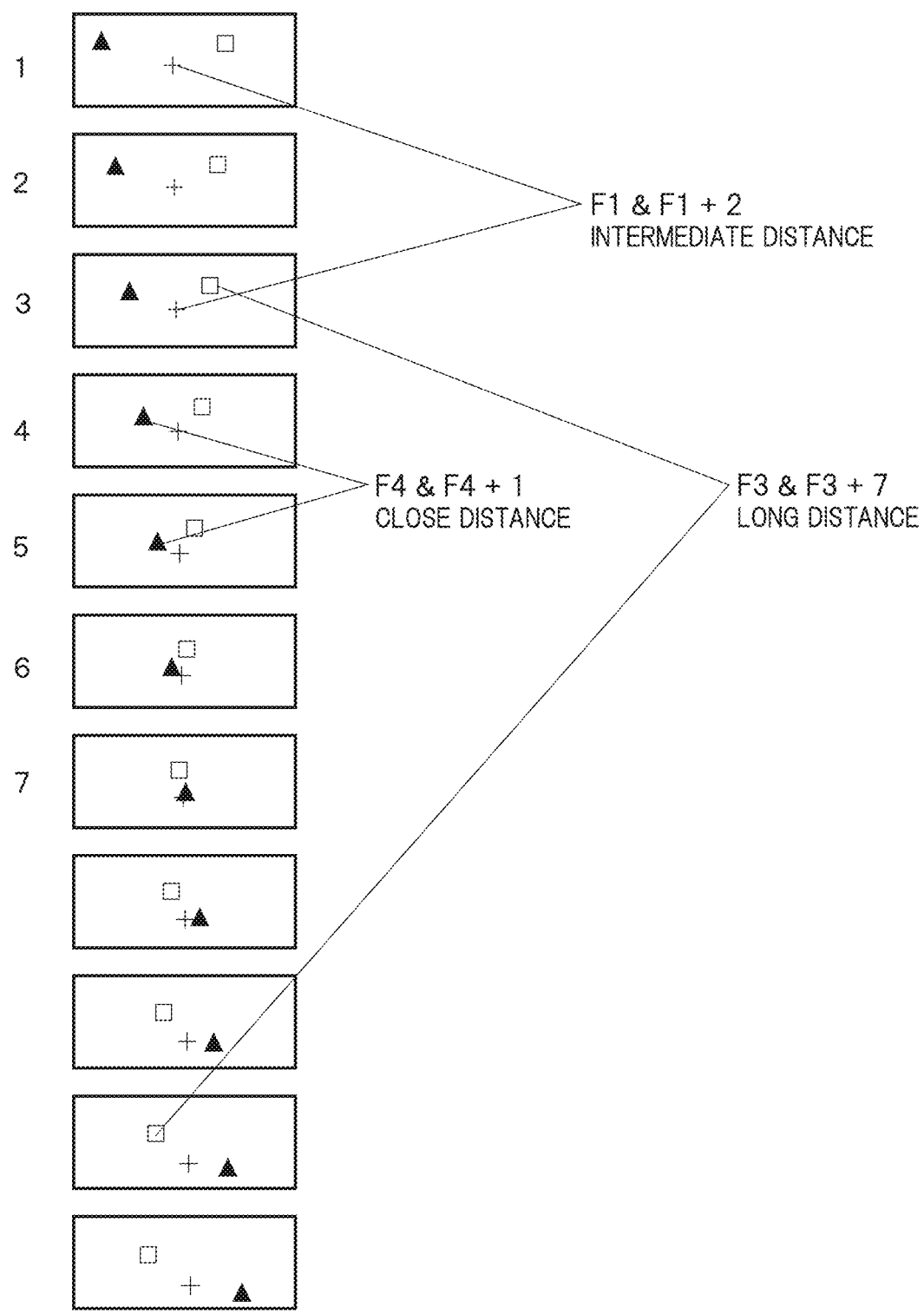
FIG. 12 illustrates a case where the CV computation means according to one embodiment of the invention sets a plurality of feature points depending on distances between the feature points from the camera, tracks the points over adjoining frames, and repetitively performs a plurality of computations.

Here, to obtain more highly accurate three-dimensional information on the feature points and the camera positions, as shown in FIG. 12, the CV computation by the CV computation means 20 sets multiple feature points depending on the distance from the camera to the feature points, and repetitively performs computation multiple times.

Specifically, in the CV computation means 20, visually characterized feature points are automatically detected in the image. When the associated points of the feature points are obtained in each frame image, n-th and (n+m)-th two frame images Fn and Fn+m used for camera vector computation are focused on, and adopted as unit computation, and the unit computation with n and m being appropriately set can be repeated.

The m is a frame interval. The feature points are classified into multiple stages depending on the distance from the camera to the feature point in the image. It is set such that the larger the distance from the camera to the feature point is, the larger the m is. It is also set such that the smaller the distance from the camera to the feature point is, the smaller the m is. Such settings are made because the larger the distance from the camera to the feature point is, the smaller the variation in position between the images is.

Multiple stages of m values are set while classification depending on the m values of the feature points sufficiently overlap each other. As the image progresses, the computation is consecutively advanced in response to consecutively progressing n. At advancement of n and each stage of m, computation is performed multiple times for the identical feature point.

As described above, by performing unit computation focusing on the frame images Fn and Fn+m, accurate camera vectors are computed over time between frames (dropping between frames) sampled every m frames. Simple computation that can be performed by a short-time process may be adopted for m frames (minimum unit frames) intervening between the frame images Fn and Fn+m.

If there is no error in every m-th accurate camera vector computation, both the ends of the m-frame camera vectors overlap highly accurately computed Fn and Fn+m camera vectors. Accordingly, the m consecutive camera vectors can be scale-adjusted such that m minimum unit frames intervening between Fn and Fn+m can be obtained by simple computation, and both the ends of the camera vectors of the m minimum unit frames obtained by the simple computation can conform to the camera vector Fn and Fn+m obtained by highly accurate computation.

As described above, as the image advances, n consecutively advances, which can achieve scale adjustment and integration so as to minimize the errors of the respective camera vectors computed multiple times for each identical feature point, and determine the final camera vector.

Accordingly, the highly accurate camera vector with no error is obtained, to which the simple computation is applied in a combined manner, which can increase the speed of the computation process.

Here, the simple computation may be made by any of various methods depending on the accuracy. For example, (1) a method of using about 10 feature points, which is the minimum in simple computation, while highly accurate computation should have used many, 100 or more, feature points. (2) If the same number of feature points is assumed but the feature points and the camera positions are assumed equivalently, innumerable triangles are formed there, and the same number of equations holds; reduction in the number of equations allows simple computation to be adopted.

Accordingly, integration is achieved in a manner where scale adjustment is performed so as to minimize the error of each feature point and each camera position, distance computation is performed, furthermore, feature points having large error distributions are removed, and other feature points are recomputed as required, thereby allowing the accuracy of computation to be improved at each feature point and each camera position.

By performing high-speed simple computation as described above, the camera vectors can be processed in a manner close to that in real time. The high-speed computation process of the camera vector can perform computation with the minimum number of frames for achieving an intended accuracy and with the minimum number of automatically extracted feature points, obtain an approximate value of the camera vector through high-speed computation, and display the value. Next, as the images are accumulated, this process can increase the number of frames, increase the number of feature points, perform camera vector computation having a higher accuracy, replace the approximate value with the camera vector value having a high accuracy, and display the value.

Furthermore, in this embodiment, to obtain more highly accurate camera vectors, three-dimensional information (three-dimensional shapes) can be tracked.

Specifically, first, the three-dimensional information tracking unit 25 regards the camera vectors obtained by the camera vector computation unit 23 and the error minimizing unit 24 as schematic camera vectors, and automatically continuously tracks partial three-dimensional information included in the multiple frame images along the adjoining frame images on the basis of the three-dimensional information (three-dimensional shape) obtained as part of images generated in a subsequent process.

From a tracking result of the three-dimensional information obtained by the three-dimensional information tracking unit 25, the highly accurate camera vectors can be obtained by the high-accuracy camera vector computation unit 26.

The feature point extraction unit 21 and the feature point association processing unit 22 automatically track the feature points in images between multiple frames. However, the number of feature point tracking frames are sometimes limited owing to lack of feature points or the like. The images are two-dimensional, and the shapes change during tracking. Accordingly, there is a certain limitation on the tracking accuracy.

Accordingly, the camera vector obtained by the feature point tracking is regarded as an approximate value. Three-dimensional information (three-dimensional shape) obtained in a subsequent process can be tracked on each frame image, and the highly accurate camera vector can be obtained from the trajectory.

The three-dimensional shape tracking can easily achieve matching and correlation accuracies. The three-dimensional shape and size do not change according to the frame image. Accordingly, tracking can be made over many frames, thereby allowing the accuracy of the camera vector computation to be improved. The improvement can be achieved because the camera vector computation unit 23 has already known an approximate camera vector, and has already known the three-dimensional shape.

In a case where the camera vector has an approximate value, the errors of the three-dimensional coordinates over a significant number of frames become gradually larger over long distances owing to accumulation of the error because the number of frames related to each frame where feature points are tracked is small. However, the errors of the three-dimensional shapes when part of the image is clipped are relatively small. The change in shape and the effects on the size are significantly small. Accordingly, comparison and tracking of the three-dimensional shapes are significantly advantageous in comparison with the case of two-dimensional shape tracking. As for tracking, in a case of tracking with the two-dimensional shape, tracking is performed while the change in shape and change in size between multiple frames cannot be avoided. Accordingly, there is a problem in that the error is large, and no associated point is found. On the other hand, in the case of tracking with the three-dimensional shape, the change in shape is significantly small, and there is no change in size in principle. Accordingly, correct tracking can be achieved.

Here, three-dimensional shape data to be tracked may be, for example, the three-dimensional distribution shape of feature points, and polygon planes obtained from the three-dimensional distribution shape of feature points.

The obtained three-dimensional shape may be converted into a two-dimensional image on the basis of the camera position, and the two-dimensional image may be tracked. The approximate value of the camera vector has already been known. Accordingly, projection conversion into a two-dimensional image from the camera viewpoint can be achieved, and change in target shape due to movement of the camera viewpoint can be tracked.

The camera vector obtained as described above can be displayed to be overlaid on the video taken by the full circumference video camera 11.

Figure 13:
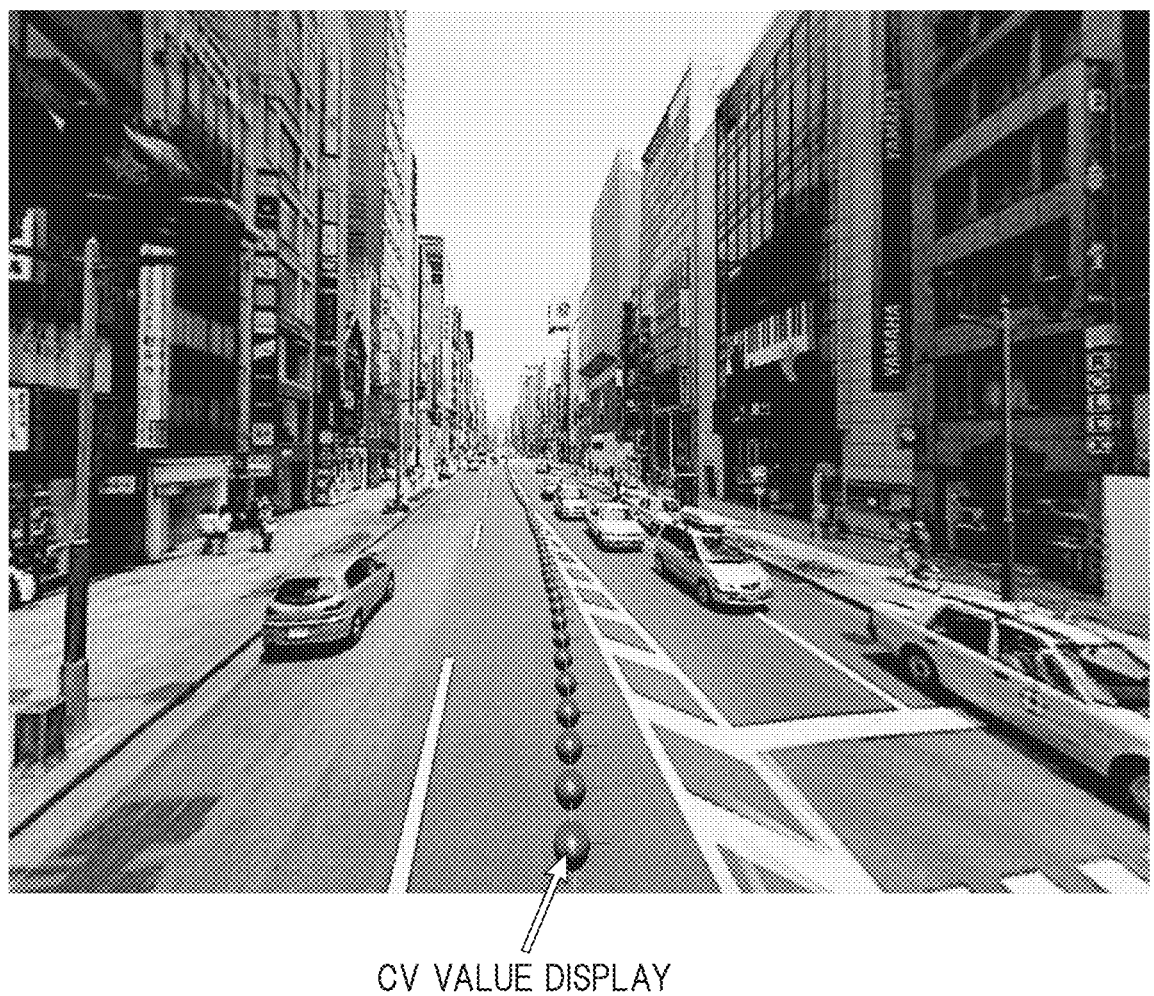
FIG. 13 shows a case where a trajectory of the camera vector obtained by CV data computation means according to one embodiment of the invention is displayed in a video.

For example, as shown in FIG. 13, the video from the vehicle mounted camera is planarly developed, associated points on target planes in corresponding frame images are automatically searched for, and the images are combined so as to match the associated points with each other to generate a combined image of the target plane, and the image is displayed on the same coordinate system in an integrated manner.

Furthermore, the camera positions and the camera directions can be consecutively detected in the common coordinate system, and the positions, the directions, and trajectories can be plotted. CV data indicates the three-dimensional position and the three-axis rotation. By displaying the data on the video in an overlaid manner, CV values in corresponding frames of the video can be observed at the same time. FIG. 13 shows an image example where CV data is overlaid on a video.

Note that when the camera position is correctly displayed in the video, the position indicated by the CV value in the video is centered at the image. When the camera movement is close to linear one, the CV values of all the frames are displayed to be overlaid on each other. Accordingly, for example, as shown in FIG. 13, it is appropriate to purposely display the position one meter directly below the camera position. It is further appropriate to display the CV value at the height of the road surface with reference to the distance to the road surface.

Based on the CV value obtained as described above, the RV value and MV value described above can be obtained.

FIG. 14 schematically shows the relationship among the CV value, the RV value, and the MV value.

The RV value can be obtained as six variables obtained by substituting the CV value having six variables of the camera position and attitude with reference to the stationary coordinate system, in the six variables about the positions and attitudes of the moving body and the camera, and by converting the relationship into that between the stationary coordinate system and the moving body.

The MV value can be obtained as six variables indicating the direct relationship between the stationary coordinate system and the moving body coordinate system, by removing the camera coordinate system of elements common to the CV value and the RV value.

[Recognition and Positioning Device]

Next, an embodiment of the recognition and positioning device according to the invention that performs a view point moving and display process for any point and any object in an object video (CV video) assigned the CV value, the RV value and the MV value obtained as described above, the view point moving and display process being executed based on the object video, is specifically described with reference to the drawings.

Figure 15:
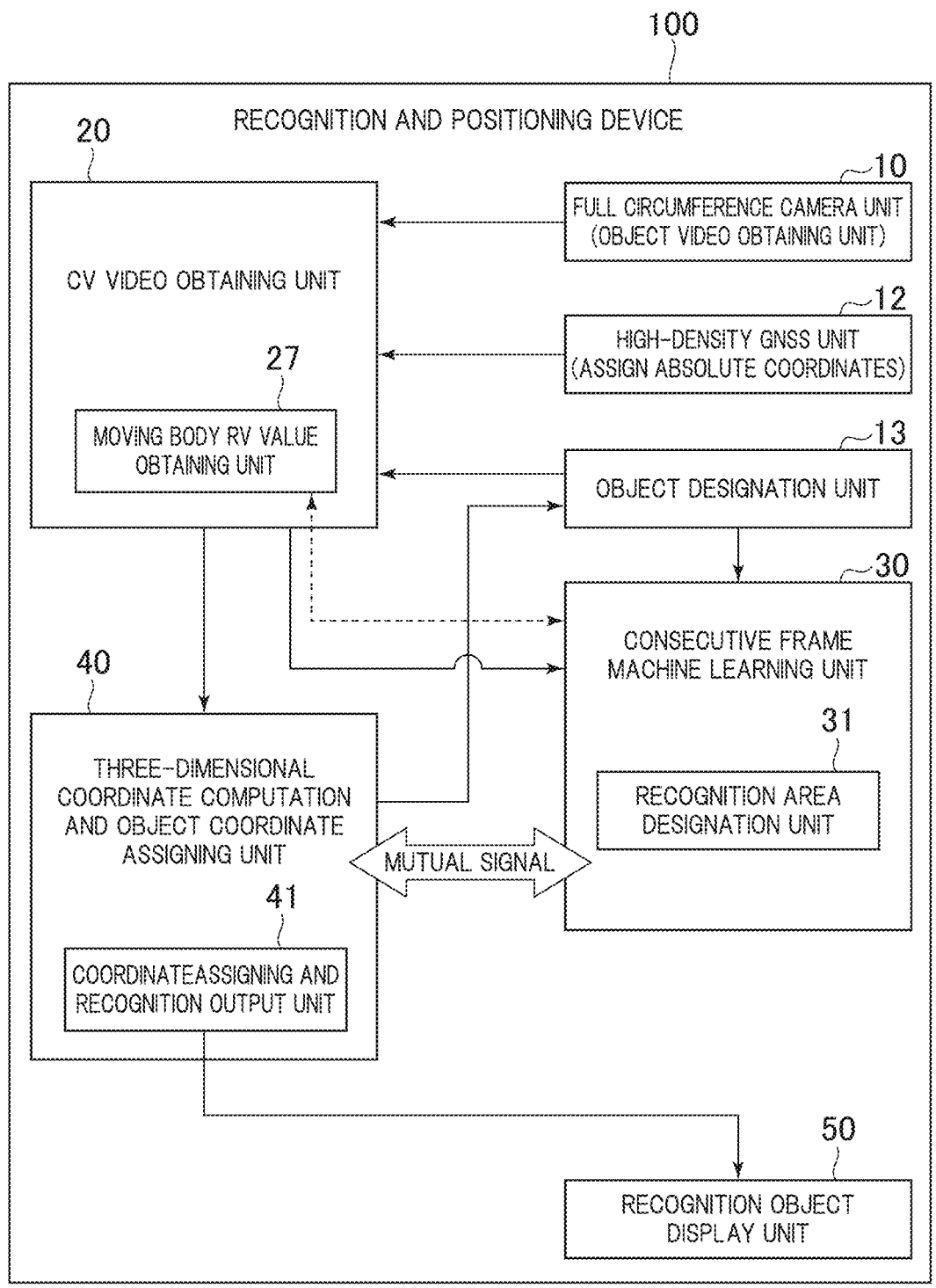
FIG. 15 is a block diagram showing a basic configuration of the recognition and positioning device according to one embodiment of the invention.

FIG. 15 is a block diagram showing a basic configuration of the recognition and positioning device 100 according to one embodiment of the invention.

Note that according to this embodiment shown in the diagram, as the recognition and positioning device 100, a device configuration that integrally includes the object video obtaining unit (full circumference camera unit) 10 and the CV video obtaining unit 20. It is, however, a matter of course that one or both of the object video obtaining unit 10 and the CV video obtaining unit 20 can be provided as independent configuration elements separated from the recognition and positioning device 100.

As shown in FIG. 15, the recognition and positioning device 100 according to this embodiment is a device and means for assuming, as a premise, the object video (CV video) assigned the CV value described above, and that any object and any point in the video are designated and selected to thereby recognize objects in the image from the video (moving image) with respect to the designated object and the like, and simultaneously obtain the three-dimensional coordinates of the recognized object, and consecutively performs them, thereby assigning highly accurate three-dimensional coordinates to each object in the video.

Specifically, as shown in FIG. 15, the recognition and positioning device 100 according to this embodiment is configured so as to function not only as the full circumference camera unit (object video obtaining unit) 10 and the CV video obtaining unit 20, but also as units that are a high-density GNSS unit (absolute coordinate assigning unit) 12, an object designation unit 13, a consecutive frame machine learning unit 30, a three-dimensional coordinate computation and object coordinate assigning unit 40, and a recognition object display unit 50.

The full circumference camera unit 10 is the object video obtaining unit 10 shown in FIG. 1, and is means for taking and obtaining an object video (reference video) to be applied to the recognition and positioning device 100.

In this embodiment, as shown in FIGS. 1 to 3 described above, the full circumference camera unit 10 includes the moving body 11a, such as a traveling vehicle provided with the full circumference video camera 11. For the sake of obtaining the reference video, the moving body 11a travels on a predetermined road in a certain range, thereby allowing the full circumference video camera 11 provided for the moving body 11a to take and obtain the object video around the moving body in response to the travel of the moving body 11a.

The object video taken by the full circumference camera unit 10 is input into the CV video obtaining unit 20, and a CV video creating process based on the CV computation described above is performed (see FIGS. 1 to 14).

The CV video obtaining unit 20 is CV video obtaining means for performing CV computation that obtains the relationship between the camera coordinate system for the object video taken by the full circumference camera unit 10 serving as predetermined video obtaining means, and the stationary coordinate system, that is, the CV (camera vector) value indicating the three-dimensional coordinate values and attitude values of the camera position and the attitudes, and for generating a CV video where the object video is assigned the CV value.

The CV video obtaining unit 20 functions as a moving body RV value obtaining unit 27 that performs an RV computation for a moving body moving in the CV video, the RV computation obtaining the aforementioned RV value (see FIG. 14) indicating a relationship between the camera coordinate system and the moving body coordinate system.

Specifically, the CV video obtaining unit 20 includes the CV computation means shown in FIGS. 1 to 14 described above. Specific details of the CV computation by the CV video obtaining unit 20 are as described above (see FIGS. 1 to 14).

The high-density GNSS unit 12 is an absolute coordinate assigning unit that obtains the absolute coordinates of an object serving as a target, using GNSS (Global Navigation Satellite System), and can be made up of a position measurement instrument that may be a GPS device or an IMU device, for example.

Such a high-density GNSS unit 12 is included, thereby allowing the CV value indicating a relative coordinate position to be calibrated with the absolute coordinates and converted into that in the absolute coordinates.

The object designation unit 13 functions as means for designating an identical object captured throughout a plurality of consecutive frames of the CV video, as a target object to be recognized.

Figure 23:
FIG. 23 shows an example of an image generated and output by the recognition and positioning device according to one embodiment of the invention.

The object (e.g., utility pole, sign, etc.) designated in the CV video by the object designation unit 13 serves as an object of machine learning, that is, an object to which a machine learning process is to be applied by the consecutive frame machine learning unit 30 (see FIG. 23).

Here, designation of the object by the object designation unit 13 can be achieved by selecting and designating any object in the CV video, according to an input operation through an input device (e.g., mouse etc.) provided for the recognition and positioning device 100.

The consecutive frame machine learning unit 30 functions as machine learning means for repetitively executing the recognition process through machine learning, for the object (see FIG. 23) designated by the object designation unit 13.

Here, "machine learning" is an artificial intelligence technology that extracts useful laws, rules, determination reference and the like from input data, and repeats repetitive learning, thereby autonomously generating laws, rules and the like for the newly input data and developing.

Specifically, machine learning that provides training data for recognizing, for example, "utility pole" can inputs, into a machine learning tool, training data (each image indicating "utility pole") predetermined times (e.g., about 6000 times (items)) and causes this tool to learn, thereby allowing autonomous recognition and output of "utility pole" from subsequently input image data. For such machine learning, a publicly known technology (machine learning tool) can be used. The recognition and positioning device 100 according to this embodiment is made up of a computer and the like including such a machine learning tool, thereby achieving such machine learning.

The details of the recognition process by the consecutive frame machine learning unit 30 are described later with reference to FIG. 16.

The consecutive frame machine learning unit 30 functions as a recognition area designation unit 31 that executes the recognition process, for only one frame among the consecutive frames of the CV video, obtains area coordinates of a peripheral area including an object serving as a target, and designates a range of the area coordinates as a recognition area serving as an execution range of the recognition process where the object is present. Specifically, the consecutive frame machine learning unit 30 allocates the recognition area designated by the recognition area designation unit 31, over the adjoining frames where the object is present, and repetitively executes the recognition process, for the object in the recognition area.

The details of the recognition process with the recognition area designated by the recognition area designation unit 31 are described later with reference to FIG. 17.

The consecutive frame machine learning unit 30 can collectively execute the recognition process through machine learning, for the identical object as an aggregation of different pieces of information that include a plurality of directions and a plurality of distances, over all the frames of the CV video in which the object is possibly captured.

Furthermore, the consecutive frame machine learning unit 30 can extracts the moving body in the CV video as an object of the recognition process.

The details of the collective recognition process and the moving body recognition process by the consecutive frame machine learning unit 30 are described later with reference to FIGS. 18 to 22.

The three-dimensional coordinate computation and object coordinate assigning unit 40 functions as three-dimensional coordinate assigning means for associating the objects recognized by the consecutive frame machine learning unit 30 described above over all the frames of the CV video, obtaining coordinates of each of the objects captured in the CV video, identifying the objects having matched coordinates by confirming in the corresponding frames, and assigning three-dimensional position coordinates to the objects concerned.

Specifically, the three-dimensional coordinate computation and object coordinate assigning unit 40 functions as a coordinate assigning and recognition output unit that assigns three-dimensional coordinates to the objects about which a predetermined recognition certainty degree and a three-dimensional coordinate accuracy are obtained, by repeating recognition of the object and assigning of the three-dimensional coordinates between this unit and the consecutive frame machine learning unit 30 (see "mutual signal" of FIG. 1), and outputs the three-dimensional coordinates assigned to the objects.

The three-dimensional coordinate computation and object coordinate assigning unit 40 can identify the object having coordinates matched in the recognition area designated by the recognition area designation unit 31 of the consecutive frame machine learning unit 30 described above, by confirming the object in each frame, and assign the object the three-dimensional position coordinates.

Furthermore, the three-dimensional coordinate computation and object coordinate assigning unit 40 can identify the moving body and assign the three-dimensional position coordinates thereto, on the basis of the RV value of the moving body in the CV video.

The details of the identification process/three-dimensional coordinate assigning process by the three-dimensional coordinate computation and object coordinate assigning unit 40 are described together with the recognition process by the consecutive frame machine learning unit 30 with reference to FIGS. 16 to 22.

The recognition object display unit 50 functions as output means for outputting and displaying the CV video where the object is recognized, identified and assigned the three-dimensional coordinates as described above.

Specifically, the recognition object display unit 50 can generate and output a predetermined video indicating the object assigned the three-dimensional coordinates, on a display connected to the recognition and positioning device 100, for example (see FIGS. 23 to 29).

For example, the recognition object display unit 50 displays the target object (e.g., utility pole etc.) so as to allow the object designation unit 13 to select and designate the identical object captured in consecutive frames generated by the CV video obtaining unit 20 (see FIG. 23).

Figure 24:
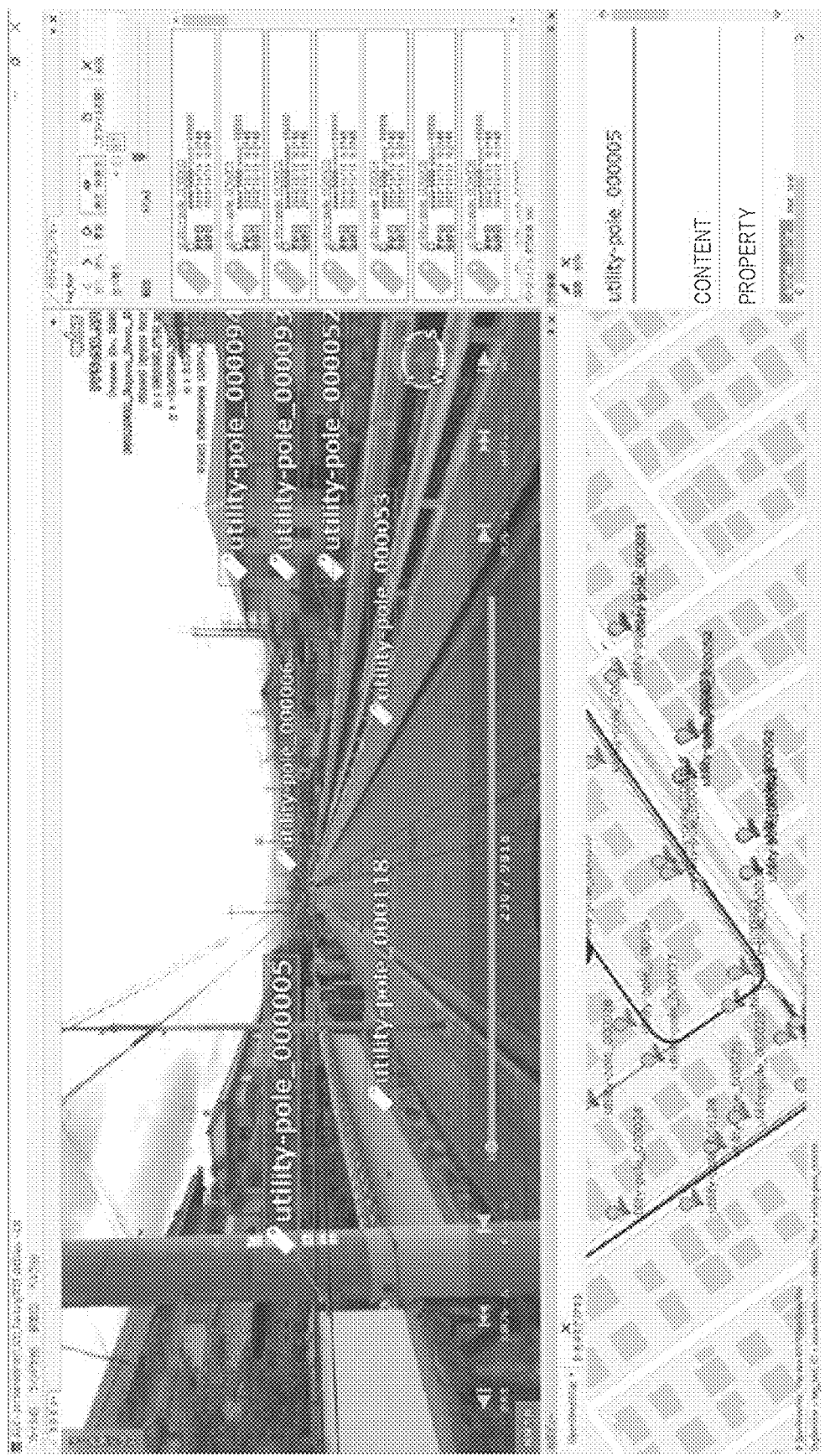
FIG. 24 shows another example of an image generated and output by the recognition and positioning device according to one embodiment of the invention.
Figure 25:
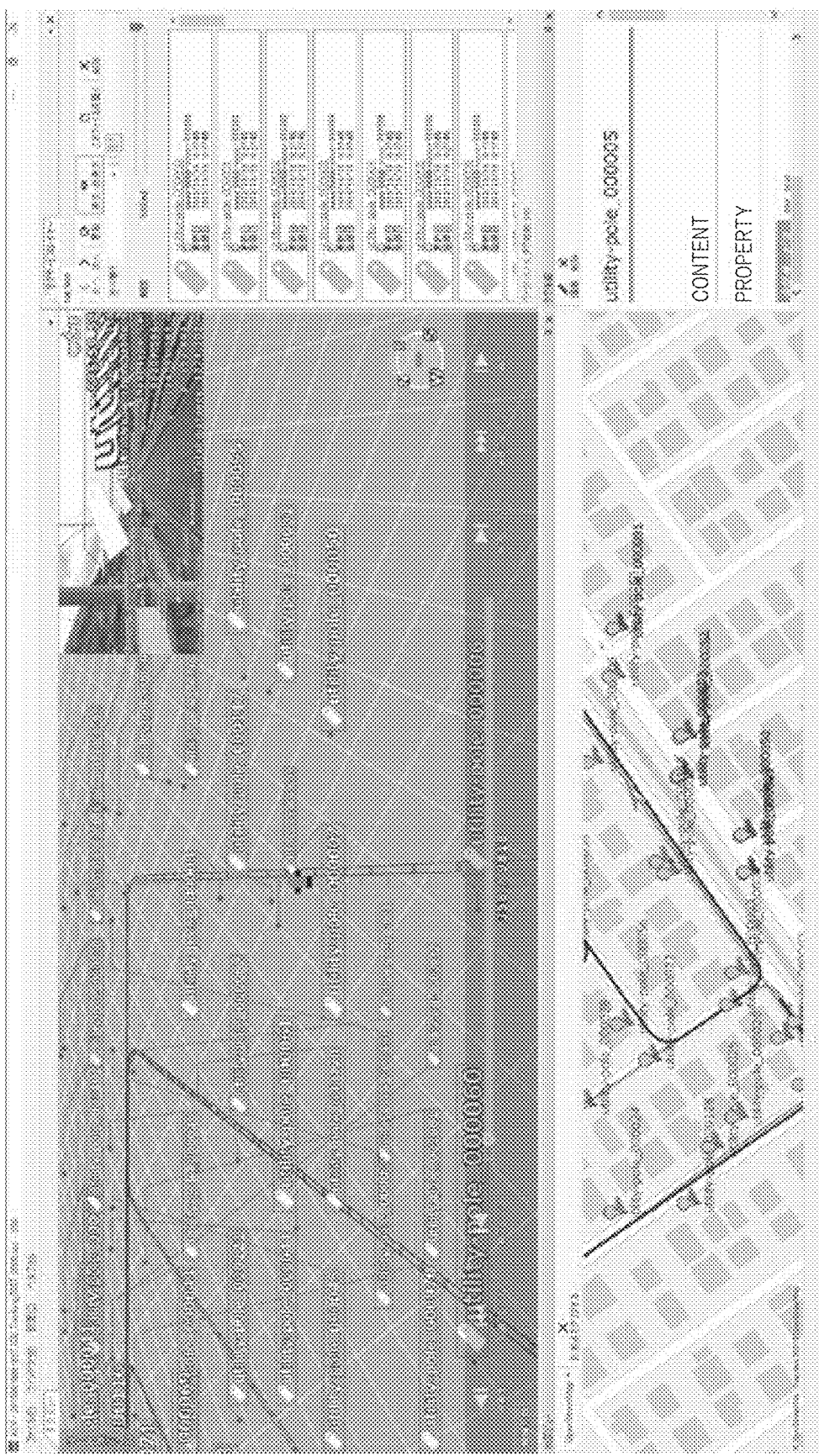
FIG. 25 shows still another example of an image generated and output by the recognition and positioning device according to one embodiment of the invention.

The recognition object display unit 50 can display identification information on the object (utility pole etc.) recognized and identified in the CV video and assigned the three-dimensional coordinates, on the CV video or a two-dimensional map, by plotting the information (see FIGS. 24 and 25).

Figure 26:
FIG. 26 shows yet another example of an image generated and output by the recognition and positioning device according to one embodiment of the invention.

The recognition object display unit 50 can display the identification information (tag) assigned to the specific object ("utility pole") displayed on the CV video in a manner allowing the information to be edited (see FIG. 26).

Figure 27:
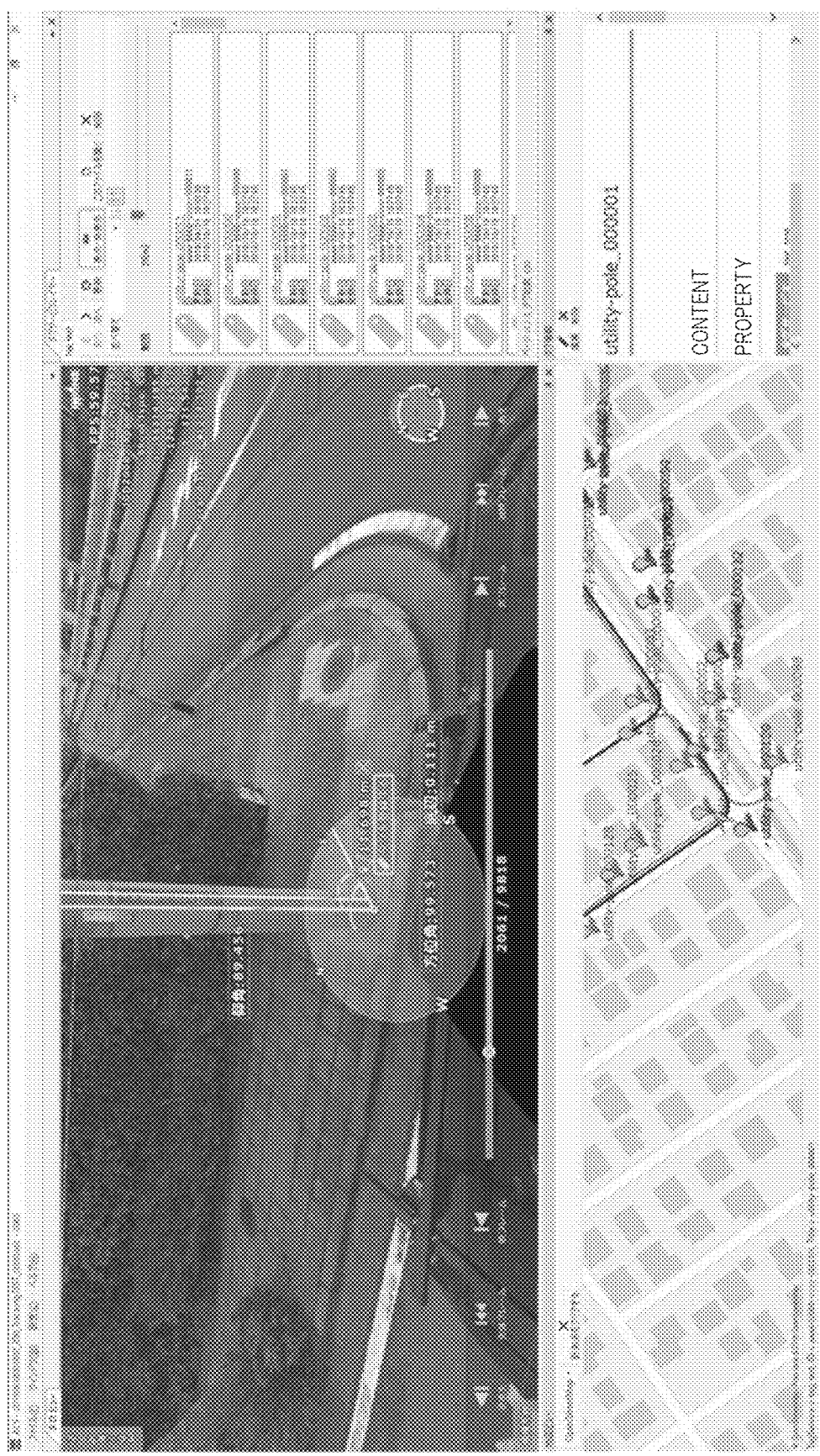
FIG. 27 shows still another example of an image generated and output by the recognition and positioning device according to one embodiment of the invention.

The recognition object display unit 50 can movably display the angle of vision of the specific object (utility pole etc.) displayed on the CV video, and display a measurement result of the height, the inclination, the azimuth and the like based on the CV value assigned to the object concerned (see FIG. 27).

Figure 28:
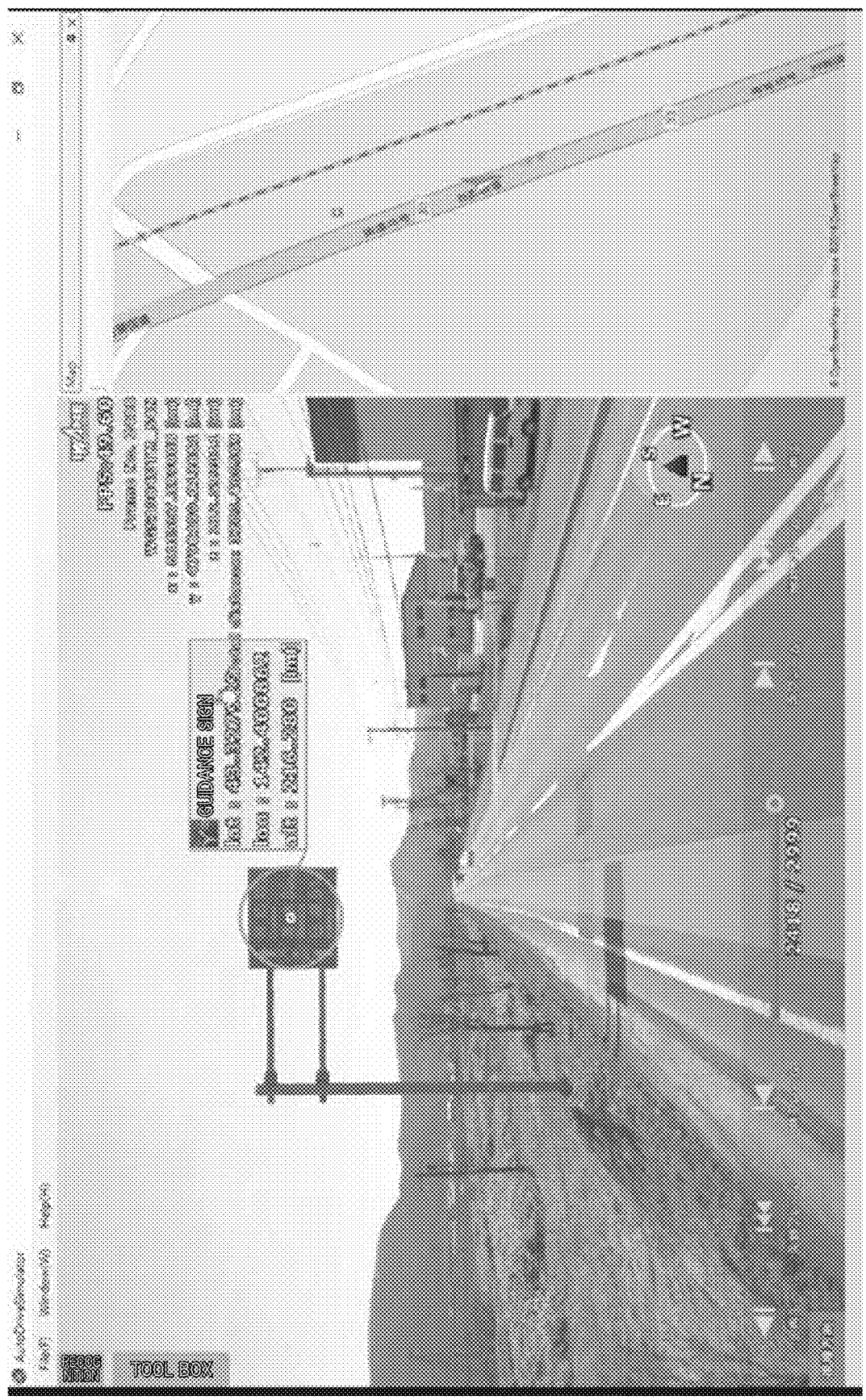
FIG. 28 shows yet another example of an image generated and output by the recognition and positioning device according to one embodiment of the invention.
Figure 29:
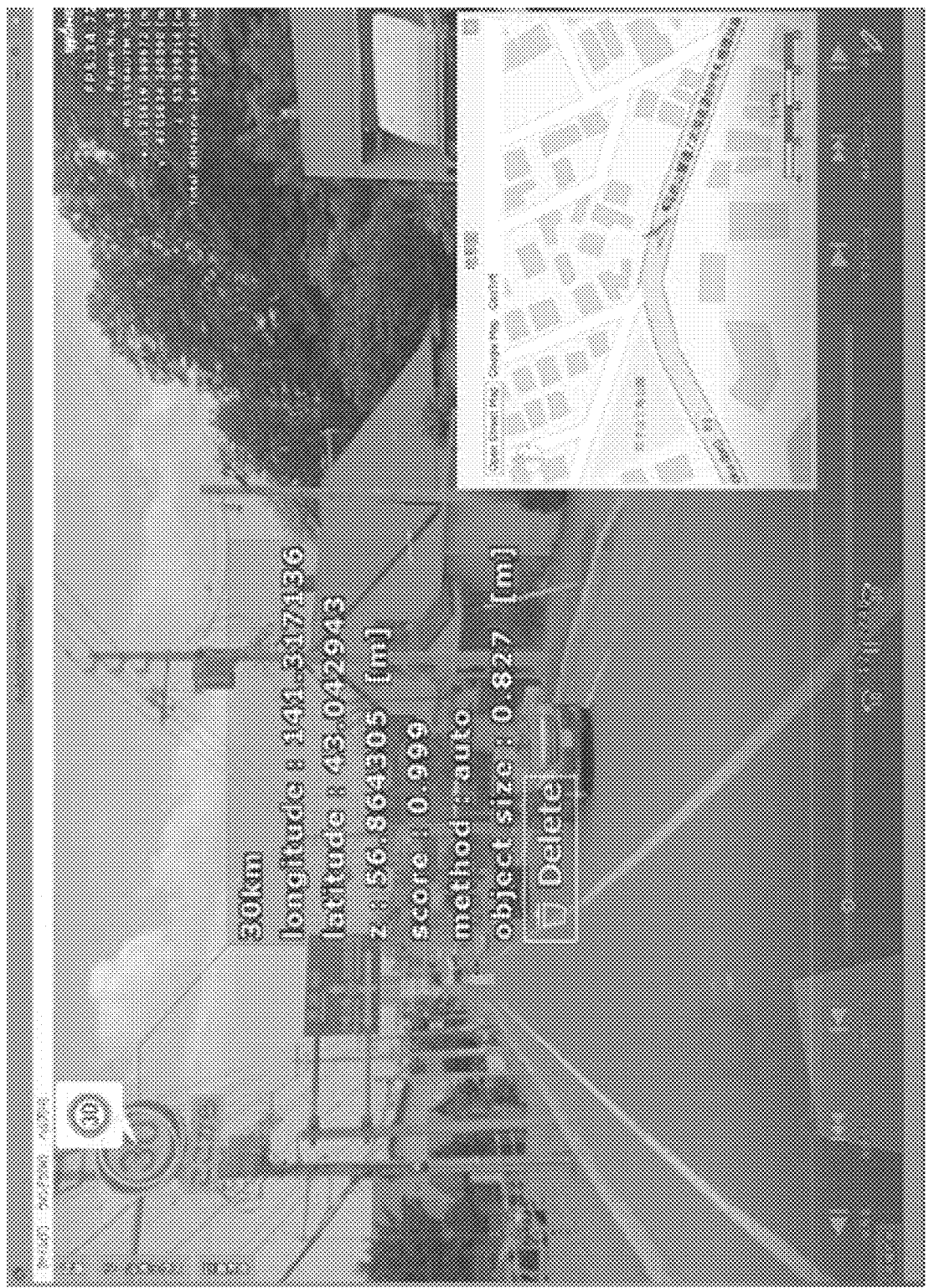
FIG. 29 shows an example of an image generated and output by the recognition and positioning device according to one embodiment of the invention.

Furthermore, the recognition object display unit 50 can display position information and attribute information on the object (guidance sign, traffic sign, etc.) recognized and identified in the CV video and assigned the three-dimensional coordinates, on the CV video (see FIGS. 28 and 29).

[Processing Operation]

Next, the details of the processes and operations of recognition, identification, and assigning three-dimensional coordinates (a recognition and positioning method) by the recognition and positioning device 100 having the configuration as described above are described with reference to FIGS. 15 to 22.

[Recognition of all Frames/Obtainment of Three-Dimensional Coordinates]

First, as a basic processing operation in the recognition and positioning device 100, a processing operation where recognition of all the frames is performed, and three-dimensional coordinates therefrom are obtained is described.

For the identical object captured throughout consecutive frames of the CV video, the recognition and positioning device 100 designates the target object to be recognized, applies machine learning, executes a recognition operation, and at the same time, associates the object throughout all the frames during recognition or in a recognition result, and obtains the coordinates of each object captured in the CV video.

The object having matched coordinates is identified by confirmation in each frame. If the coordinates do not match, the object is removed. At the same time of identification of the object by recognition, the three-dimensional position coordinates of the recognized object are assigned to a recognition result (object), which is then output. If necessary, the attitude, movement direction, three-dimensional shape and the like of the object are obtained, assigned to the recognition result, and are output.

Specifically, as shown in FIG. 1, for the identical object captured over consecutive frames generated by the CV video obtaining unit 20, the object designation unit 13 designates the target object to be recognized (see FIG. 23).

In some cases, a larger range is designated as an area so as to internally include the object. Alternatively, an area where the object resides may be captured in a manner of coloring art, by segmentation of two-dimensional area division, thus designating the object.

Here, designation of the object can be achieved by selecting and designating any object in the CV video, according to an input operation through an input device (e.g., mouse etc.) provided for the recognition and positioning device 100.

Next, the consecutive frame machine learning unit 30 applies machine learning and the like, repetitively executes the recognition operation, while improving the certainty degree and the coordinate accuracy, and at the same time, exchanges a mutual signal between this unit and the three-dimensional coordinate computation and object coordinate assigning unit 40, associates the object as a recognition result throughout all the frames, obtains the coordinates of each object from the CV video, and confirms the object having the matching coordinates, thereby identifying the object.

If the coordinates do not match, the object is removed. At the same time of identification, the three-dimensional position coordinates of the associated object are obtained. If necessary, the attitude, movement direction, three-dimensional shape and the like of the object are also obtained.

By repeating exchange of the mutual signal between the consecutive frame machine learning unit 30 and the three-dimensional coordinate computation and object coordinate assigning unit 40, the repetitive computation is executed until the intended three-dimensional coordinate accuracy and recognition certainty degree are achieved, and the object is assigned the three-dimensional coordinates by a coordinate assigning and recognition output unit 41, and output.

To display the output, the recognition object display unit 50 can display the recognized object and the three-dimensional coordinates in the CV video at the same time (see FIGS. 23 to 29).

Here, the "mutual signal" shown in FIG. 15 means that the signal is exchanged between the consecutive frame machine learning unit 30 and the three-dimensional coordinate computation and object coordinate assigning unit 40 to interdependently improve the accuracy, and the repetitive computation is executed until the intended certainty degree and accuracy are obtained.

Typically, the machine learning often applies machine learning to the object in the two-dimensional video using training data. Machine learning over the individual frames of the video allows machine learning to be applied to the identical object over multiple frames. Accordingly, the recognition rate can be improved, and at the same time, the three-dimensional coordinates can be accurately obtained by tracking the object in the video.

As described above, based on the CV video, by tracking any feature point or feature area in the image over adjoining frames, the three-dimensional coordinates can be obtained. Using the function, the object is recognized over multiple frames, and at the same time, a part of or the entire object is tracked over the adjoining frames, thereby allowing the three-dimensional coordinates of the entire or part of the object to be obtained.

If repetitive exchange of the "mutual signal" between the consecutive frame machine learning unit 30 and the three-dimensional coordinate computation and object coordinate assigning unit 40 improves the certainty degree of the object recognition, the accuracy of the three-dimensional coordinates is also improved.

The recognition and positioning device 100 according to the invention is characterized by recognizing an identical object from a moving image, and identifying the object when the three-dimensional coordinates completely match. Accordingly, when object recognition is performed for, for example, 20 frames of image, all the 20 frames are identified at the same time, negating the possibility that a frame is not identified. Accordingly, it is expected that the identification accuracy is expected to be largely improved.

When the intended object is hidden behind another object (e.g., building), the coordinates are not determined for the frame. Accordingly, by removing the other object, recognition may be performed for 19 frames, and identified.

Furthermore, use of the CV video allows recognition of the object in one frame in the CV video at the minimum, instead of that of multiple frame images, and allows obtainment of the three-dimensional coordinates for two frames of video. Note that in this case, the object recognition in a single frame has lower accuracy than the recognition certainty degree of recognition of multiple frames.

Note that simultaneous use of multiple cameras allows the CV value to be obtained from multiple images without moving the cameras. Accordingly, even an immobile still image can be supported.

[Identification and Non-Identification]

Figure 16:
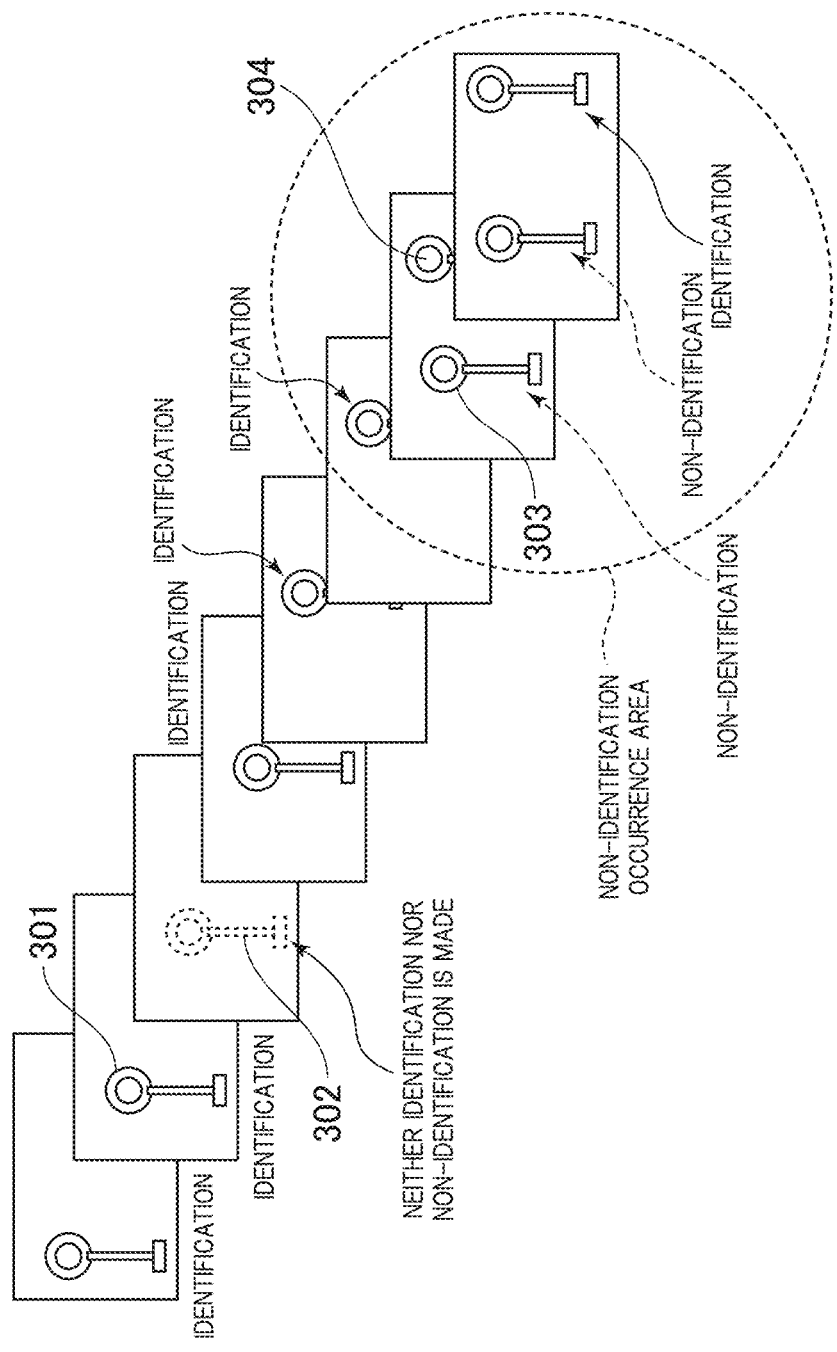
FIG. 16 schematically illustrates an example of an object recognition method in the recognition and positioning device according to one embodiment of the invention.

Next, referring to FIG. 16, an object identification and non-identification process in the recognition and positioning device 100 is described.

Typically, at the time when objects identified in a certain video is recognized, there is no guarantee that all the objects are the identical object. That is, not all the objects are identified as the identical object.

In this case, the objects can be classified into the following three patterns, as shown in FIG. 16.

(1) Objects 301/304 . . . to be identified
(2) An object 303 not to be identified
(3) An object 302 to which neither identification nor non-identification is made (1) is objects residing at expected coordinates, and are identified when the coordinates are identified.

(2) is a similar object residing at unexpected coordinates. There is an object 303 that has the completely same shape but have different coordinates and should not be identified accordingly. When there is an object to be identified at an adjacent place, or another object having the same shape also resides, the object is detected. For example, "utility poles" and the like have similar shapes and colors. Accordingly, all of them are identified as the identical object. This can be determined not to be identified after the coordinate values are verified, and is removed.

An erroneously recognized object is also classified into this (2), and is removed.

Furthermore, (3) is a case where no object is found at coordinates for identification. For example, the object is not captured because the object is hidden behind something from the camera position. In this case, when an object is identified in adjoining frames, the identification means that, of course, the object is hidden. Accordingly, the object can be determined to reside there.

Note that (1) to (3) described above also apply to a moving object (moving body). It is determined to be identified or not to be identified on the movement trajectory of the moving body or a predicted moving trajectory.

As described above, in the case of a stationary object, the object to be identified have the same three-dimensional coordinates among the frames.

That is, a recognition result can be confirmed that the object has the same coordinates among multiple frame images. Mismatch of the coordinates means that association is not made, and identification is not performed. Accordingly, this may be removed, and only identifiable object may be identified.

Accordingly, the recognition efficiency is improved. The three-dimensional coordinates and the attitude of the recognition object can be obtained at the same time; furthermore, the three-dimensional shape may be additionally obtained.

As described above, in the recognition and positioning device 100, for the CV video generated by the CV video obtaining unit 20, an identical object is identified among multiple frames of each frame image in the CV video, along with the three-dimensional coordinate computation and object coordinate assigning unit 40, machine learning and the like are applied by the consecutive frame machine learning unit 30, the recognition operation is executed, and at the same time, the three-dimensional position coordinates, attitude, and, if required, the movement direction, three-dimensional shape and the like can be obtained.

In the CV video, the object is recognized over all the frames, which can confirm that the position in the image is not contradicted. If contradicted, the object is a different object.

That is, an assumption holds that the objects are recognized at a predicted position at the same time, and the objects are the same object accordingly. Consequently, in comparison with recognition of a single frame image, the number of recognition processes increases, while the recognition probability and the accuracy of the obtained coordinates are significantly improved.

After the recognition of the object, highly accurate matching may be performed, which further improves the accuracy of the three-dimensional coordinates of the object.

Note that identification can be made also by easily obtaining approximate three-dimensional coordinates between at least two frames, allocating the three-dimensional coordinates to another frame, performing an object recognition process in proximity to the coordinates, and determining matching. In this case, through the mutual signal between the consecutive frame machine learning unit 30 and the three-dimensional coordinate computation and object coordinate assigning unit 40, data is frequently exchanged, which secures that recognition and three-dimensional coordinate determination are achieved resultantly at the substantially same time even if the coordinates are previously determined.

The recognition/identification process described above can executes the object recognition at the same time over all the frame images of the CV video.

In the CV video, the angle at which the object is viewed has already been known from the CV value. Accordingly, recognition can be made, with data being adopted as training data learned in a manner of including images at respective directions, with multiple frames at one time.

Furthermore, an identical object is viewed in different directions at different distances, thereby allowing training data to be automatically created. Accordingly, the device is effective also for creating training data for deep learning. This allows machine learning to advance in three-dimensional development. This applies to both a case with training data and a case without training data.

The object recognition and coordinate identification process in the recognition and positioning device 100 is thus completed as described above. In a subsequent process, signals obtained by division for multiple objects through an information conversion device described later can be three-dimensionally reconstructed by the image reconstruction and display device and displayed (see FIGS. 30 to 33).

[Object Coordinate Prediction]

Figure 17:
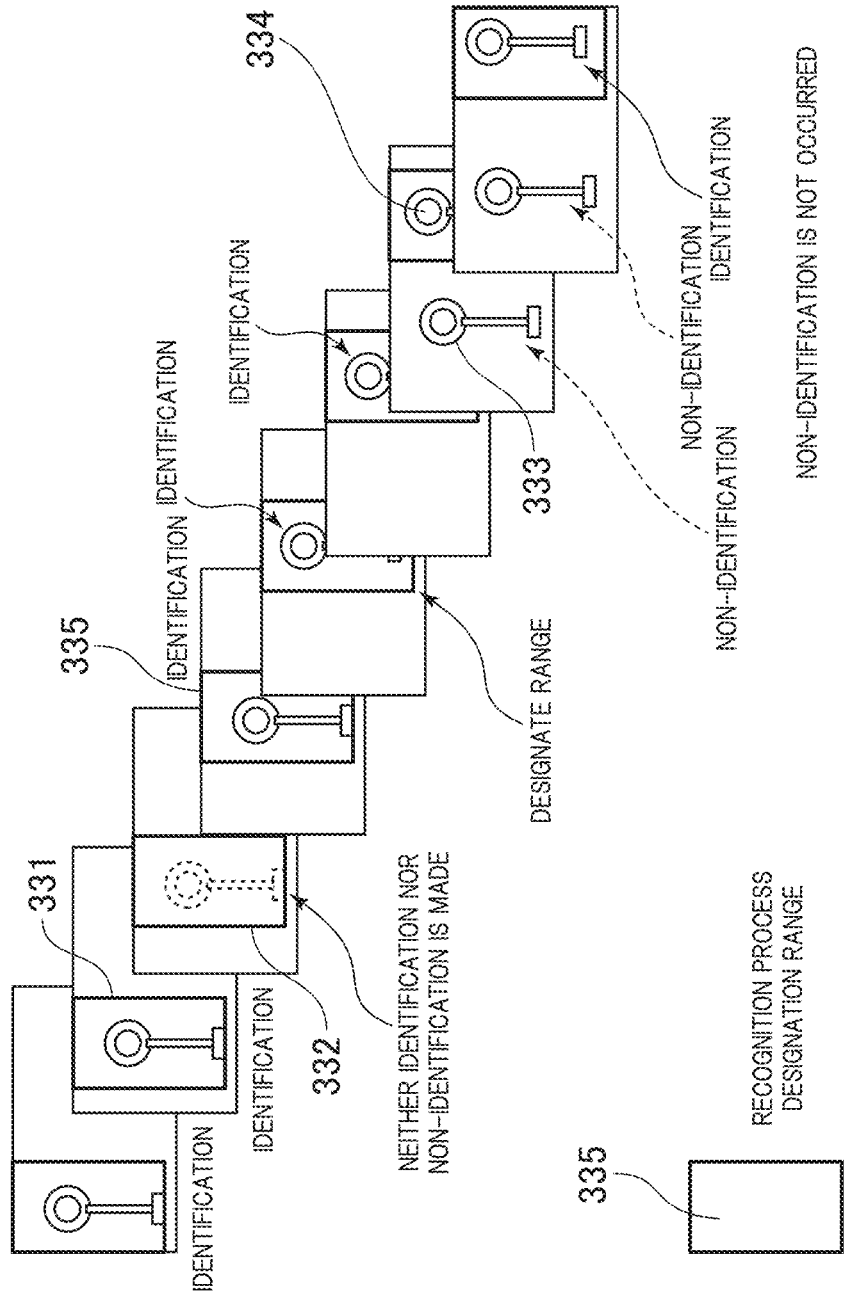
FIG. 17 schematically illustrates another example of an object recognition method in the recognition and positioning device according to one embodiment of the invention.

Next, referring to FIG. 17, as an object recognition/identification process in the recognition and positioning device 100, a case where the coordinates of the object are predicted in advance and the recognition process is then perform is described.

In the recognition and positioning device 100, first, the recognition operation is performed for only one frame of the CV video. The coordinates of the object, or peripheral area coordinates including the object are obtained. The range of the area coordinates is adopted as the presence predicted range of the object, and the object execution range can be limited. A series of processes can be repeated where the limited area is allocated to adjoining frames where the object resides, the object recognition is performed for the range, or the attitude is obtained, objects that do not conform with the predicted coordinates are excluded, and identification of the object which resides at predicted coordinates is performed.

Such a method can more correctly identify the object, and more accurately determine the coordinates.

Specifically, first, by the consecutive frame machine learning unit 30, the recognition operation is executed for only one frame.

Subsequently, in the three-dimensional coordinate computation and object coordinate assigning unit 40, the coordinates of the object or the peripheral area coordinates including the object are obtained. By the recognition area designation unit 31, the coordinates are regarded as the predicted position of the object, and the execution range of recognition is limited.

The limited area is allocated over the adjoining frames. In the range, the object recognition is applied, or the attitude is obtained. The computation is executed by repeating exchange of the mutual signal between the consecutive frame machine learning unit 30 and the three-dimensional coordinate computation and object coordinate assigning unit 40 such that objects that are not positioned at the predicted coordinate range are excluded and an object resides at the predicted coordinates.

Accordingly, the coordinates of the object are confirmed, which can identify the object and determine the coordinates.

At the same time of the recognition result of the identified object, the three-dimensional coordinates obtained in the process are simultaneously output. As the output result, the recognized object in the CV video and the three-dimensional coordinates can be displayed at the same time by the recognition object display unit 50 (see FIGS. 23 to 29).

In the CV video, each object has three-dimensional coordinates. Accordingly, object recognition is performed even for only one frame, the coordinates are common to the other frames. Accordingly, the positions of the objects in the other frames can be correctly predicted.

Accordingly, such characteristics of the CV video are used, the three-dimensional coordinates of the object recognized in the first frame are obtained as approximate values, small areas including the approximate three-dimensional coordinates at the time are allocated to the other frames, the recognition process is applied to the object in proximity to the coordinates, and it is confirmed that the recognition result matches the approximate coordinate, thereby allowing the object to be identified.

Hereinafter, referring to FIG. 17, description is made more specifically.

As shown in this diagram, a limited area as a recognition process designation range 335 is designated for all the frames required to be processed. As the designation range, a large frame area can be designated from the predicted value of the object.

The recognition process designation range 335 can be designated as a recognition area of all the frames that is a two-dimensional area, or designated as a three-dimensional area, by coordinates.

Accordingly, the recognition process is not necessarily performed in the entire area. Only in the designated range, the recognition process is performed.

This minimizes the possibility of detection of non-identification. The operation range is reduced, which can improve the processing efficiency.

Note that the method can perform recognition and obtain coordinates by one time of operation. However repetitive operations can improve the recognition certainty degree and the coordinate accuracy.

That is, data (mutual signal) is frequently exchanged between the consecutive frame machine learning unit 30 and the three-dimensional coordinate computation and object coordinate assigning unit 40. Even if the coordinates are determined in advance, detailed coordinates are eventually obtained again using all the frames to improve the accuracy of the coordinates.

By repeating exchange of the mutual signal between the consecutive frame machine learning unit 30 and the three-dimensional coordinate computation and object coordinate assigning unit 40, the recognition and the determination of the three-dimensional coordinates are achieved at the substantially same time resultantly with a high certainty degree and accurately.

[Collective Recognition of all Frames]

Next, referring to FIGS. 18 to 22, as the object recognition/identification process in the recognition and positioning device 100, a case where a collective recognition process of all the frames of the intended CV video is performed is described.

The recognition and positioning device 100 does not individually process all the frames of the CV video in which the object is possibly captured. Alternatively, the recognition and positioning device 100 can regard all the related frames as an aggregation of pieces of information that the object has, and process the aggregation as an aggregation of pieces of information having different directions in which the identical object is viewed and different distances.

The aggregation of pieces of information can be collectively processed by machine learning, and is recognized at one time, and subsequently or at the same time, the coordinates are determined, and the object can be identified.

Such a method can also more correctly identify the object, and more accurately determine the coordinates.

Specifically, first, the consecutive frame machine learning unit 30 does not repeat recognition for each frame in the CV video, but regards all the frames where the object is captured in the CV video, as an aggregation of pieces of information, and collectively performs recognition by machine learning.

The multiple frames are input into the machine learning tool at the same time, thereby allowing collective recognition. The multiple frames are thus allowed to be input, and individual recognition of each frame is not performed. Accordingly, the recognition accuracy can be largely improved.

In this case, it is effective to use the recognition process designation range 335 shown in FIG. 17.

The object recognition method can also obtain the three-dimensional coordinates of the object at the same time.

Note that the collective recognition method assumes that the object in each frame image has three-dimensional coordinates (CV values). However, the CV value has a minor error. Accordingly, the values do not completely match in some cases. However, when collective recognition for all the frames is performed to obtain the coordinates at the same time, the errors are automatically statistically processed. As a result, the accuracy is improved. It is a matter of course that the collective recognition process largely improves the recognition certainty degree.

Note that the recognition processes shown in FIGS. 16 and 17 are common. The object always has planes or a body. Accordingly, to obtain and designate the coordinates, one-dimensional point is required to be designated; the point is a position (point) of the object, for example, the center or a bottom of a base.

Depending on the object or on a use purpose, definition is manually made and designation is made.

Hereinafter, referring to FIGS. 18 to 22, description is made more specifically.

In general, deep learning is a complicated form of RNN (Recurrent Neural Network).

Figure 18:
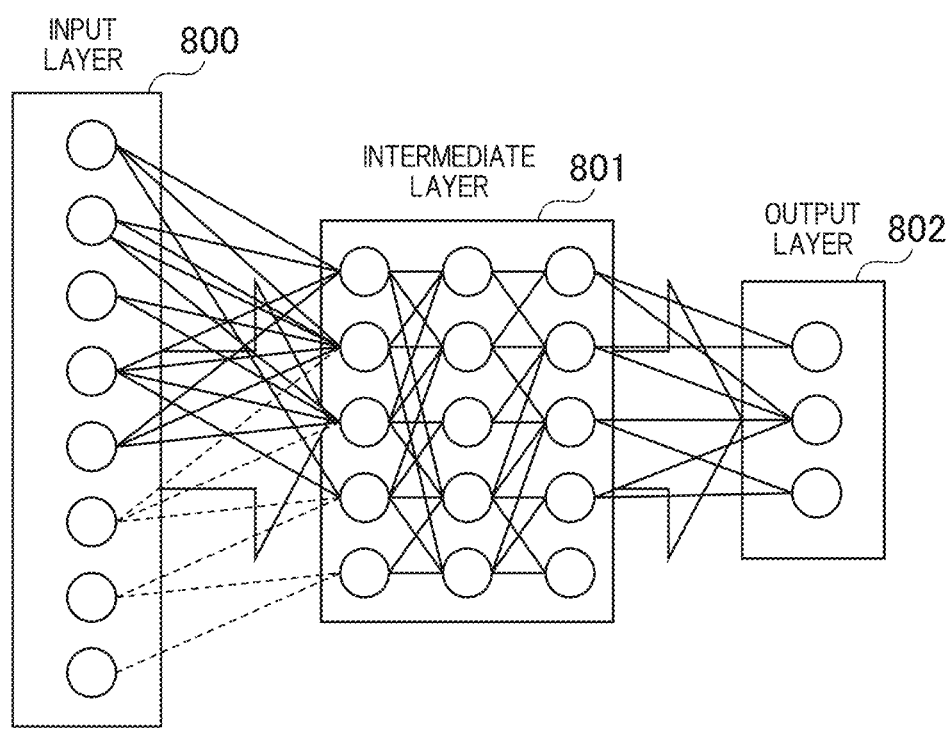
FIG. 18 schematically illustrates a principle of machine learning (deep learning) in the recognition and positioning device according to one embodiment of the invention.

To allow multiple data items, such as moving image data, to be used, an output layer 802 is provided for an intermediate layer 801 having a neural network given a recursive structure where signals bidirectionally propagate, with an input layer 800 shown in FIG. 18.

The deep learning shown in FIG. 18 includes RNNs laterally connected to support temporally changing continuous data.

According to the deep learning, at the input layer 800 there is a typical image. A multi-layered configuration of the intermediate layer 801 can increase information transmission and processing, increase the accuracy of the feature amount and the general versatility, and improve the recognition accuracy.

In a case of using a learned model, only inference processes are required, thereby negating the need of large-scaled computational resources. The deep learning, only with a large amount of data, can process complicated data difficult to be dealt with, which cannot be achieved by conventional machine learning and the like.

The description so far is similar to conventional deep learning. However, in this embodiment, RNN is further improved as shown in FIGS. 19(*b*) to 20.

FIG. 19(*a*) shows deep learning for standard 2D recognition similar to that in FIG. 18.

FIG. 19(*b*) shows a configuration improved for two-dimensional recognition and three-dimensional positioning.

Figure 20:
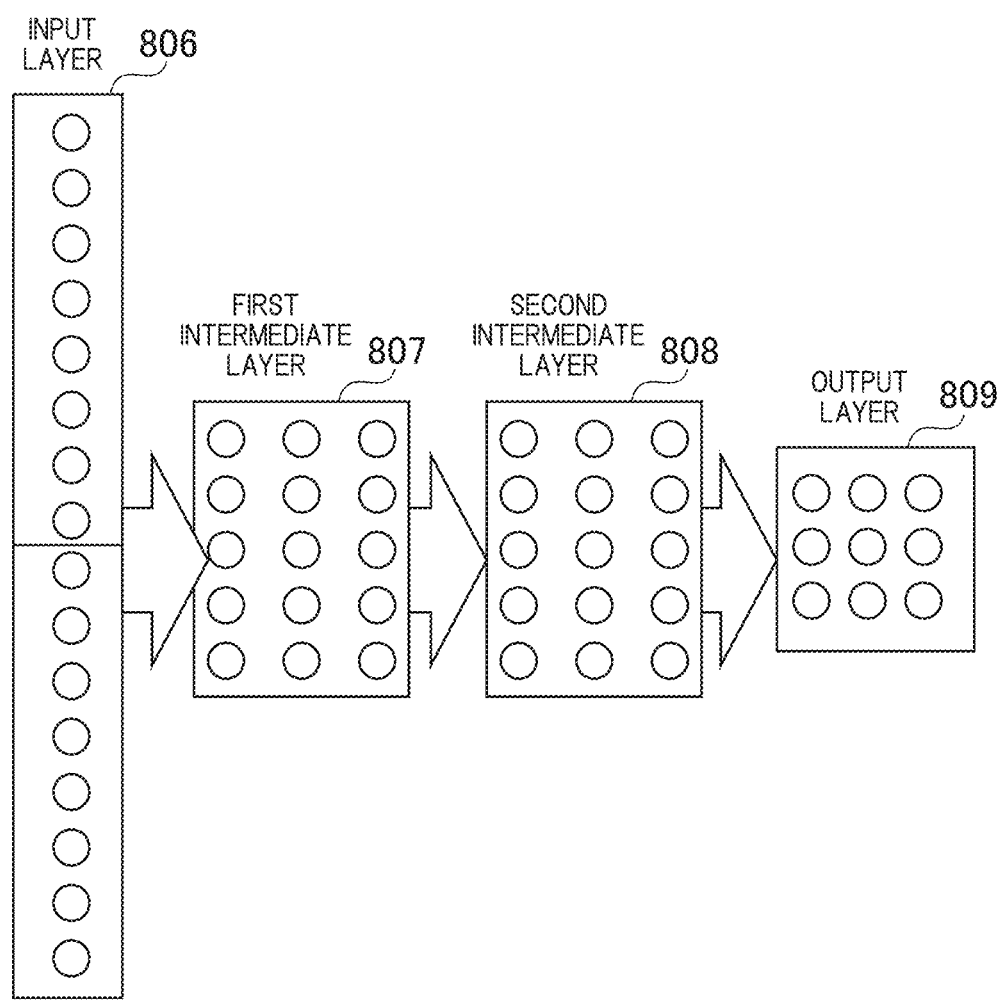
FIG. 20 schematically illustrates the principle of machine learning (deep learning) subsequent to FIG. 19.

FIG. 20 shows a configuration improved for three-dimensional recognition and three-dimensional positioning.

Figure 21:
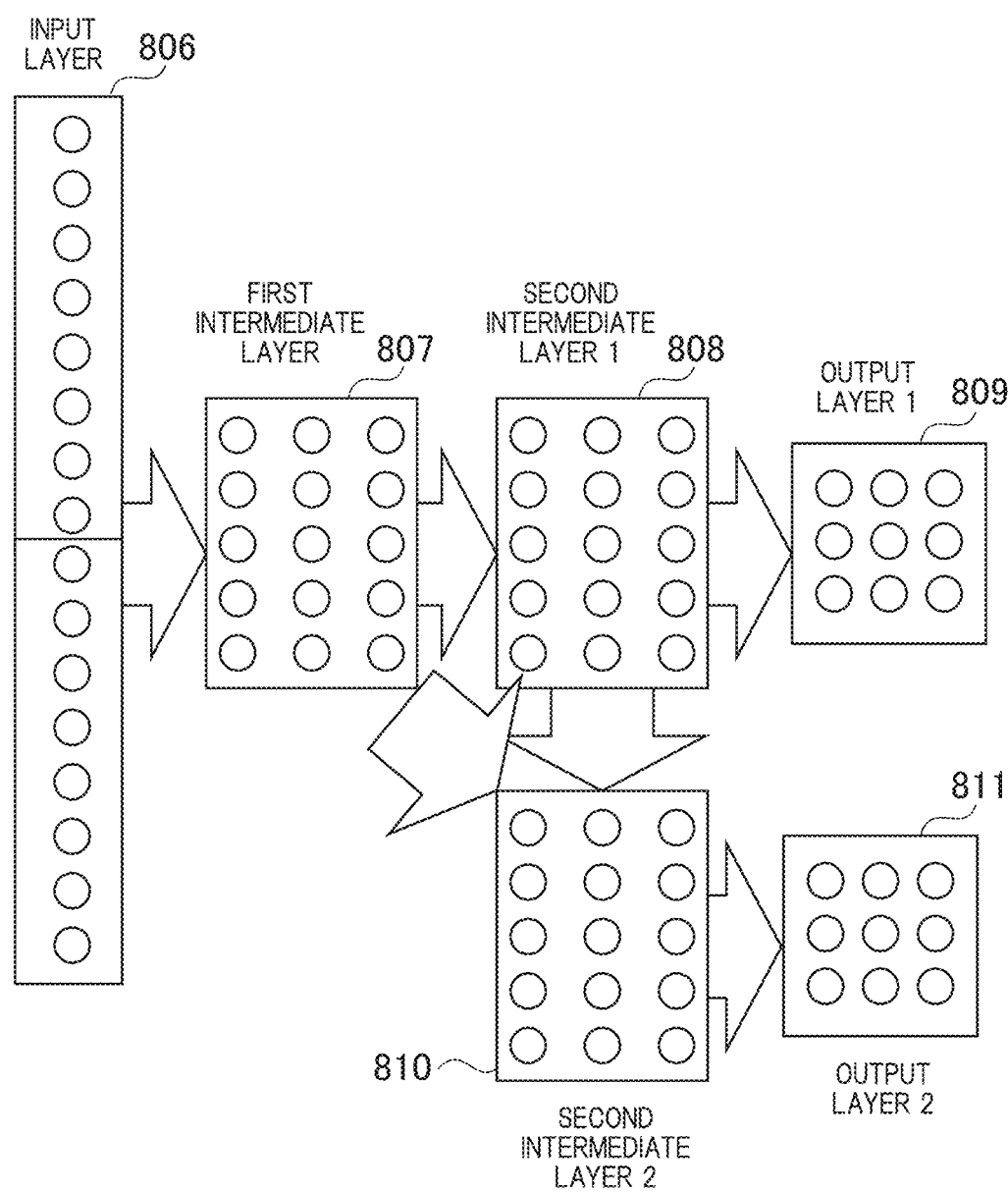
FIG. 21 schematically illustrates the principle of machine learning (deep learning) subsequent to FIG. 20.

FIG. 21 shows a configuration for three-dimensional recognition and three-dimensional positioning through separated functions.

The basic form of these improved configurations is basically that in FIG. 20.

Figure 22:
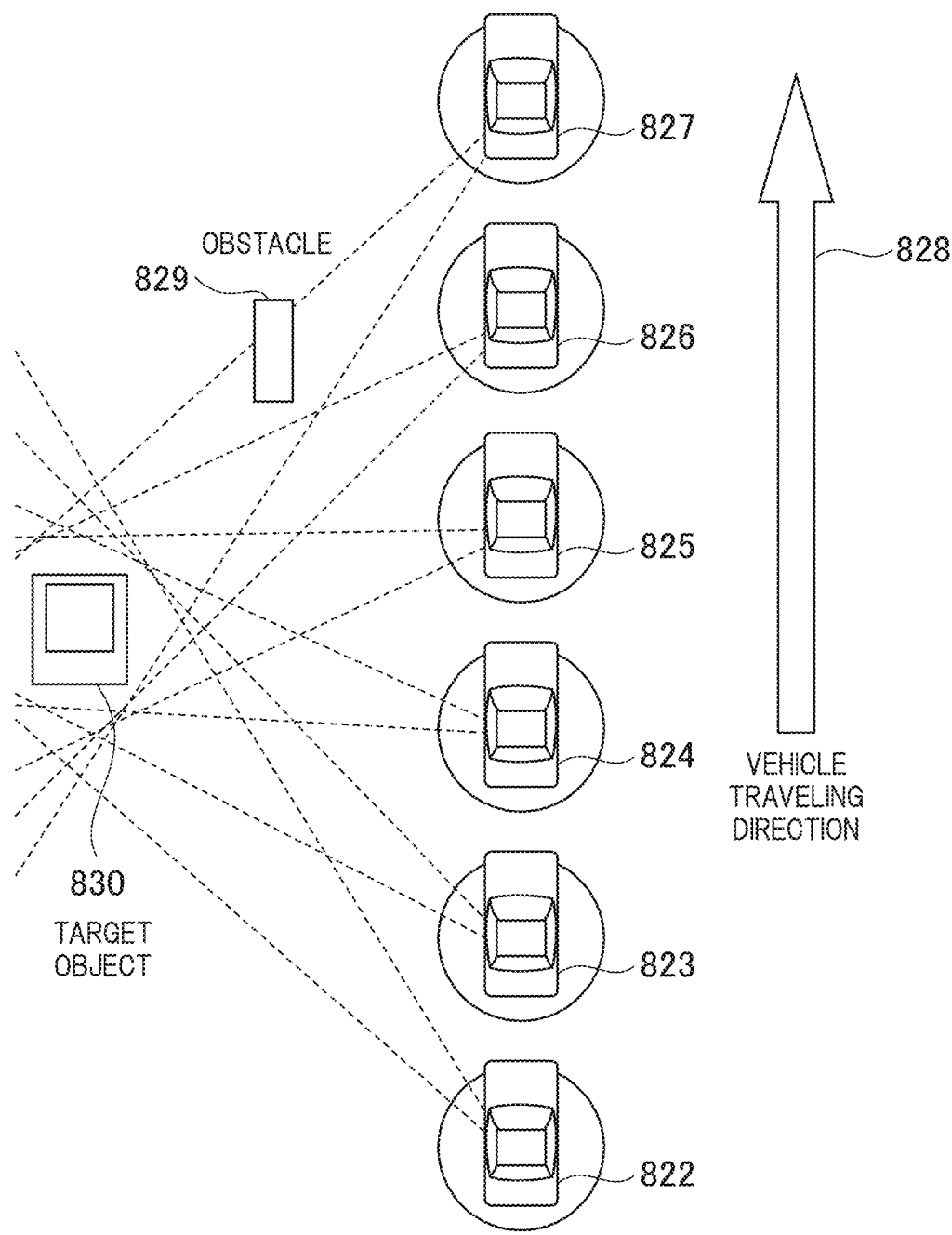
FIG. 22 schematically illustrates a principle of recognition and positioning of a moving body by the recognition and positioning device according to one embodiment of the invention.

FIG. 22 schematically shows the relationship among actual video obtainment, a recognition object, and movement of a camera that takes the video.

In FIG. 22, paths where a vehicle mounted with the full circumference camera moves are indicated by reference numerals 822 to 827. As clearly shown in this diagram, even when the vehicle moves and is present at any position, it is understood that the camera on the vehicle always captures an object 830.

It is assumed that depending on the movement position, a camera does not capture the object because of presence of an obstacle 829.

In this diagram, videos taken and obtained at vehicle positions 822 to 827 are subjected to CV computation, and are transmitted, as CV videos having three-dimensional coordinates of the camera having taking the videos, to an input layer 803 of the deep learning shown in FIG. 19(*b*).

The input layer is configured so as to have an allowance for accepting multiple images from the camera corresponding to 822 to 827 shown in FIG. 22.

Furthermore, intermediate layers shown in FIG. 19(*b*) are multiple intermediate layers, such as a first intermediate layer 804 and a second intermediate layer 805. The number of layers is defined depending on an intended coordinate accuracy.

In a case of two-dimensional recognition, an output layer 806 may have a configuration similar to the conventional one shown in FIG. 19(*a*). However, in a case of three-dimensional recognition, an output layer 809 has a three-dimensional structure as shown in FIG. 20.

Furthermore, FIG. 21 shows a processing scheme in deep learning in which the recognition and positioning functions are separated.

In this diagram, the input layer 806 for the CV video is similar to the case shown in FIGS. 19(*a*) and 19(*b*). However, for three-dimensional recognition and three-dimensional positioning, functions are separated such that a second intermediate layer 1: 808, and a second intermediate layer 2: 810 are prepared, and in a similar manner, functions of an output layer 1: 809 and an output layer 2: 811 are separated, thereby improving the recognition and positioning accuracies.

Hereinafter, description is made with reference to the configuration in FIG. 20 (three-dimensional recognition and three-dimensional positioning), which is the basic form of three-dimensional position determination in three-dimensional recognition.

It is assumed that the input layer 806 shown in this diagram receives consecutive frames of a related CV video. Specifically, a configuration is adopted that receives an effective number of frames of a CV video where images in a camera-captured range for the object is effective.

The intermediate layers are expanded to have multiple layers, such as a first intermediate layer 807, a second intermediate layer 808, . . . , so as to have a number of layers required to support positioning.

Note that FIG. 20 shows the first intermediate layer 807 and the second intermediate layer 808, and FIG. 21 shows the second intermediate layer 1: 808 and the second intermediate layer 2: 810; both the diagrams show two-layered configurations. Alternatively, for coordinate determination, further multiple structure to obtain all the six variables can be adopted.

Positioning is then made by the second intermediate layers 808 and 810 shown in FIG. 21, subsequently, a three-dimensional recognition is output from the output layer 1: 809, and three-dimensional coordinates are output from the output layer 2: 811.

As described above, the three-dimensional recognition and the three-dimensional positioning are collectively performed by one time of deep learning from the CV video, thus allowing the collective recognition process for all the frames of the CV video.

[Moving Body Recognition]

Next, as the object recognition/identification process in the recognition and positioning device 100, a case where a process of recognizing the moving body traveling in the intended CV video is described.

As described above, the recognition and positioning device 100 includes: the consecutive frame machine learning unit 30 that focuses on the moving body in the CV video as a recognition object, extracts the moving body, obtains the RV value of the moving body, assigns the three-dimensional coordinates or the three-dimensional shape of the object, and recognizes the object; and the moving body RV value obtaining unit 27 for the sake of the recognition/identification process in the three-dimensional coordinate computation and object coordinate assigning unit 40 (see FIG. 15).

In this embodiment, the description has been made assuming that the object to be recognized in the recognition and positioning device 100 is mainly a stationary object. However, the object is not necessarily an object on a stationary coordinate system.

That is, by obtaining the RV value described above (included in the CV value in a broader sense), the object can be recognized and the three-dimensional coordinates can be determined also for the moving body in the CV video, completely similar to the case of the stationary object.

Specifically, the recognition and the determination can be achieved using the RV value or the MV value generated and obtained by the moving body RV value obtaining unit 27 of the CV video obtaining unit 20, and the moving body coordinate system separation technology disclosed in Japanese Patent No. 4502795 "Coordinate System Separation Recording/Reproduction Apparatus" filled by the applicant of this application. Note that the object can be extracted also by a segmentation technology that is currently often used.

Accordingly, completely similar to the object on the stationary coordinate system, for the moving body object, the recognition and the three-dimensional coordinates determination according to the invention can be performed at the same time.

FIGS. 23 to 29 each show an example of an image serving as an output result generated and output by the recognition and positioning device 100 according to this embodiment described above.

Output images shown in these diagrams can be output and displayed as a predetermined video indicating the object assigned the three-dimensional coordinates, on the display connected to, for example, the recognition and positioning device 100, by the recognition object display unit 50 (see FIG. 15).

FIG. 23 shows a case where for the identical object captured over consecutive frames generated by the CV video obtaining unit 20, "utility pole" is designated by the object designation unit 13 as a target object to be recognized.

FIG. 24 shows a case where identification information on the object "utility pole" recognized and identified in the CV video and assigned the three-dimensional coordinates is displayed on the CV video by plotting.

FIG. 25 shows a case where identification information on the object "utility pole" recognized and identified in the CV video and assigned the three-dimensional coordinates is displayed on a map by plotting.

FIG. 26 shows a case where identification information (tag) assigned to a specific object "utility pole" is displayed on the CV video in a manner allowing the information to be edited.

FIG. 27 shows a case where the angle of vision of the specific object "utility pole" displayed on the CV video is moved, and the measurement result of the height, the inclination, the azimuth and the like are displayed.

FIGS. 28 and 29 each show a case where position information and attribute information on objects "guidance sign" and "traffic sign" recognized and identified in the CV video and assigned the three-dimensional coordinates are displayed on the CV video.

As described above, the recognition and positioning device 100 according to this embodiment can recognize objects in the image from the moving image and simultaneously obtain the three-dimensional coordinates of the recognized object, and consecutively perform them, thereby assigning highly accurate three-dimensional coordinates to each object in the video.

That is, the recognition and positioning device 100 integrates the machine learning and the CV technology, thereby obtaining coordinates while performing recognition, and performing recognition while obtaining the coordinates. Through the mutual operation, the recognition and positioning device 100 improves the accuracy of the three-dimensional coordinates while improving the recognition accuracy, and improving the certainty degree of the target recognition while improving the accuracy of the three-dimensional coordinates, thus generating excellent synergetic effects.

Accordingly, the object recognition is integrated with the CV technology. At the same time of the object recognition having a high certainty degree, the three-dimensional coordinates of the recognition object can be highly accurately obtained.

The recognition and positioning device 100 according to this embodiment can directly assign coordinates to and recognize the object in the video through use of the CV video.

Accordingly, for example, from a moving image taken by the camera mounted on the vehicle traveling on the road, various objects around the road, such as road facilities, signs, and vehicles, can be recognized while their three-dimensional coordinates can be obtained. Accordingly, a road database and the like required for automated driving and the like can be created directly from the taken video and the like.

In this embodiment, application of the machine learning to the object in the CV video adds information on the position and attitude of the object to the conventional machine learning. Accordingly, the identical object is recognized in multiple directions, thereby significantly improving the recognition rate of machine learning.

As described above, the invention combines the CV technology with the machine learning, and implements the characteristics of the CV technology in the machine learning. The implementation can automate an operation of creating enormous training data unavoidable for machine learning, and reduce the training data. Accordingly, the machine learning process can be efficiently performed, and position coordinate data, attitude data, three-dimensional shape data and the like on the object can be obtained at the same time of the operation of recognizing the designated object.

Such characteristics of the invention are effective even in a case where the object is a moving object. Position coordinate data, attitude data, three-dimensional shape data and the like on the moving object can be obtained.

Note that in the embodiment described above, the description has been made in viewpoints of the improvement in efficiency of machine learning, obtainment of the three-dimensional coordinates of the object, and obtainment of the attitude according to the invention, but can be applied to recognition by the conventional correlation technology in the identical manner.

In the embodiment described above description has been made assuming the full circumference camera as the object video obtaining unit of the invention. It is a matter of course that the full circumference camera is advantageous. However, there is no limitation to the full circumference camera. For example, a wide-angle camera may be adopted. Alternatively, a wide-range camera through multiple cameras divided with respect to each direction may be similarly configured as the object video obtaining unit of the invention.

[Information Conversion Device]

Next, an embodiment of an information conversion device according to the invention is described.

The information conversion device according to the invention is made up of an information processing device connected to the recognition and positioning device 100 described above, and is for allowing generation and output of an image including an object recognized and assigned three-dimensional coordinates by the recognition and positioning device 100, as a reconstructed image, using the PRM technology.

PRM is an acronym of Parts Reconstruction Method (3D object recognition method), and is a technology developed by the inventor of this application for recognizing an object (see JP-B2-4582995).

Specifically, the PRM technology is a technology that prepares all the shapes and attributes of predicted objects as components (operator components), compares the components with an actually taken video, and selects matched components to thus recognize the object. For example, "components" of the object required for a traveling vehicle or the like include traffic lanes, white lines, yellow lines, crossing, as indications on roads, and speed signs and guidance signs as road signs. Since these are formal ones, these can be easily recognized by the PRM technology. Even when the object is searched for in the CV video, the predicted three-dimensional space where the object is present can be limited to a small range, which can improve the efficiency of recognition.

For example, in a case of a signal, obtainment of the three-dimensional shape is only "detection". If the coordinates and attitude are additionally found, which means "identification". If the name of the signal is identified, and change of three lights among red, blue and yellow are identified and the meanings of them are understood, it can be said that the attribute can be understood (recognized).

Note that it is not necessarily regarded that all the object to be monitored (predicted objects, obstacles, suspicious objects, etc.) are recognized by PRM recognition. That is, objects whose information is absent in a database for storage cannot be recognized. However, it is not specifically a problem. This applies to the fact that even a person cannot recognize what is not memorized. Recognition is obtained through comparison with the object itself or what is close thereto.

The information conversion device according to the invention is for integrating the PRM technology as described above with the recognition and positioning device according to the invention, thereby allowing generation, recording, communication and the like of a reconstructed image based on a CV video including an object assigned highly accurate three-dimensional coordinates.

Hereinafter, preferable embodiments of the information conversion device according to the invention are described with reference to the drawings.

First Embodiment

First, a first embodiment of an information conversion device including the recognition and positioning device according to the invention is described with reference to FIGS. 30 to 33.

Figure 30:
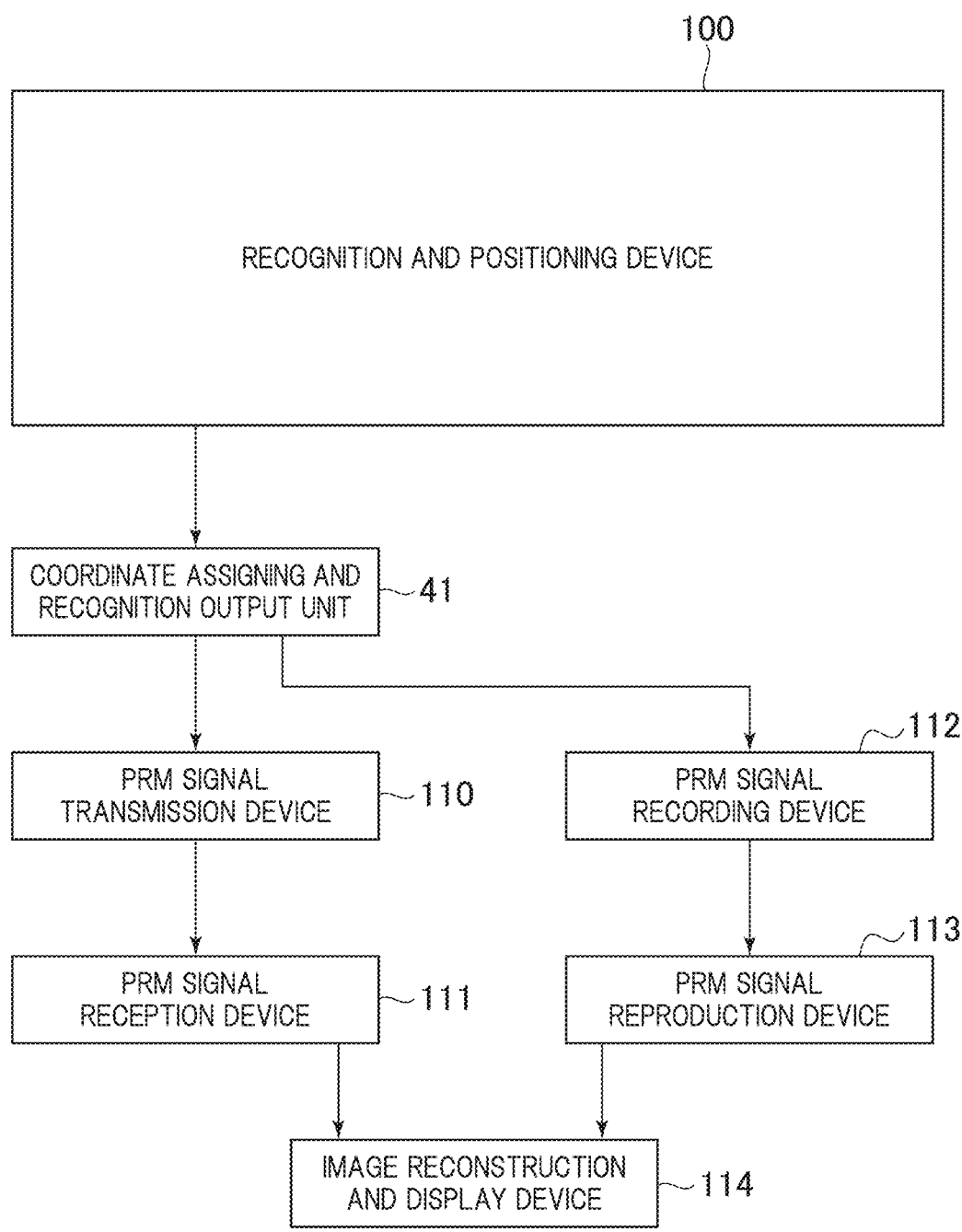
FIG. 30 is a functional block diagram showing an embodiment of an information conversion device that includes the recognition and positioning device according to the invention.

FIG. 30 is a functional block diagram showing a first embodiment of an information conversion device that includes the recognition and positioning device according to the invention.

Figure 31:
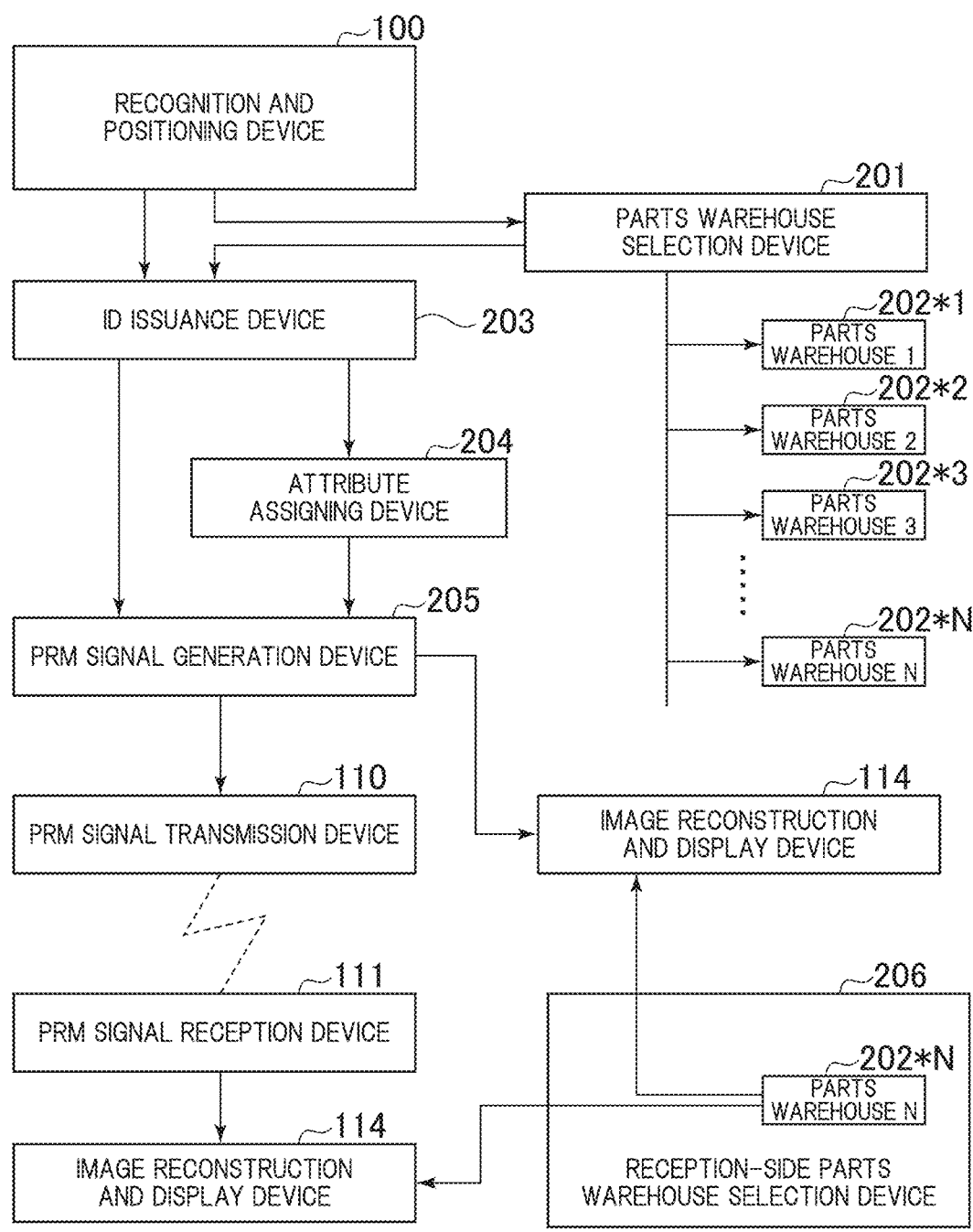
FIG. 31 is a functional block diagram showing a detailed configuration of the information conversion device shown in FIG. 30.
Figure 32:
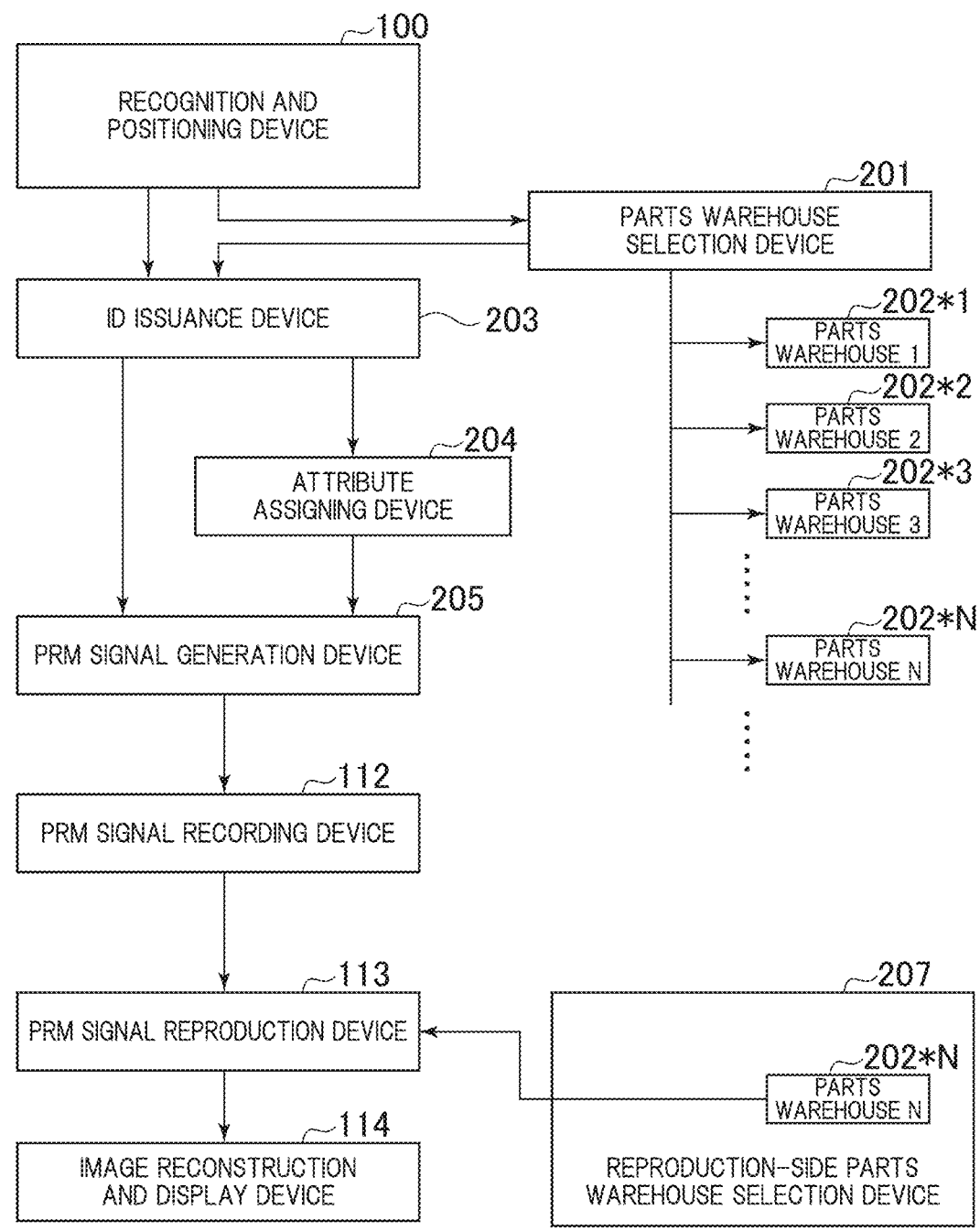
FIG. 32 is a functional block diagram showing another detailed configuration of the information conversion device shown in FIG. 30.

FIGS. 31 and 32 are functional block diagrams showing a detailed configuration of the information conversion device shown in FIG. 30.

The information conversion device according to this embodiment shown in these diagrams is made up of one or more computer, information processing devices or the like connected to the recognition and positioning device 100. As shown in FIG. 30, the information conversion device includes: a PRM signal transmission device 110 and a PRM signal reception device 111 that receive data from the coordinate assigning and recognition output unit 41 (see FIG. 15) of the recognition and positioning device 100, and transmits the data to an image reconstruction and display device 114; and a PRM signal recording device 112 and a PRM signal reproduction device 113 that input the data from the coordinate assigning and recognition output unit 41 into the image reconstruction and display device 114 in a similar manner.

The information conversion device further includes a parts warehouse selection device 201 serving as an ID parts warehouse that stores predetermined IDs serving as pieces of identification information respectively associated with objects, and attribute information classified by the IDs (see FIGS. 31 and 32).

The image reconstruction and display device 114 can associate the ID stored in the ID parts warehouse, with the object that is identified and assigned the three-dimensional position coordinates by the recognition and positioning device 100, and reconstruct the CV video including a plurality of the objects, according to the ID associated with each object, and attribute information thereon.

First, such an information conversion device prepares an ID parts warehouse preliminarily classified by IDs associated with the respective recognition objects, and associates the IDs respectively with objects recognized through repetition of object recognition and obtainment of three-dimensional coordinates for multiple types of objects in the recognition and positioning device 100. Finally, the IDs are associated with all the objects or most of the objects in an intended image range in the CV video.

Subsequently, according to a recognition result assigned the three-dimensional coordinates associated with the IDs and the attitude (six variables) of the object, and a result assigned another attribute of the object, if obtained, an intended image or video can be reconstructed, based on IDs, from the IDs of the objects and the attribute assigned to the ID, and a reconstruction result can be displayed if required.

The IDs assigned the three-dimensional coordinates and attitude (six variables), and the attribute of each object are reconstructed, which can generate and display a CV video similar to the original.

The information conversion device can transmit the intended image or video reconstructed, based on the IDs, from the ID of each of the objects and attribute assigned to the ID, via a network, for example, the Internet or the like. The image or video can be received by the image reconstruction and display device 114 at a place remote from the recognition and positioning device 100, for example.

Such a reconstructed image is recorded in a device that includes predetermined storage means, and is read as needed, and reproduced by the image reconstruction and display device 114.

As for the reproduction of the reconstructed image, corresponding components are reconstructed on the basis of the IDs assigned to the objects and the attributes, thereby allowing the image to be reproduced.

A specific configuration and functions of the information conversion device as described above are described with reference to FIGS. 31 and 32.

FIG. 31 shows a functional configuration of the information conversion device in a case of transmitting data from the recognition and positioning device 100 to the image reconstruction and display device via the PRM signal transmission device and the PRM signal reception device.

FIG. 32 shows a functional configuration of the information conversion device in a case of transmitting data from the recognition and positioning device 100 to the image reconstruction and display device via the PRM signal recording device and the PRM signal reproduction device.

First, the recognition and positioning device 100 applies recognition and a three-dimensional process to most of objects in the image, thereby allowing a video to be obtained as a three-dimensional arrangement of the objects.

The objects recognized by the recognition and positioning device 100 are assigned IDs by the information conversion device.

The information conversion device allows any parts warehouse (here a parts warehouse **202*N) to be selected from among parts warehouses 2021 to N in the parts warehouse selection device 201 that includes the parts warehouses 2021** to N serving as ID parts warehouses.

Next, an ID issuance device 203 determines an associated object ID according to the selected parts warehouse. The ID issuance device 203 is means for issuing an ID according to the ID and the attribute information thereon stored in the ID parts warehouse, for the object included in the CV video.

The ID issuance device 203 issues IDs for the objects in the CV video with respect to multiple parts.

At this time, the objects are a recognized two-dimensional image. The parts corresponding to the object is allowed to have a three-dimensional shape. That is, the parts identified based on the IDs may have three-dimensional shapes as attributes.

Each of the parts stored in the parts warehouses 2021 to N is preliminarily assigned attribute information other than the coordinates. The attribute information is stored in association with the corresponding part and ID.

Note that in a case where additional attribute is required for each of the parts, an attribute assigning device 204 is provided, which can assign the additional attribute as additional information that is to be assigned to the ID.

Next, the information conversion device is provided with a PRM signal generation device 205. The PRM signal generation device 205 generates a PRM signal based on the ID issued by the ID issuance device 203, the attribute and the parts warehouse number. The PRM signal is transmitted to the image reconstruction and display device 114.

A reception-side parts warehouse selection device 206 is connected to the image reconstruction and display device 114 on the reception side of the PRM signal. In the image reconstruction and display device 114, based on the ID and an attribute signal transmitted from the PRM signal generation device 205, the common parts warehouse **202*N of the reception-side parts warehouse selection device 206** is selected.

In conformity with the received ID, required parts are collected from the selected parts warehouse, and from the attribute information assigned to the ID, on the basis of the three-dimensional information, multiple parts are three-dimensionally reconstructed, and the reconstructed image is generated and displayed.

The PRM signal generated by the PRM signal generation device 205 is transmitted and input directly into the image reconstruction and display device 114 as described above. Furthermore, communication is allowed via a network, and the data can be recorded as that to be reproduced.

When the PRM signal is transmitted through communication, as shown in FIG. 31, the PRM signal generation device 205 generates the ID and attribute associated to the object and the parts warehouse number as a signal, and the PRM signal transmission device 110 is allowed to transmit the signal, which is received by the PRM signal reception device 111.

The received PRM signal is input into the reception-side image reconstruction and display device 114. The common parts warehouse **202*N is selected from the reception-side parts warehouse selection device 206, on the basis of the ID and the attribute signals, such as the three-dimensional coordinates, input into the reception-side image reconstruction and display device 114** and read from the PRM signal. Required parts associated with the recorded ID are collected. Parts are reconstructed by assigning information assigned the ID. The reconstructed image is generated and displayed.

On the other hand, the PRM signal is recorded and reproduced, as shown in FIG. 32, the PRM signal generated by the PRM signal generation device 205 is recorded in the PRM signal recording device 112. The recorded PRM signal is received by the PRM signal reproduction device 113.

In the PRM signal reproduction device 113, on the basis of the ID and attribute signals, such as the three-dimensional coordinates, restored from the PRM signal, a reproduction-side parts warehouse selection device 207 collects required parts from the parts warehouse **202*N in conformity with the ID of the recorded PRM signal. Information assigned to the ID is assigned and parts are reconstructed. The reconstructed image is displayed by the image reconstruction and display device 114**.

Figure 33:
FIG. 33 shows an example of an image generated and output by the information conversion device according to one embodiment of the invention.

FIG. 33 shows an example of the reconstructed image generated and displayed by the information conversion device as described above.

The reconstructed image shown in the diagram is generated and displayed as a reconstructed image that includes a steel tower arranged to be across a road, and street lights arranged on the center line of the road, as parts identified as components and IDs on the basis of the CV video obtained by taking the road.

As described above, according to the information conversion device according to this embodiment, the image including the objects recognized and assigned the three-dimensional coordinates by the recognition and positioning device 100 is subjected to the PRM technology to detect components and IDs, which are transmitted to a predetermined device, and recorded, thereby allowing a reconstructed image to be generated and output.

According to such an information conversion device, on the extension, all the objects in the video can be recognized, and assigned IDs, the moving image can be divided into objects, which can be transmitted or recorded. Accordingly, the technology of JP-B2-4582995 by the inventor of this application is further advanced and achieved.

Accordingly, for example, in image communication, only the IDs of objects and their coordinates are required to be transmitted. That is, the image can be reconstructed on the reception side only by transmission of a text file including the IDs and the coordinates. The transmission band becomes significantly small.

Recently, the use of broadband communication has increased. On the other hand, during disaster or space communication, narrowband communication is important. The communication device (information conversion device) according to the invention is significantly important and beneficial also in the future.

It is a matter of course that if narrow-band communication is achieved, significantly highly compressed recording can be achieved at the same time, and enormous videos can be stored in a typical recording device.

Second Embodiment

Next, a second embodiment of an information conversion device including the recognition and positioning device according to the invention is described with reference to FIG. 34.

Figure 34:
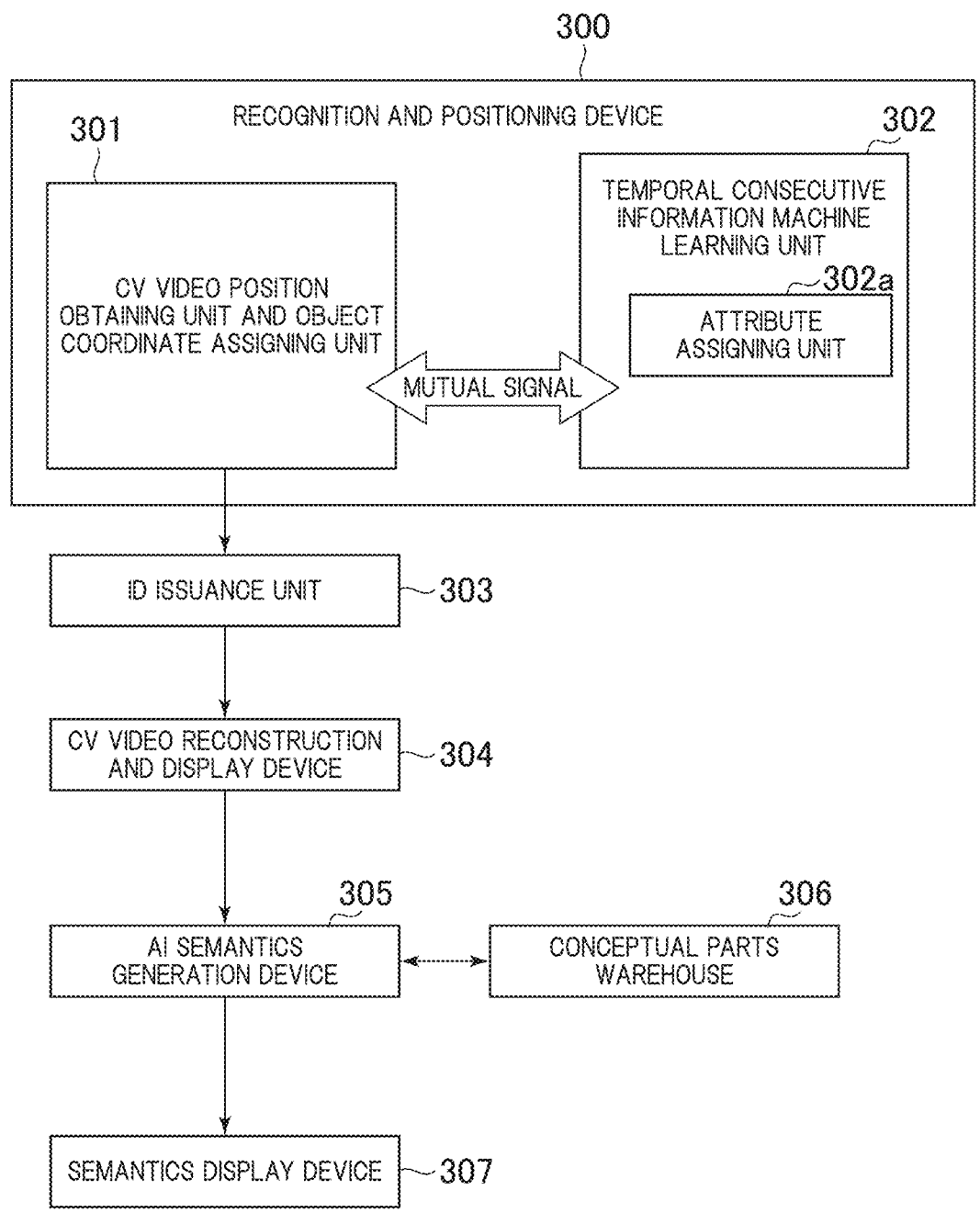
FIG. 34 is a functional block diagram showing another embodiment of the information conversion device that includes the recognition and positioning device according to the invention.

FIG. 34 is a functional block diagram showing the second embodiment of the information conversion device that includes the recognition and positioning device according to the invention.

The information conversion device according to this embodiment shown in the diagram is made up of one or more computers, information processing devices or the like connected to a recognition and positioning device 300.

The recognition and positioning device 300 according to this embodiment includes a CV video position obtaining unit and object coordinate assigning unit 301, and a temporal consecutive information machine learning unit 302 that includes an attribute assigning unit 302a.

FIG. 34 shows a simplified configuration for the sake of convenience of illustration. However, the recognition and positioning device 300 of this embodiment has a basic configuration and functions similar to those of the recognition and positioning device 100 shown in FIG. 15.

As shown in FIG. 34, the information conversion device of this embodiment is configured so as to function as units that are an ID issuance unit 303, a CV video reconstruction and display device 304, an AI semantics generation device 305, a conceptual parts warehouse 306, and a semantics display device 307.

The conceptual parts warehouse 306 is configured as a parts warehouse that stores predetermined conceptual information indicating semantics and a concept of the object.

The semantics display device 307 serves as reconstruction means for associating the conceptual information stored in the conceptual parts warehouse 306, with the object that is identified and assigned the three-dimensional position coordinates by the recognition and positioning device 300, and reconstructing the CV video including a plurality of the objects, according to the conceptual information associated with each object.

Similar to the first embodiment described above, such an information conversion device of this embodiment, includes an ID parts warehouse classified according to IDs, the most part of an intended image range in the CV video is divided into "concept and semantics", and assigns, for example, an attribute obtainment result, such as color or other additional information, to a recognition result of each object, and an obtained result of the three-dimensional coordinates and attitude of each object.

Each object is associated with a concept in the conceptual parts warehouse that aggregates predetermined concepts. Based on a combination of IDs of some objects (concepts and semantics), a specific concept is generated, and the concept in the intended image is reconstructed based on the object (concept and semantics) assigned IDs.

As for the generated concept, only the concept itself, or data on the concept assigned the ID is transmitted. On the reception side, a conceptual parts warehouse associated only with the concept is prepared. The prepared conceptual parts warehouse is matched. A concept selected therefrom is reproduced. Accordingly, the concept of the image constituting the CV video can be transmitted, received, recorded, reproduced, and displayed.

The image divided into objects and then reconstructed is displayed as an aggregation of individual semantics of objects.

New semantics is generated by a combination of IDs having the individual semantics.

For example, from the vehicle, the shape of the vehicle, the road and the like, semantics "traffic accident" is generated. As described above, the semantics of disaster, such as a traffic accident, and a situation are recognized as "concept", and the concept can be transmitted, received, recorded, and reproduced.

Specifically, in the information conversion device of this embodiment, the output of the CV video reconstruction and display device 304 is processed by the AI semantics generation device 305. Based on the combination of IDs, a concept is selected from the conceptual parts warehouse 306. New semantics is generated, and is displayed by the semantics display device 307.

According to the technology of JP-B2-4582995 by the inventor of this application described above, by image recognition, IDs can be issued. From the distribution of the IDs, a concept can be created. The ID signal thereof can be transmitted. Also in the information conversion device of this embodiment, based on a combination of IDs, a new concept can be generated. The concept can be adopted as a new concept, which can be transmitted, received, recorded, reproduced, reconstructed, and displayed.

The IDs may be discarded. According to the conceptual parts warehouse 306, a concept may be generated by the AI semantics generation device 305, and may be reconstructed and displayed.

Similar to the case of the first embodiment, the generated concept is transmitted to another device and causes this device to receive the concept, thereby allowing image transmission through a significantly ultra-narrow band to be achieved.

Furthermore, that the image is recorded and reproduced by the scheme of this embodiment can achieve significantly high compression.

The scheme of this embodiment means that the image is divided into parts of individual objects, and the information is converted to the concept.

Grasping of the concept by such an image and another information system will become essential functions for artificial intelligence in the future.

This point is further described in a third embodiment described below.

Third Embodiment

A third embodiment of an information conversion device including the recognition and positioning device according to the invention is described with reference to FIGS. 35 to 37.

This embodiment is obtained by further improving and developing the scheme of the second embodiment described above. Not only CV videos, which are to be recognized and reconstructed according to the second embodiment, but also other information systems are processed in an expanded manner.

That is, according to the information conversion device of this embodiment, the target is not only CV videos but also other information systems, which are dealt with in an expanded manner and include most of the intended range in a wide variety of information systems. The range is divided into multiple objects (that are not limited to simple objects themselves but are individual target objects). Recognition results of the objects, and obtainment results of the position and attitude of the object are respectively assigned IDs for each individual recognition object.

Accordingly, the intended information system is configured to include the objects assigned the IDs. Furthermore, if necessary, the IDs are respectively assigned required attributes. Only the added IDs are transmitted. From the conceptual parts warehouse which is prepared on the reception side and in which only concepts simplified in forms of IDs are associated, components selected based on IDs are reproduced. The generated and reproduced concepts are displayed by a predetermined device, communicated, recorded, and reproduced and displayed through reconstruction.

Figure 35:
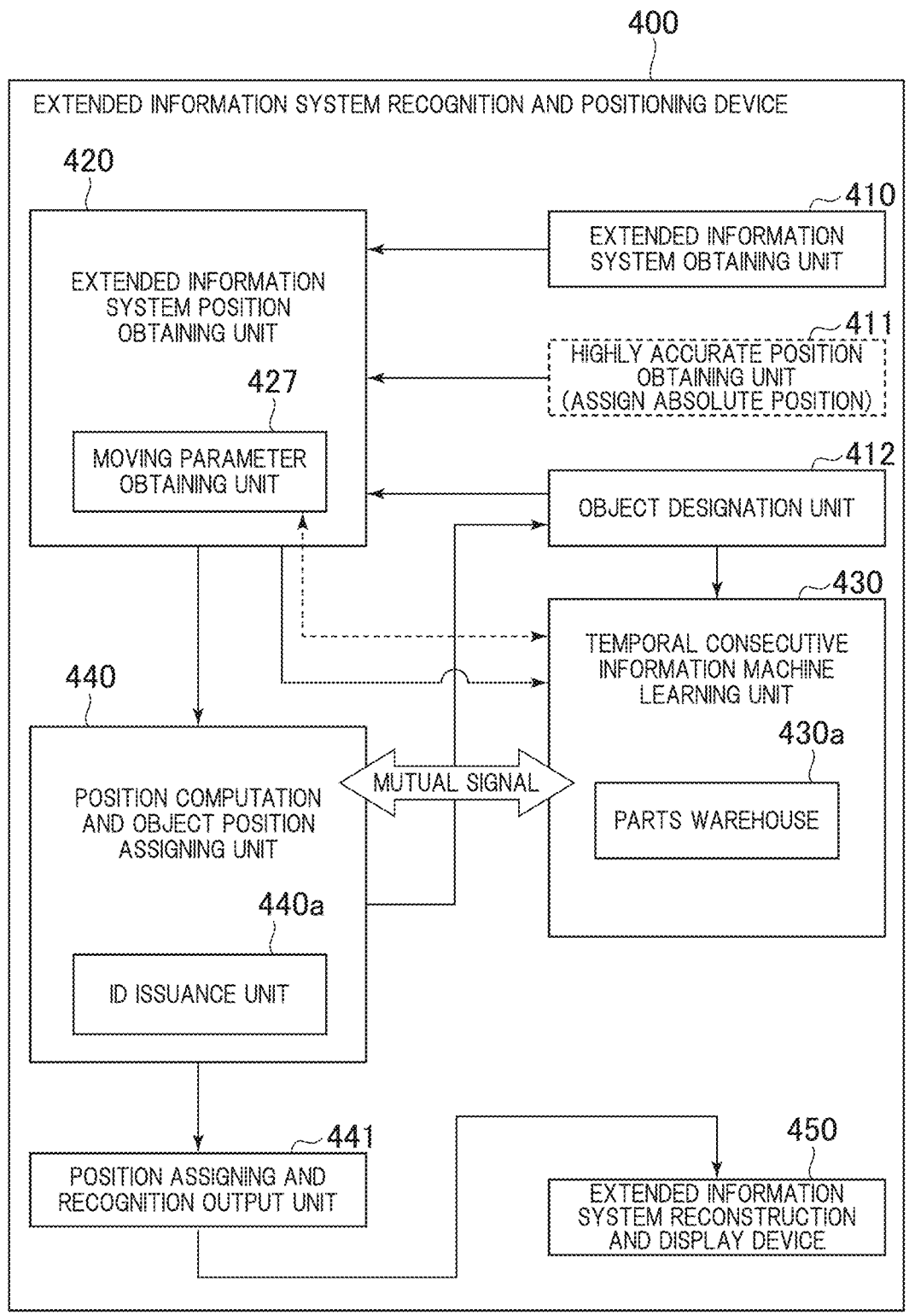
FIG. 35 is a functional block diagram showing still another embodiment of the information conversion device that includes the recognition and positioning device according to the invention.

As shown in FIG. 35, the information conversion device of this embodiment is configured as an extended information system recognition and positioning device 400.

Similar to the recognition and positioning device 100 described above, the extended information system recognition and positioning device 400 allows an extended information system position obtaining unit 420 to recognize most of the objects in the image and make them in a three-dimensional form. Accordingly, the video is obtained as three-dimensional arrangement of multiple objects.

Similar to the cases of the first and second embodiments, the recognized objects are dealt with as IDs.

Accordingly, the extended information system recognition and positioning device 400 allows a temporal consecutive information machine learning unit 430 to select a parts warehouse 430a, and IDs are determined with respect to the warehouse.

The ID determination is executed by an ID issuance unit 440a of a position computation and object position assigning unit 440. IDs are issued with reference to multiple parts of an extended information system.

Figure 36:
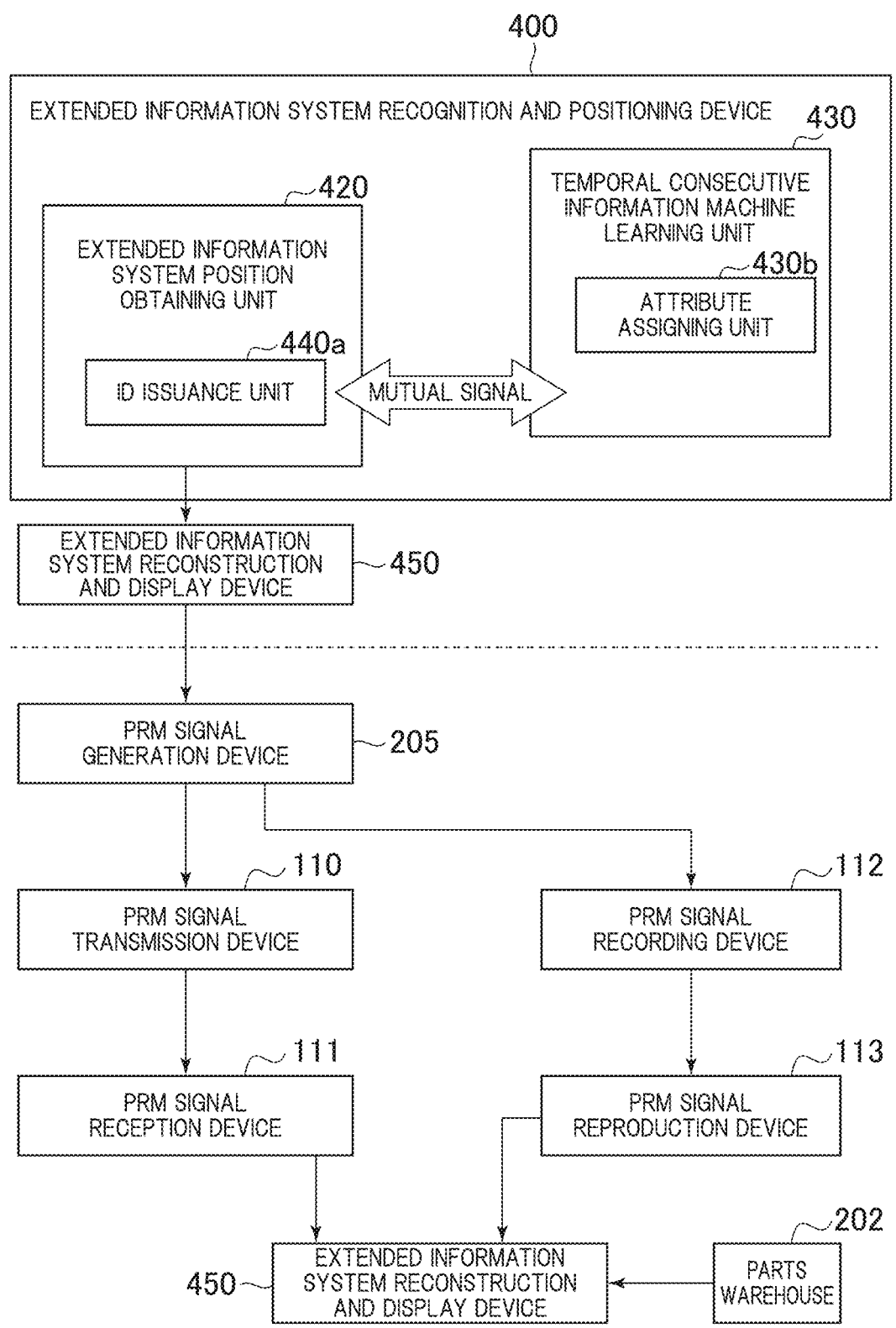
FIG. 36 is a functional block diagram showing yet another embodiment of the information conversion device that includes the recognition and positioning device according to the invention.

Subsequently, as shown in FIG. 36, when attributes are required, an attribute assigning unit 430b of the temporal consecutive information machine learning unit 430 adds attributes as additional information on IDs. Based on the additional information, reconstruction is performed by an extended information system reconstruction and display device 450, and the reconstructed attributes are displayed.

As shown in FIG. 36, data reconstructed by the extended information system reconstruction and display device 450 is generated as a predetermined PRM signal by the PRM signal generation device 205. Similar to the case of the first embodiment (see FIG. 30), the signal is separated into that for communication and that to be recorded.

First, in the case of communication, the PRM signal generation device 205 generates the IDs, attributes and the parts warehouse number as a signal. The PRM signal is transmitted via the PRM signal transmission device 110, is received by the PRM signal reception device 111, and is input into the extended information system reconstruction and display device 450.

Based on an attribute signal, such as IDs and three-dimensional coordinates read by the extended information system reconstruction and display device 450, from the parts warehouse 202 provided as a reception-side parts warehouse, required parts associated with the read IDs are collected. The parts are assigned information added to the IDs, and the parts are reconstructed.

Accordingly, a reconstructed image in the extended information system is generated and output.

Next, in a case of recording and reproduction, in the PRM signal generation device 205, IDs, attributes, and the parts warehouse number are generated as a PRM signal, and the PRM signal is recorded in the PRM signal recording device 112. The recorded PRM signal is received and reproduced by the PRM signal reproduction device 113.

Based on the attribute signals, such as IDs and three-dimensional coordinates read by the PRM signal reproduction device 113, in the extended information system reconstruction and display device 450, required parts associated with the read IDs are collected from the parts warehouse 202, assigned information added to the IDs are assigned to the parts, the parts are reconstructed, and a reconstructed image in the extended information system is generated and output.

In the extended information system recognition and positioning device 400 configuring the information conversion device of this embodiment as described above, the PRM technology is developed to an information system other than video systems. Generalization including videos can be achieved.

For example, a video is used with audio. The video and the audio are divided into objects by machine recognition. Position information is provided by the extended information system position obtaining unit 420. Machine learning is performed by the temporal consecutive information machine learning unit 430.

A mutual signal is repetitively exchanged between the temporal consecutive information machine learning unit 430 and the position computation and object position assigning unit 440. From a corresponding parts warehouse 407a of the extended information system, multiple parts based on the respective IDs are recognized and extracted, and the entire image is reconstructed.

The parts warehouse 430a of this embodiment includes the entire extended information. Accordingly, in comparison with the parts warehouses in the first and second embodiments, larger warehouse are provided.

It is appropriate to process the recognition and determination by machine learning at the same time. Accordingly, similar to the recognition and positioning device 100 described above, a mutual signal is repetitively and frequently exchanged between the temporal consecutive information machine learning unit 430 and the position computation and object position assigning unit 440.

For the recognized objects, IDs are issued by the ID issuance unit 440a. Signals in a form of IDs are reconstructed by the extended information system reconstruction and display device 450. The original entire concept image is reconstructed, output and displayed.

In this embodiment, as for the targets of machine learning in the temporal consecutive information machine learning unit 430, information systems other than those for images and videos are assumed as targets.

The information systems other than those for videos include: an information system for a distribution of characters, for example, such as of documents; an information system of a distribution of sounds, such as of music; and an information system of a distribution of aromas.

As described above, the CV video has six variables. The information systems respectively have specific coordinate axes.

As described above, in this embodiment, the information systems can be generalized and dealt with. Accordingly, the names and symbols of "devices" and "units" are different from those of the recognition and positioning device 100 shown in FIG. 15. However, the basic configuration and functions are similar to those of the recognition and positioning device 100.

Note that the signal transmitted from the extended information system reconstruction and display device 450 is transmitted to the reception-side extended information system reconstruction and display device 450 via a PRM signal transmission or reception device 110/111, or via PRM recording or reproduction device 112/113. In the extended information system reconstruction and display device 450, information is reconstructed using the same parts warehouse as that on the ID occurrence side. The parts in this embodiment are those for a conceptual parts warehouse. Accordingly, even not completely the same, parts having a similar concept can be selected.

The concept is different in terms of the culture, for example. Accordingly, the power is exerted through use as translation into cultures in other countries.

In all the information systems, the information is on a temporal axis in a distributed manner. It is a matter of course that information on a temporal section, such as an image, is included in the processes of the information system.

As for the recognition and positioning device 100 described above, the video information system has mainly been described in detail. This embodiment is allowed to be applied also to the extended information systems, which are extended to information systems other than those of video. Accordingly, the PRM technology becomes that for daily life.

Note that the parts warehouses according to this embodiment are extended not only to those for images but also for those for other information systems. Accordingly, the warehouses are conceptual warehouses having been in human living environments. The meaning indicates a container of elements constituting cultures.

As the ID parts warehouses, the same warehouses are required for the image processing side, display side, transmission side, reception side, recording side, and reproduction side. If ID-sensitive support is purposely achieved, different warehouses are effectively supported.

Only with conceptual ID parts warehouses, new tools can be provided for the optically challenged, and the aurally challenged, by conversion into other information systems that support concept conversion communication, such as communication between human beings and extraterrestrials, communication between human beings and animals, communication between people having different cultures, and conversion between videos and audio.

Figure 37:
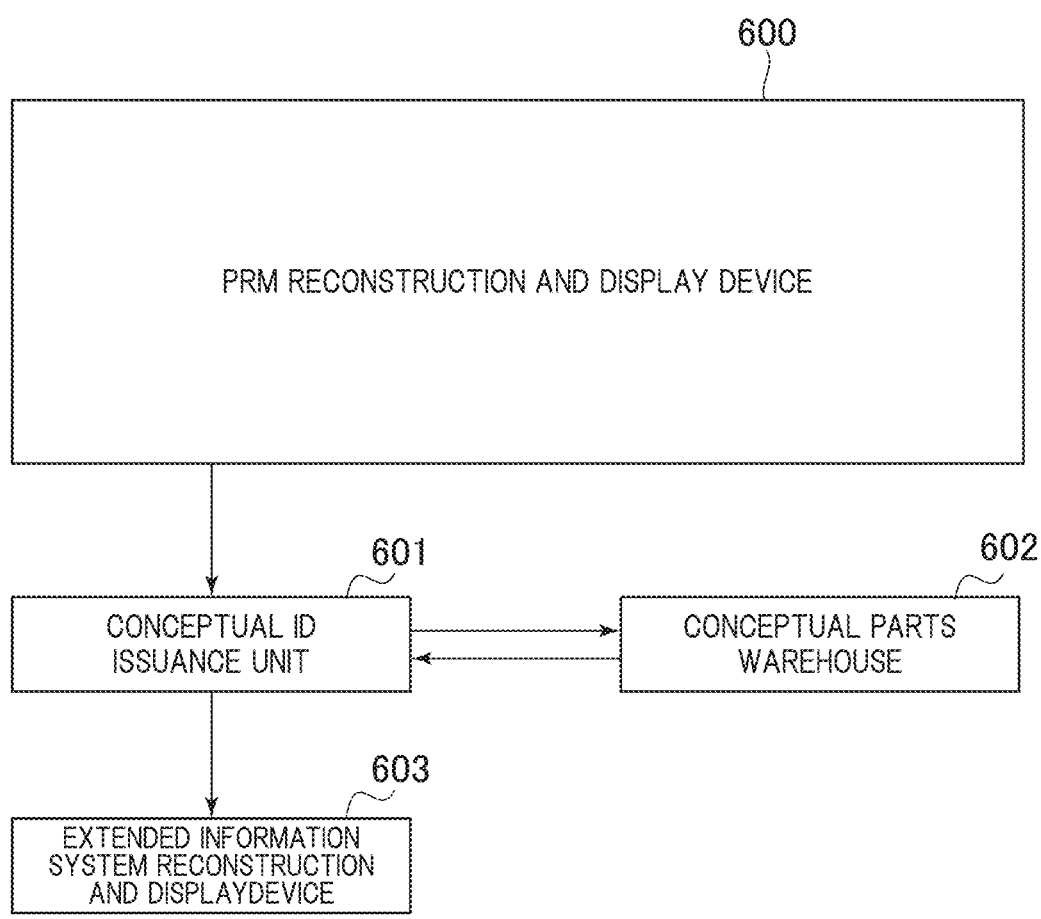
FIG. 37 is a functional block diagram showing still another embodiment of the information conversion device that includes the recognition and positioning device according to the invention.

By integrating this embodiment and the second embodiment described above, a configuration may be adopted that includes a PRM reconstruction and display device 600, a conceptual ID issuance unit 601, a conceptual parts warehouse 602, and an extended information system reconstruction and display device 603 as shown in FIG. 37.

In the extended information system reconstruction and display device 603 shown in the diagram, for example, the extended information system where division is made into objects and reconstruction is achieved, is displayed such that not only images but also objects assumed by other information systems are used for reconstruction, and the reconstructed item is displayed.

An aggregation of the respective pieces of semantics of objects is displayed here.

The AI semantics generation device 305 (see FIG. 34) described above can generate new semantics according to a scheme of combining IDs having individual semantics.

For example, the semantics of a traffic accident is generated from the vehicle, the shape of the vehicle, the road, aromas, the components of gases, temperature, sounds of crushes, horn sounds and the like.

As described above, a new concept is generated by the semantics display device 307 (see FIG. 34) from reconstruction parts, such as a disaster typified by a traffic accident, the semantics of a situation. The concept can be transmitted, received, recorded and reproduced.

In FIG. 34, only with respect to videos, the output of the CV video reconstruction and display device 304 is processed by the AI semantics generation device 305. Combination of IDs creates new semantics, which is displayed by the semantics display device 307. According to this embodiment, extended information systems other than those for CV videos can generate new concepts.

EXAMPLES

Hereinafter, more specific examples of the recognition and positioning device and the information conversion device according to the invention are described.

Example 1

In Example 1, a case is described where the recognition and positioning device of the invention is executed as a road database automatic generation device to perform a coordinate recognition simultaneous process.

Referring to FIG. 15, an example of the recognition and positioning device is described.

As shown in FIG. 15, the video output of the vehicle-mounted full circumference camera unit 10, and the output of the high-density GNSS unit 12 are transmitted to the CV video obtaining unit 20, and a CV video is obtained.

Many objects related to road traffic among the objects fixed to the stationary coordinate system in the video are preliminarily selected. The data on the objects (training data) is placed in the object designation unit 13.

The CV video is output from the vehicle-mounted device. The CV video obtaining unit 20 concerning the target range including the objects are coupled to the consecutive frame machine learning unit 30.

Preparation of machine learning and obtainment of the three-dimensional coordinates are completed so far. The signal is object-recognized by the consecutive frame machine learning unit 30, and at the same time, the mutual signal is repetitively exchanged with the three-dimensional coordinate computation and object coordinate assigning unit 40. The three-dimensional coordinate computation and object coordinate assigning unit 40 obtains the three-dimensional coordinates, and the attitude, or the three-dimensional shape or the like at the same time of recognition of the objects.

The consecutive frame machine learning unit 30 and the three-dimensional coordinate computation and object coordinate assigning unit 40 always exchange the mutual signal. The machine learning and obtainment of the coordinates always cooperate with each other, and depend on each other so as to improve the mutual certainty degree and the accuracy, and the recognition process and the coordinate obtaining process are performed.

To obtain the absolute coordinates of the object, a highly accurate satellite positioning system, such as GNSS, is used, the CV value is calibrated with the absolute coordinates, and the CV value is converted into that in the absolute coordinate system, thus obtaining the value.

An output signal having been subjected to object recognition and the coordinate obtainment is output from the coordinate assigning and recognition output unit 41.

Furthermore, the objects recognized together with the coordinates are transmitted to the recognition object display unit 50. The objects and the recognized names, and the three-dimensional coordinates are displayed in the image in the displayed CV video (see FIGS. 23 to 29).

While this is seemingly a video, the video is the CV video. Accordingly, conversion into what is called a two-dimensional map or three-dimensional CG is not required. Any point in the image has three-dimensional coordinates. To be exact, the three-dimensional coordinates of any feature point and any feature area can be instantaneously obtained. Accordingly, the feature point and the feature area can be used, as they are, for a three-dimensional map.

On the three-dimensional map, all the automatically recognized objects can be displayed in any manner. The objects can be automatically read. Accordingly, automatic creation and automatic reading databases are created.

The map is effective as a three-dimensional map for vehicle automated driving, and at the same time, the map can be used in all the industrial fields, instead of typical two-dimensional map. Updating is automated and simple. Accordingly, the map can be sufficiently used as a map in the future.

On the other hand, with reference basically to the automatically generated databases as described above, if a moving body obtained from the vehicle mounted camera in real time is required to be displayed in real time, the moving body is tracked, the RV value indicating the relationship between the camera and the moving body is obtained, the CV value is substituted therein, thereby allowing the MV value indicating the relationship between the stationary coordinate system and the moving body to be obtained, in a manner similar to the method of obtaining the CV value. This is executed by the moving body RV value obtaining unit 27 for obtaining the three-dimensional coordinates and attitude of the moving body.

When the object designation unit 13 designates the moving body as the object, the moving body RV value obtaining unit 27 and the consecutive frame machine learning unit 30 are combined and caused to cooperate with each other.

Thus, machine learning for the moving body is prepared. The RV value is transmitted to the consecutive frame machine learning unit 30. Recognition of the moving body and obtainment of the three-dimensional coordinates are achieved at the same time.

Note that the recognition of the moving body and the obtainment of the three-dimensional coordinates are not necessarily executed at the same time and may be executed separately. Typically, simultaneous execution is advantageous.

Also in the moving body recognition as described above, similar to the object in the stationary coordinate system, the consecutive frame machine learning unit 30 and the three-dimensional coordinate computation and object coordinate assigning unit 40 always exchange the mutual signal. The weight of the operations varies depending on precedence to machine learning, or precedence to coordinate obtainment.

An output signal having been subjected to object recognition and the coordinate obtainment is output from the coordinate assigning and recognition output unit 41.

The output signal is input into the recognition object display unit 50, which allows the object as the moving body to be recognized. The object is displayed together with the movement direction, the rotational direction and the like of the moving body, and is displayed in conformity with the original image.

Example 2

In Example 2, referring to FIGS. 30 to 32, an Example of a PRM recording and reproduction device that is an information conversion device (information conversion system) using the recognition and positioning device.

As shown in FIG. 30, the object recognition and the object three-dimensional coordinates obtained by the recognition and positioning device 100 are output from the coordinate assigning and recognition output unit 41.

The signal is transmitted from the PRM signal transmission device 110, is received by the PRM signal reception device 111, and is reproduced as a reconstructed image.

The details are shown in FIG. 31. As for the object recognized by the recognition and positioning device 100, not only the name is identified, but also selection is made in the parts warehouse selection device 201 about which the parts warehouse 202 includes parts warehouses 2021 to 202*N, and the recognized object is associated with the corresponding parts.

At this time, the ID is simultaneously assigned, and the object obtains the ID.

For all the recognized objects, IDs are obtained by the ID issuance device 203.

If the objects have attributes to be assigned, the IDs are assigned the attributes. It is herein assumed that the three-dimensional coordinates and attitude of each object is dealt with as the attribute.

That is, the IDs and the attribute signals are generated as a PRM signal by the PRM signal generation device 205.

The PRM signal is sent to the PRM signal transmission device 110, and is then transmitted.

The IDs and attributes of the transmitted PRM signal are received by the PRM signal reception device 111. The image reconstruction and display device 114 converts the IDs into the parts associated therewith. The parts are three-dimensionally reconstructed from the coordinates and attitude of the attributes and displayed.

During the reconstruction, in the same parts warehouse as the parts warehouse on the recognition side, the original parts are configured, and based on the parts, the three-dimensional space is reconstructed.

The original CV video is an aggregation of consecutive images. However, the reconstructed image to be displayed finally is three-dimensionally displayed.

Note that the parts warehouse 202 are assumed to be the same as the reception-side parts warehouse 202. The parts warehouses are not necessarily the same.

For example, if an automobile of Toyota, Prius, is black, parts associated with IDs sometimes indicate an automobile type and a color, or sometimes indicate only an automobile. Accordingly, as required, parts of a vehicle are sufficient in some cases. The reconstructed image may indicate a typical automobile, or may be an image associated correctly with a vehicle type and a model year (black Prius: made in 2018).

Here, returning to the principle of communication, an image itself is not necessarily transmitted. Alternatively, if it is assumed that concept information is transmitted, for example, required information "crossing, vehicle, and traffic jam" are found in information "vehicles are crowded and cause a traffic jam at the crossing". Even if the color, size and type of the vehicle are omitted, the purpose of communication is achieved.

Communication of such a concept is PRM communication, and PRM compression.

It is a matter of course that possible IDs classified in detail are sufficient to reproduce an actual image itself. Beyond this technology, for example, there is a technology that can record moving images for 100 years in a compact form.

At this time, parts warehouses providing association with IDs are prepared, and associated parts are selected and displayed.

Here, it is important to assume that a reproduced image is not necessarily an original image itself.

The reproduced image is converted in terms of the concept when an ID is issued. It is assumed that the object is not necessarily an object having a completely identical shape. It is a matter of course that the identical shape and the like may be adopted.

Example 3

In Example 3, referring to FIG. 37, an Example of an extended information system conversion device that is an extension to a typical information system including that for videos, as an information conversion device (information conversion system) using the recognition and positioning device.

For example, in extended information systems, such as of sounds, aromas, a temperature distribution, a word distribution in text, a radio wave frequency distribution, and area radiation distribution, the concept ID parts warehouse where classification is made according to conceptual IDs is provided. Not only the CV videos but also other information systems are used together. Most of the intended range in the wide variety of information system is divided into multiple objects. Recognition results of the objects, and obtainment results of the positions and attitudes of the objects are subjected to association between the recognition objects and IDs. Accordingly, the configuration including objects assigned IDs in the intended information system is achieved.

Furthermore, if required, the IDs are assigned required attributes. The conceptual parts warehouse 602 is provided that transmits only assigned IDs, supports only simplified concepts associated with IDs, and is provided on the reception side. Parts selected according to IDs thereamong are reproduced. The IDs generate one piece of semantics, which is converted into a conceptual ID, displayed, communicated, recorded, and reproduced and displayed through reconstruction.

The PRM reconstruction and display device 600 shown in FIG. 37 has a configuration and functions similar to those in Example 2 described above. In subsequent processes, from a combination of IDs, a conceptual ID is generated by the conceptual ID issuance unit 601, and the concept is transmitted and displayed.

The conceptual parts warehouse 602 for this purpose is provided. The IDs generate new semantics, and the semantics is associated with the conceptual ID.

The generated concept is displayed by the extended information system reconstruction and display device 603, as a concept that you can understand. The is made through, for example, a symbol, a sound, or an aroma.

The recognition and positioning device and the information conversion device according to the invention has been described above with reference to the preferable embodiments and Examples. However, the recognition and positioning device according to the invention is not limited only to the embodiments and Examples described above. It is a matter of course that various changes and implementations are allowed in the scope of the invention.

INDUSTRIAL APPLICABILITY

The invention can be preferably used as an image and video processing technology for recognizing an object on the basis of an image and a video obtained through a video camera or the like, while obtaining the three-dimensional coordinates of the object.

REFERENCE SIGNS LIST

10 Object video obtaining unit (full circumference camera unit)
13 Object designation unit
20 CV video obtaining unit (CV computation means)
30 Consecutive frame machine learning unit
31 Recognition area designation unit
40 Three-dimensional coordinate computation and object coordinate assigning unit
41 Coordinate assigning and recognition output unit
50 Recognition object display unit
100 Recognition and positioning device

The invention claimed is:

1. A recognition and positioning device, comprising:
a CV (camera vector) video obtaining unit that performs a CV computation of obtaining a CV value indicating three-dimensional position coordinates and attitude about three axes of a camera in a stationary coordinate system when an object video is obtained through the camera, and generates a CV video by adding the CV value to the object video;
an object designation unit that designates objects captured throughout a plurality of consecutive frames in the CV video to be recognized as an identical object;
a consecutive frame machine learning unit that repetitively executes processes through the plurality of consecutive frames of the CV video, the processes including a generating process for generating a learned model by executing machine learning on data of the object to which the three-dimensional position coordinates, in the stationary coordinate system, of the object captured in the CV video are added, as teaching data, and a recognition process for recognizing the object captured in the CV video as the identical object based on the learned model;
a three-dimensional coordinate computation and object coordinate assigning unit that associates the objects recognized by the consecutive frame machine learning unit over the plurality of consecutive frames in the CV video as the identical object, obtains the three-dimensional position coordinates, in the stationary coordinate system, of each of the objects captured in the CV video based on the CV value, identifies the objects having matched three-dimensional position coordinates by confirming in the corresponding frames, and assigns the matched three-dimensional position coordinates to the objects; and a coordinate assigning and recognition output unit that outputs the three-dimensional position coordinates assigned to the objects, by repeating recognition of the object and assigning of the three-dimensional position coordinates, through the plurality of consecutive frames in the CV video, between the consecutive frame machine learning unit and the three-dimensional coordinate computation and object coordinate assigning unit, wherein in the recognition of the object and assigning of the three-dimensional position coordinates, the data of the object recognized through the consecutive frame machine learning unit is transmitted to the three-dimensional coordinate computation and object coordinate assigning unit and the data of the object to which the three-dimensional position coordinates are added through the three-dimensional coordinate computation and object coordinate assigning unit is transmitted to the consecutive frame machine learning unit.

2. The recognition and positioning device according to claim 1, further comprising a recognition area designation unit that executes the recognition process, for only one frame among the plurality of consecutive frames in the CV video, obtains area coordinates of a peripheral area including the identical object, and designates a range of the area coordinates as a recognition area serving as an execution range of the recognition process where the object is present, wherein the consecutive frame machine learning unit allocates the recognition area designated by the recognition area designation unit, over adjoining frames where the object is present, and repetitively executes the recognition process, for the object in the recognition area, and the three-dimensional coordinate computation and object coordinate assigning unit identifies the object having matching coordinates in the recognition area by confirming the object in each frame, and assigns three-dimensional position coordinates to the object.

3. The recognition and positioning device according to claim 1, wherein the consecutive frame machine learning unit collectively executes the recognition process through machine learning, for the identical object as an aggregation of different pieces of information that include a plurality of directions and a plurality of distances, over all frames in the CV video in which the object is possibly captured.

4. The recognition and positioning device according to claim 1, further comprising a moving body RV (regional vector) value obtaining unit that performs an RV computation for a moving body moving in the CV video, the RV computation obtaining a predetermined RV value indicating a relationship between the camera coordinate system and a moving body coordinate system, wherein the consecutive frame machine learning unit extracts the moving body in the CV video, as the object of the recognition process, and the three-dimensional coordinate computation and object coordinate assigning unit identifies the moving body, based on the RV value of the moving body, and assigns the three-dimensional position coordinates.

5. A device comprising:

the recognition and positioning device according to claim 1; and an information conversion device connected to the recognition and positioning device and including an ID parts warehouse that stores an ID serving as identification information associated with type of the object, and attribute information of the object classified according to the ID; and an image reconstruction and display device that associates the ID associated with the type of the object and stored in the ID parts warehouse, with the object that is identified and assigned the three-dimensional position coordinates by the recognition and positioning device, and reconstructs the CV video including a plurality of the objects, according to the ID associated with the type of the object, and attribute information of the object thereon.

6. The information conversion device according to claim 5, further comprising an ID issuance device that issues an ID according to the ID and the attribute information thereon stored in the ID parts warehouse, for the object included in the CV video, and the information conversion device transmits or records the CV video about which the ID is issued to the object by the ID issuance device.

7. The information conversion device according to claim 5, further comprising:

a conceptual parts warehouse that stores predetermined conceptual information indicating semantics and a concept of the object; and a semantics display device that associates the conceptual information stored in the conceptual parts warehouse, with the object that is identified and assigned the three-dimensional position coordinates by the recognition and positioning device, and reconstructs the CV video including a plurality of the objects, according to the conceptual information associated with each object.

8. The recognition and positioning device according to claim 1, further comprising an object video obtaining unit, as the camera, for taking and obtaining the object video, an absolute coordinate assigning unit that obtains absolute coordinates of the object, and a recognition object display unit for outputting and displaying the CV video where the object is recognized and identified and the three-dimensional position coordinates are added, wherein the CV video obtaining unit is electrically connected to the object video obtaining unit, the absolute coordinate assigning unit, the object designation unit, the consecutive frame machine learning unit, and the three-dimensional coordinate computation and object coordinate assigning unit, the three-dimensional coordinate computation and object coordinate assigning unit is electrically connected to the consecutive frame machine learning unit and the coordinate assigning and recognition output unit, and the coordinate assigning and recognition output unit is electrically connected to the recognition object display unit.

* * * * *